Nov. 26, 1968 S. P. FRANKEL 3,413,454
HIGH SPEED DATA PROCESSING SYSTEM
Filed Oct. 24, 1958 16 Sheets-Sheet 1

INVENTOR.
STANLEY P. FRANKEL
BY
ATTORNEY.

Nov. 26, 1968     S. P. FRANKEL     3,413,454

HIGH SPEED DATA PROCESSING SYSTEM

Filed Oct. 24, 1958     16 Sheets-Sheet 3

INVENTOR.
STANLEY P. FRANKEL.
BY
ATTORNEY.

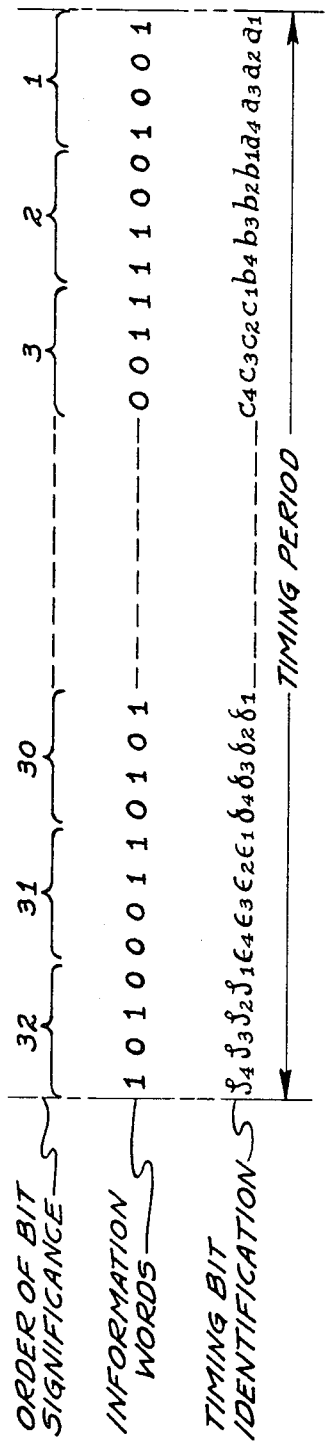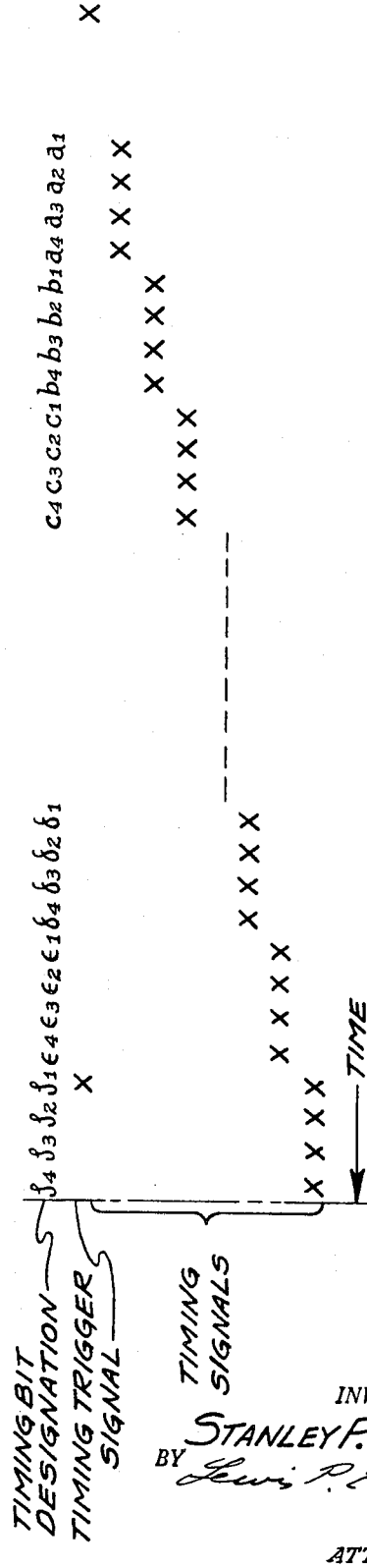

Nov. 26, 1968     S. P. FRANKEL     3,413,454
HIGH SPEED DATA PROCESSING SYSTEM
Filed Oct. 24, 1958     16 Sheets-Sheet 6

INVENTOR.
STANLEY P. FRANKEL.
BY
ATTORNEY.

Nov. 26, 1968  S. P. FRANKEL  3,413,454
HIGH SPEED DATA PROCESSING SYSTEM
Filed Oct. 24, 1958  16 Sheets-Sheet 7

INVENTOR.
STANLEY P. FRANKEL
BY
ATTORNEY.

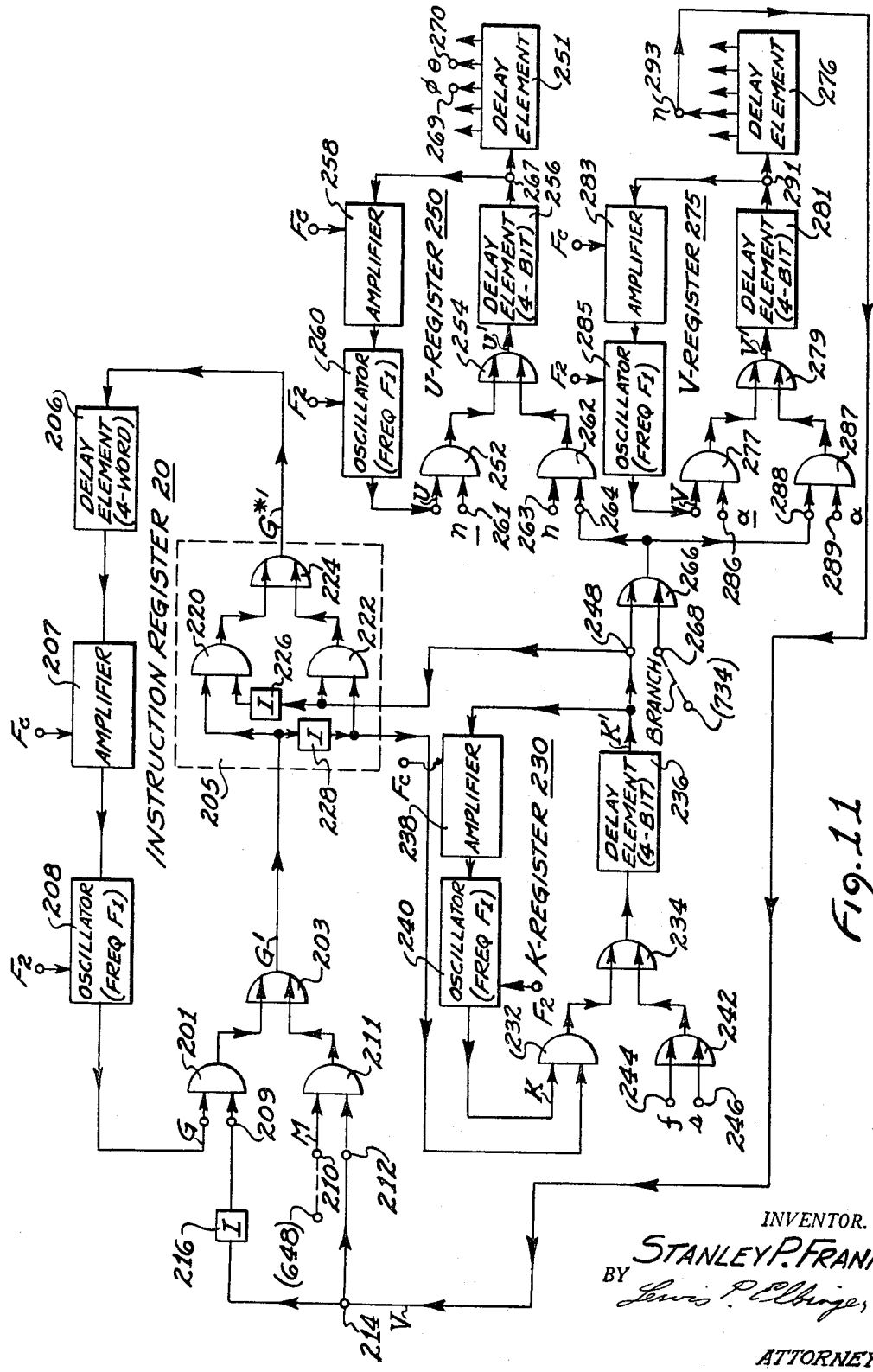

INVENTOR.
STANLEY P. FRANKEL
ATTORNEY.

INVENTOR.
STANLEY P. FRANKEL.
BY
Lewis P. Elbinger
ATTORNEY.

INVENTOR.
STANLEY P. FRANKEL.

United States Patent Office 3,413,454
Patented Nov. 26, 1968

3,413,454
HIGH SPEED DATA PROCESSING SYSTEM
Stanley P. Frankel, Long Beach, Calif., assignor to General Electric Company, a corporation of New York
Filed Oct. 24, 1958, Ser. No. 769,348
35 Claims. (Cl. 235—176)

This invention relates to information processing and more particularly to a method of and apparatus for processing at high speeds information encoded in binary digital form.

In the processing of information, such as data, various logical and arithmetic operations are performed thereon. These operations are performed at relatively high speeds by the more modern data processing systems, which are primarily electronic; i.e., these systems operate on electrical signals representing data by means of electron tubes, diodes and transistors. It has been found by experience that these electronic data processing systems are most reliable when the electronic portions thereof need handle only data which is basically of binary digital form. In binary digital data processing systems, each element of information, termed a "bit," is represented by either a 1 or a 0. In the binary digital data processing systems of the prior art, it has been customary to represent these bits by the presence and absence of electrical signals at specified locations in the system at predetermined times; for example, an electronic gate may be "opened" at a particular time by a system "clock" signal and if there is an input data signal applied to the gate at that moment, the numeral 1 is said to be present, whereas if there is no input signal applied to the gate, the numeral 0 is said to be present.

Inasmuch as it is desirable to operate data processing systems at high rates of speed, these clock signals must recur at a rapid rate. This rate of recurrence is known as the "clock rate." In a typical prior art electronic data processing system a clock rate of 100,000 clock signals per second is employed and, consequently, the data signals appearing at various utilization locations in such system must represent 100,000 bits per second. Thus, the duration of the electrical signal representing the binary 1 must be very short (in the above example, less than 10 microseconds duration) and, hence, this signal is actually an electrical pulse. The simulation of binary digital data by the presence and absence of electrical pulses may be termed the "pulse-no pulse" representation.

In order to process data at increasing speeds, system clock rates must be increased. However, the maximum frequencies at which electron tube, diode and transistor circuit elements can effectively amplify or transmit electrical signals place a serious upper limit on the clock rate of the above-mentioned prior art electronic data processing systems. The relatively narrow bandwidth for which circuit elements of these prior art systems can effectively amplify and transmit electrical signals is another serious obstacle which impedes efforts to accommodate clock rate increases and their accompanying increased bandwidths. Therefore, if it is desired to build an effective high speed data processing system employing clock pulse signals of the order of one millimicrosecond duration ($10^{-9}$ seconds) recurring at microwave frequency rates of approximately $10^9$ pulses per second, it is desirable to employ traveling-wave tubes as active circuit elements, since amplifiers employing traveling-wave tubes are well-known for their ability to amplify microwave signals over a broad range of frequencies.

In any system processing data at a very rapid rate, especially one where traveling-wave tubes would be employed as the active circuit elements, signal amplitudes will vary over wide ranges throughout the system. In order to avoid employment of excessive numbers of traveling-wave tubes in the system, it is desirable that operations often be performed on signals without reconstruction or amplification thereof until they are attenuated to near the noise level. However, in a system employing the pulse-no pulse representation of binary digital data, there is the constant danger that background noise in the presence of a low-level no pulse digital representation will be mistaken for a pulse digital representation. Consequently, in a data processing system employing pulse-no pulse representation of binary digital data, the lowest signal level must be held well above the noise level, and the minimum number of active circuit elements is unduly large for a given allowable error rate.

On the other hand, a data processing system employing binary digital representation, wherein the information content of a signal is not denoted by its amplitude, permits the use of fewer active circuit elements for a given error rate. Such a representation wherein there is no signal amplitude distinction for the two binary digits also permits the use of increased clock rates for a given noise level. A further advantage of a binary digital representation wherein there is no signal amplitude difference for the two binary digits as compared to the pulse-no pulse representation is that signals may not have to be limited or suppressed at predetermined intervals in order to represent one of the binary digits. In many applications wherein the clock rate is in the microwave frequency range, it becomes extremely difficult to alternately permit and prohibit signal transmission; for example, to form an electron beam and then to suppress it in adjacent millimicrosecond intervals is a difficult technical problem in many electron tubes employed to operate with microwave frequencies. In these applications, technical difficulties may be avoided by allowing the signal to maintain constant amplitude and by employing other techniques to represent binary digital data. Additionally, in a data processing system wherein the two binary digital representations are maintained at constant amplitude, the amplitude limiting saturation effects of traveling-wave tubes provide an effective means to secure system amplitude control.

Therefore, it is the principal object of this invention to provide an improved data processing system.

Another object of this invention is to provide a digital data processing system adapted to process information at higher speeds than prior art systems.

Another object of this invention is to provide an improved digital data processing system employing fewer active circuit elements for an allowable error rate than would be necessary in similar prior art systems.

Another object of this invention is to provide a digital data processing system employing higher clock rates than prior art systems.

Another object of this invention is to provide a digital data processing system wherein the different digits are represented by electrical signals of substantially equal amplitude.

Another object of this invention is to provide a digital data processing system employing binary digital representation of data wherein both types of binary digits are represented by electrical signals of substantially equal amplitude.

The foregoing objects are achieved in data processing apparatus wherein binary digits representing data are denoted by the relative phase of electrical signals with respect to a reference signal. Both the binary 1 and the binary 0 are represented by alternating signals of substantially equal amplitude. However, one of these types of binary digits is denoted by a cophasal relationship between the corresponding signals and the reference signal, whereas the other of these types of binary digits is denoted by an antiphasal relationship between the corresponding signals and the reference signals. The successive digits of a number appear serially within a microwave frequency signal which may be of constant amplitude. The phase of the microwave signal with respect to the reference signal is shifted in synchronism with the system clock in order to represent the bits of the number. Arithmetic and logical operations similar to those employed in computers using the pulse-no pulse digital representation are available, although in certain instances novel logical elements and other components are employed to make most effective use of this phase representation of binary digital data.

The very high clock rates permitted by this combined use of traveling-wave tubes and phase representation of binary digits result in difficulties not encountered in the prior art lower speed data processing and computing systems. Each active and passive circuit element introduces some delay in signal transmission therethrough. In the prior art systems each circuit element can be designed to have a delay of only a small part of a clock period. (A clock period is the time between corresponding points of two successively occurring clock signals.) For example, the time required for an electron tube flip-flop to change from one stable state to the other is but a small fraction of the clock period normally employed in these prior art systems. However, the delay time of a traveling-wave tube is usually several times the very short clock period permitted by the tube's broad bandwidth. Any analog of a flip-flop which employs one or more traveling-wave amplifiers cannot be expected to settle into a new stable state until several such clock periods elapse after application thereto of the trigger signal initiating the change of state. Such a long delay relative to the short clock periods introduces system difficulties, which are particularly pronounced in arithmetic operations. As an example, consider the serial addition of two binary numbers whose digits are presented in successive clock periods. Each digit of the resulting sum is influenced by the carry digit generated with the immediately preceding sum digit. Thus, addition can only be performed in a straightforward manner if the carry digit is available at the time the addend and augent digits are applied to the arithmetic circuit for computation. Such straightforward addition is manifestly impossible since the digits of the addend and augend are presented to the arithmetic circuit in successive clock periods, but the traveling-wave tube flip-flop holding the carry digit does not settle into the stable state corresponding thereto until several clock periods after receipt of an input signal representing that carry digit. These carry digit delay difficulties become even more severe if the operation of addition is performed in the parallel mode, rather than serially.

Instead of employing complex circuitry to obviate the above-mentioned difficulties, the successive digits of the numbers on which an arithmetic or logical operation is to be performed may be spaced to occur several clock periods apart to account for the traveling-wave tube delays. In the above example of serial addition, the digits of the addend and augend are thus spaced by a sufficient number of clock periods so that the carry digit flip-flop will have settled into its steady state and will hold the proper carry digit for arithmetic combination with the addend and augend digits as they are presented to the arithmetic circuit. A computing system operating in this manner is somewhat inefficient, however, since many of its circuits will remain idle for several of the interim clock periods. It is thus contemplated in this invention that other arithmetic or logical operations, or portions thereof, may be performed by these otherwise idle circuits in those clock periods that a particular arithmetic or logical operation does not use.

Therefore, it is another object of this invention to provide a data processing system adapted to perform simultaneously a plurality of arithmetic or logical operations.

Another object of this invention is to provide a data processing system adapted to perform at least one additional arithmetic or logical operation with circuits which are temporarily idle during a portion of the time when a first arithmetic or logical operation is being performed therewith.

The immediately preceding objects are achieved in data processing systems by interspersing the electrical signals of a plurality of words of digital information. (A word is an ordered set of digits which is the normal unit in which information may be stored, transmitted or operated upon within a computer or data processing system.) If the digit signals of a particular first word must be spaced by $n$ clock periods because of traveling-wave tube delays encountered in a particular arithmetic or logical operation, the digit signals of $n-1$ other words are temporally interspersed with those of the first word, so that each successively occurring group of $n$ signals represents one digit of all of said words in predetermined order. In this manner, $n$ operations of addition may be performed simultaneously on each of $n$ words whose digits are interspersed and which may represent $n$ different addends. A separate flip-flop employing traveling-wave tubes may be employed to store each of the $n$ carry digits, for presentation at the appropriate time, or a single carry digit register element may be adapted to store $n$ carry bits of binary digital information.

It is not necessary that the same operation be performed simultaneously on all of the above-described interspersed information words, but instead, different arithmetic and logical operations may be performed simultaneously on each of the words. For example, the following operations may be performed simultaneously: the operation of addition on one word; the operation of subtraction on another word; another word may be tested to see if it is negative; a new word may be inserted to replace another word; and yet another word may be stored in the memory of the system. Furthermore, since $n$ different words are simultaneously available at various locations in the system, communication may be provided between the words. A flexible means of communication between the interspersed words will provide a very useful and versatile data processing system.

Therefore, it is another object of this invention to provide a data processing system adapted to store therein a plurality of temporally interspersed words of information, wherein an independent arithmetic or logical operation may be performed simultaneously on each of said words.

Another object of this invention is to provide means for communication between the interspersed words of a data processing system wherein the signals representing a plurality of words of information are temporally interspersed.

The immediately preceding objects are achieved in a data processing system by providing a plurality of closed loops adapted to recirculate signals representing respective bits of binary digital information. Each loop is adapted to store a plurality of words of information wherein the corresponding bits of the plurlity of words circulating therein are temporally interspersed. A plurality of circuits are provided to communicate respectively from external to each loop with any selected one of the words circulating therein. Adjustable time-shifting means interconnects the communicating circuits. By proper adjustment of the time-shifting means, communication is provided between the various interspersed words.

The invention will be described with reference to the accompanying drawings, wherein:

FIGURE 7 is a diagram illustrating the temporal interspersion of word signals employed in the operation of this invention;

FIGURE 10 is a diagram illustrating the interrelationship of the timing signals employed in the operation of this invention;

FIGURE 11 is a block diagram of the instruction register and associated circuits;

As the various components and operations to be described are interrelated, the headnotes provided are here gathered to constitute a table of contents for facilitating cross-reference between the several parts of the ensuing description.

|  | Column |
|---|---|
| General Operation | 5 |
| Data Representation | 6 |
| Storage Elements | 8 |
| Interspersed Bits | 12 |
| Functional Design | 13 |
| Orders | 13 |
| States | 14 |
| Timing Circuits | 15 |
| Instruction Register | 17 |
| Delay Number Count-Down | 19 |
| Control Signal Generation | 21 |
| Control Registers | 23 |
| Order Register | 23 |
| Operand Address Register | 25 |
| Next-Instruction Address Register | 26 |
| Successive Timing Period Execution | 27 |
| Arithmetic Unit | 27 |
| Accumulator | 27 |
| Order Control Network | 28 |
| Delay of Input Signals | 29 |
| Add-Subtract Unit | 29 |
| Memory | 32 |
| Execution of Operations | 35 |
| Fetch | 35 |
| Add | 36 |
| Subtract | 36 |
| Extract | 36 |
| Store | 37 |
| Branch | 38 |
| Communication Between Time Domains | 40 |
| Input-Output | 44 |
| Input Apparatus | 44 |
| Output Apparatus | 45 |
| Starting Procedure | 47 |
| Logical Elements | 49 |
| Gates | 49 |
| Converters | 51 |

The detailed description follows:

GENERAL OPERATION

Figure 1:
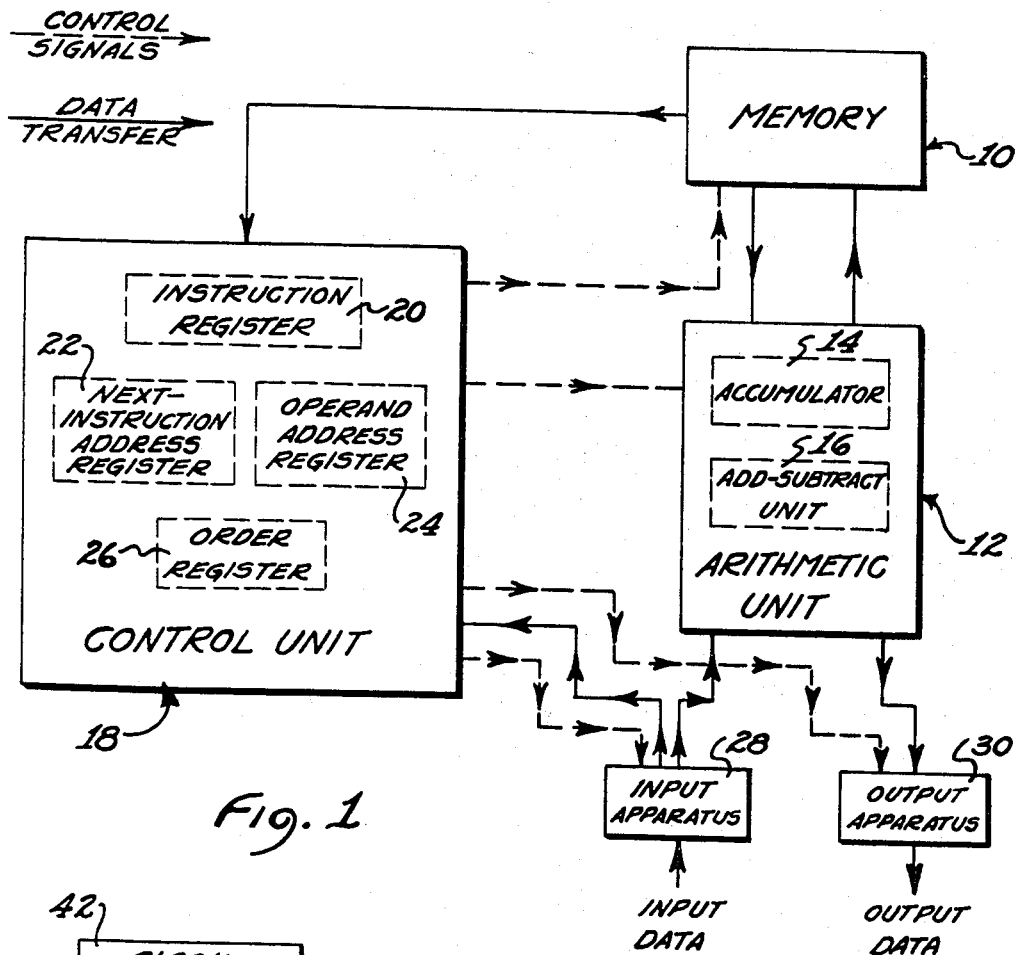
FIGURE 1 is a block diagram of an embodiment of this invention and illustrates a computer.

The computer of FIG. 1 is an embodiment of a data processing system operable in accordance with the principles of this invention. In normal operation, the computer is controlled by "instructions" stored as information words in a memory 10 in digital form. The computer performs arithmetic and logical operations on "operands," which are also stored as information words in memory 10 in digital form.

The solid lines in FIG. 1 illustrate the directional flow of data signals, such as instructions, operands, operands as modified following any arithmetic or logical operations performed thereon, and arithmetic or logical results derived from one or more operands by one or more instructions. Thus, operands are delivered by the memory 10 to an arithmetic unit 12 where arithmetic or logical operations are performed thereon. Arithmetic unit 12 includes an accumulator 14, an add-subtract unit 16, and the necessary control circuits to perform the desired operations. Data of various types is stored in the memory 10 by arithmetic unit 12. Instructions are delivered by the memory 10 to a control unit 18. Control unit 18 includes an instruction register 20, a next instruction address register 22, an operand register 24, and an order register 26.

The computer receives data from external sources, not shown, by means of input apparatus 28. Input apparatus 28 transmits instructions to arithmetic unit 12 or control unit 18, and transmits operands to arithmetic unit 12. Arithmetic unit 12, in turn, is adapted to store the received instructions and operands in memory 10, although they may be retained in the arithmetic unit for later processing.

Data is delivered to output apparatus 30 by arithmetic unit 12. Output apparatus 30, in turn, transmits the output data to utilization means, not shown.

Operation of the computer is directed by control unit 18 in accordance with the instructions stored in the registers thereof. The broken lines of FIG. 1 illustrate the control signals that are provided by control unit 18 for directing the storage and retrieval of data from memory 10, the operations performed by the arithmetic unit 12, and the receipt and transmittal of data by the respective input apparatus 28 and output apparatus 30.

FIG. 1 illustrates only the apparatus directly operating on or controlling data. Auxiliary equipment such as timing and clock sources, power supplies, etc., is not shown.

DATA REPRESENTATION

The computer embodiment of FIG. 1 is adapted to process data expressed in binary digital code. However, this invention is not limited to the processing of data so encoded, but may be employed for processing data expressed in other types of digital code. In accordance with the principles of this invention, each digit is represented by an alternating electrical signal, the phase of which differs for each digit value represented. Thus, in the embodiment of FIG. 1, a binary 0 is denoted by an alternating signal in phase with the reference alternating signal provided by a reference oscillator 40, FIG. 2. The binary 1 is denoted by an alternating signal having substantially the same amplitude and frequency as the binary 0 signal, but being 180 degrees out-of-phase with respect to the reference signal.

Figure 3:
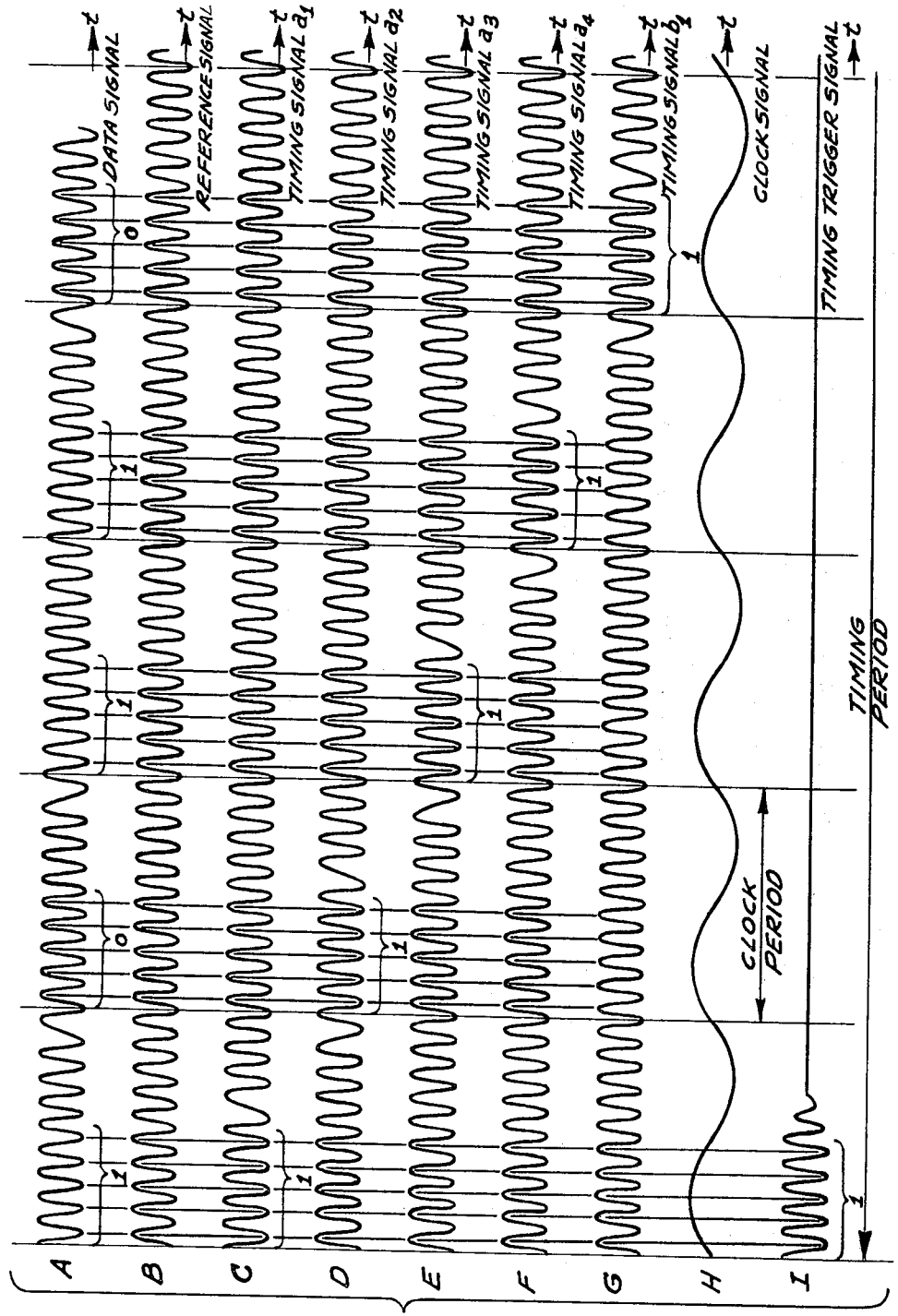
FIGURE 3 is a drawing of waveforms illustrating the operation of this invention.

Data is represented by words of information, each word consisting of 32 bits. Each word is expressed in the serial mode, wherein the bits appear sequentially at uniformly spaced intervals according to their order of significance. Each word is represented by an alternating electrical signal of substantially constant amplitude and dominant frequency, $F_1$, wherein the signal phase with respect to the reference signal, of frequency $F_1$ at 32 discrete times, determined by the occurrence of 32 timing signals, denotes the 32 bits of the word. Waveform A of FIG. 3 illustrates the representation of 5 successive digits, 10110. Waveform B represents the reference signal supplied by the system reference oscillator 40. Waveforms C, D, E, F and G illustrate, for explanatory purposes only, five timing signals, designated respectively as timing signals $a_1$, $a_2$, $a_3$, $a_4$, and $b_1$, each of dominant frequency $F_1$. Waveform H illustrates the system clock signal, of frequency $F_c$, provided by the system clock oscillator 42.

Figure 2:
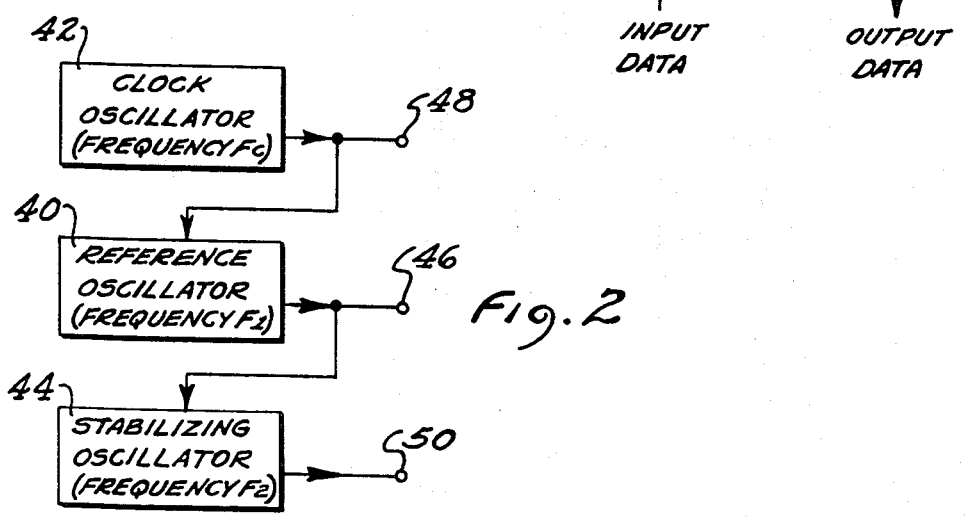
FIGURE 2 is a block diagram of the oscillators controlling the computer timing.

The reference signal of waveform B is a continuous alternating signal of microwave frequency, equal to 10,000 megacycles per second in this embodiment. Reference oscillator 40 is locked in phase with clock oscillator 42 as shown in FIG. 2. Consequently, the clock and reference signals are coherent in phase. The clock signal of waveform H of FIG. 3 has a frequency of 500 megacycles per second and a clock period of 2 millimicroseconds. An additional stabilizing oscillator 44 operates at twice the frequency of the reference oscillator 40 and is locked in phase therewith. The purpose and use of oscillator 44 will be described subsequently. The 10,000 megacycle reference signal and the 500 megacycle clock signal are not to be considered limiting or optimum values, but are merely exemplary to describe the operation of the invention.

The information content of data signals, such as waveform A, is carried in approximately the first half of each clock period. Thus, waveform A represents the digit 1 in the first, third and fourth clock periods shown, because in the first half of each of these periods, this signal bears an antiphasal relationship with the reference signal of waveform B. In the second and fifth clock periods, waveform A represents the digit 0 by its cophasal relationship with the reference signal.

The information content of the data signals is sampled at the proper time in the clock period by a plurality of timing bits. The number of timing bits provided is equal to the number of clock periods in the system timing period. The timing period duration is determined by the recurrence rate of a timing trigger signal, which represents a binary 1, and which is shown in waveform I. Each timing signal in FIG. 3 represents a binary 1 during the first half of a particular clock period and represents a binary 0 for the remainder of the timing period. Thus, if the timing signal of waveform F and the data signals of waveform A are applied to the system analog of an AND-gate, the output of the AND-gate can be a binary 1 only during the first half of the fourth clock period depicted in FIG. 3, and will be a binary 1 only if the data signal information content is a binary 1 at that time. In this manner, the information content of a data signal is limited to a predetermined portion of the clock period. The remaining portion of the clock period is available for changing the phase of the continuous alternating signal in order that a different binary digit may be represented in the next succeeding clock period. As will be described later, in this embodiment each timing signal actually contains $n$ timing bits or binary 1's in $n$ successive clock periods because $n$ information words are interspersed, and each timing period has a duration equal to that of $n$ words.

Figure 4:
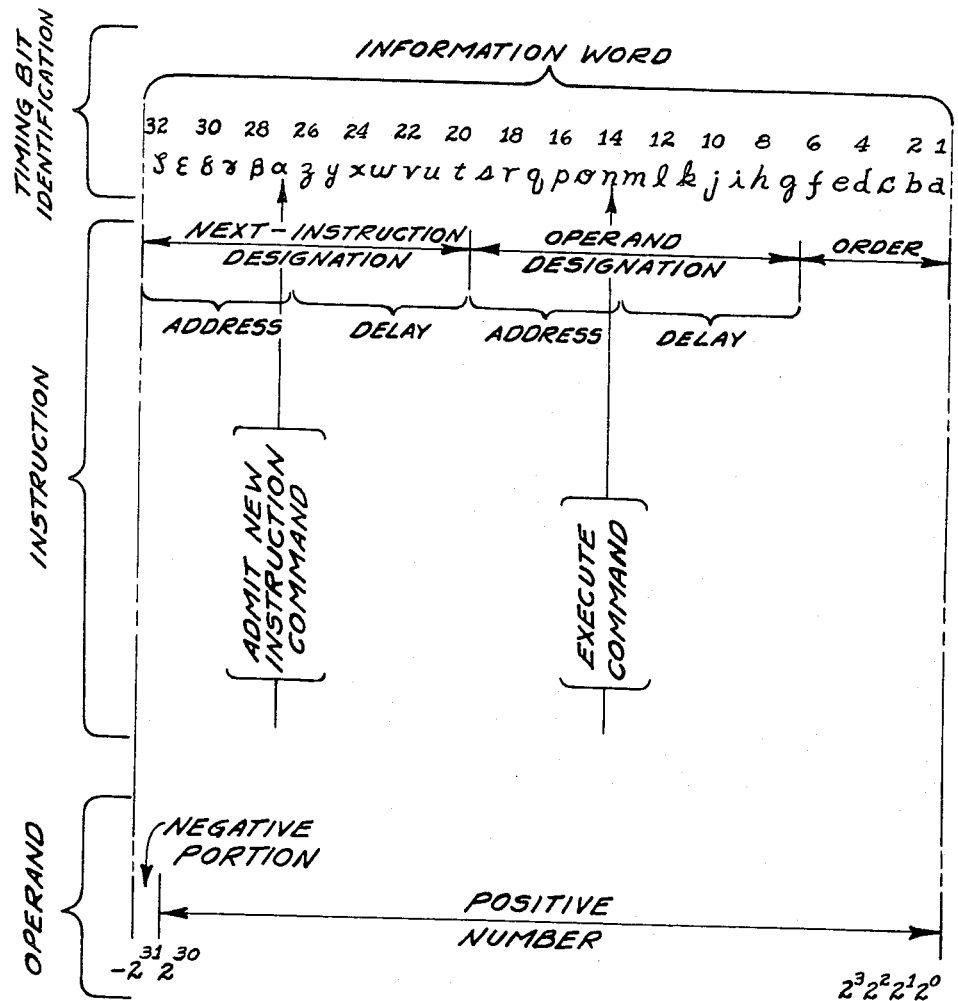
FIGURE 4 is a diagram illustrating the information content of the data words employed in the embodiment of this invention.

The 32 bits of each word of information are designated in the sequence of their order of occurrence by the numerals 1 to 32, as shown in FIG. 4. In this figure, the bits of the word occur sequentially from right to left. The 32 timing bits which are used to determine the information content of each word are designated by 32 letters, the first 26 timing bits being designated by the English letters $a$ to $z$, and the last 6 timing bits, by the Greek letters $\alpha$ to $\zeta$.

Each instruction word contains three major portions. The first portion, which includes the first 6 bits of the word, is the order. The order designates the type of arithmetic or logical operation the computer must perform. The second portion, which includes the 7th to 19th bits of the word, is the operand designation. The operand designation directs the computer as to when and where it must obtain or deliver the operand on which the order is to be performed. The third portion, which includes the 20th to 32nd bits of the word, is the next-instruction designation. The next-instruction designation directs the computer as to when and where it must obtain the next instruction. Both the operand designation and the next-instruction designation contain an address and a delay part. The address part occupies the last 6 bits of each designation and is a codified representation of the location where the operand or next instruction is to be obtained, or where the operand is to be delivered. Thus, the address part may represent a location in memory 10, the input apparatus 28 or the output apparatus 30. The delay parts occupy the first 7 bits of each designation and are binary digital numbers representing respectively the number of timing periods which must elapse before the operation is to be performed and the number of timing periods which must elapse before the next instruction is to be obtained.

The operand word usually represents a number in binary digital form. The first 31 bits, in order, will usually represent in ascending powers the digits of a positive number of radix 2. This positive number $N(+)$ is thus represented by these first 31 bits as $$N(+) = d_1 2^0 + d_2 2^1 + d_3 2^2 + \ldots + d_{31} 2^{30}$$

where $d_1$ is 0 or 1 in accordance with the binary digit represented by the corresponding bit in the operand. The 32nd (and last occurring) bit in the operand represents a negative number of magnitude $2^{31}$. Therefore, the entire number represented by the operand is positive or negative in accordance with the absence or presence of a binary 1 in the position of the 32nd bit, and is given by $$N = d_1 2^0 + d_2 2^1 + d_3 2^2 + \ldots + d_{31} 2^{30} - d_{32} 2^{31}$$

The positive portion $N(+)$ of N, when $d_{32}$ is 1, denotes the complement of the negative number which is to be represented.

In another representation employed in this computer, the first 31 bits of the operand represent a positive number less than one. The 31st bit, or most significant digit, represents a positive number of magnitude $2^{-1}$, the 30th bit $2^{-2}$, etc. The 32nd bit represents a negative number of magnitude $2^0$. Therefore, the positive portion of the operand, when $d_{32}$ is 1, again denotes the complement of the negative number which is to be represented.

STORAGE ELEMENTS

Figure 5:
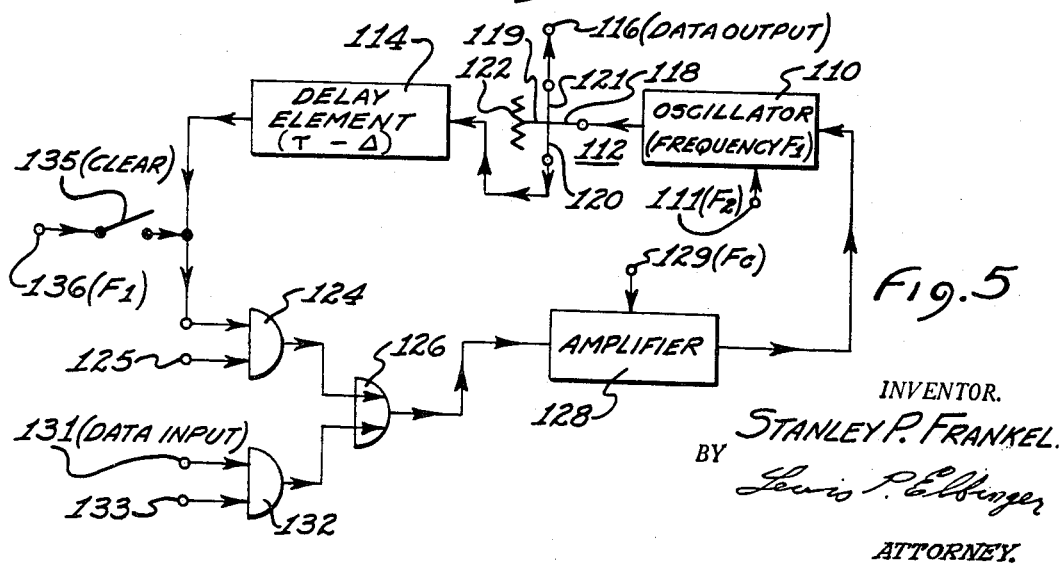
FIGURE 5 is a schematic diagram of a storage element useful in the practice of this invention.

A storage element useful for many components of the computer embodiment of FIG. 1 will now be described. This storage element may be used for the sections of memory 10, for the various registers, the flip-flop analogs, and for the accumulator 14, all to be subsequently described. This storage element, shown in FIG. 5, is the subject of U.S. patent application 82,036, by W. A. Edson, filed Jan. 11, 1961, now U.S. Patent 3,277,450, and assigned to the assignee of the instant application. A plurality of information bits is stored in phase representation in the recirculation storage element of FIG. 5. The stored information bits appear sequentially at an output terminal in synchronism with the clock signal, which is inserted into the circuit to stabilize the time of occurrence of the stored bits. One bit appears during the first portion of each clock period. So long as a particular bit is not changed by the insertion of new information into the loop circuit, it will continue to recur regularly as it recirculates with a period determined by the total loop delay time. The total loop delay time also determines the number of bits which can be stored in the storage element.

In operation, the storage element output signals are provided by an oscillator 110, which oscillates continuously at the dominant frequency $F_1$, the same frequency as that of the reference signal provided by reference oscillator 40 of FIG. 2. The particular type of bit provided by oscillator 110 at any instant is determined by the phase of the signal provided by this oscillator with respect to that of the reference signal, and is designated as a 0 or a 1 in accordance with the signal of oscillator 110 being respectively in phase or 180° out-of-phase with the reference signal. The phase of the microwave cycle of a signal provided by oscillator 110 is stabilized by applying thereto a signal having a frequency $F_2$, equal to twice frequency $F_1$. This signal is provided by stabilizing oscillator 44 of FIG. 2 and is delivered to a terminal 111 for application to oscillator 110. Because the signal provided by oscillator 44 has a frequency twice that provided by oscillator 110, it tends to stabilize the phase of the output signal of oscillator 110 whether this output signal is in phase or 180° out-of-phase with respect to the reference signal.

The signal generated by oscillator 110 is coupled to a hybrid junction 112 which functions to divide the signal into two portions, one portion being applied to a delay element 114 and the other being available as an output signal at an output terminal 116. A suitable hybrid junction for this application is described by J. F. Reintjes and G. T. Coate, "Principles of Radar," third edition, McGraw-Hill Book Company, Inc., New York, pages 825–839, 1952. A hybrid junction is a device provided with two pairs of conjugate arms and wherein, if the arms are suitably terminated, a signal applied to one arm of one conjugate pair will divide equally between the two arms of the other conjugate pair, and no portion of the applied signal will enter the other arm of said one conjugate pair. Arms 118 and 119 are one conjugate pair and arms 120 and 121, the other conjugate pair of hybrid junction 112. A dissipative member 122 properly terminates arm 119; therefore, the signal of oscillator 110 entering arm 118 divides equally between arms 120 and 121 and no portion thereof enters arm 119.

Although the Reintjes publication describes hybrid junctions employing coaxial transmission line and other conventional rectangular waveguide sections, neither hybrid junction 112, nor any of the circuits or components hereinafter described for transmitting or otherwise treating microwave signals of the type herein employed is so limited. Such circuits and components may be comprised of any known apparatus for propagating microwave electromagnetic waves, such as coaxial transmission lines, hollow waveguides, ridge waveguides, or striplines. In fact, in many applications ridge waveguides or striplines are preferable because of their broad bandwidth capacities. Stripline is further desirable because of its compactness, relatively low cost, and ease and simplicity of manufacture.

The signal applied from hybrid junction 112 to delay element 114 is suitably delayed and applied to one input terminal of an AND-gate 124. An AND-gate is a device adapted to receive two or more input signals, each representing a binary digit, and to deliver a binary digital output signal representing a 1, only when all input signals represent a 1. An AND-gate suitable for operation with microwave signals denoting binary digits by phase representation is described hereinafter. A signal at dominant frequency $F_1$ providing in phase representation a continuous train of binary 1's is applied to the other input terminal 125 of AND-gate 124, when it is desired that the circuit recirculate the signals stored therein. The output signal of AND-gate 124 is applied to one input terminal of an OR-gate 126. An OR-gate is a device adapted to receive two or more input signals, each representing a binary digit, and to deliver a binary digital output signal representing a 1, when any one or more of the input signals represents a 1. An OR-gate suitable for operation with microwave signals denoting binary digits by phase representation is described hereinafter.

OR-gate 126 permits passage of all representations of binary 1's in the output signal of AND-gate 124, and thereby permits recirculation of data stored in the circuit.

The output signal of OR-gate 126 is applied to an amplifier 128. The output signal of amplifier 128 is applied to oscillator 110 and serves to control the phase thereof. If a particular bit signal arriving at oscillator 110 from amplifier 128 is of the same type as the immediately preceding bit signal, the operating phase of oscillator 110 remains unchanged at that time. If the bit signal applied to oscillator 110 is of opposite type from the immediately preceding bit signal, it arrives 180° out-of-phase with the phase at which oscillator 110 is operating. This applied signal is of sufficient amplitude to cause oscillator 110 to oscillate in phase therewith. Consequently, the applied signal will force oscillator 110 to lock in phase therewith and to correspondingly shift the phase of its output signal. In this manner oscillator 110 continuously provides an output signal in phase representation corresponding to the information stored and recirculating in the circuit of FIG. 5.

Figure 6:
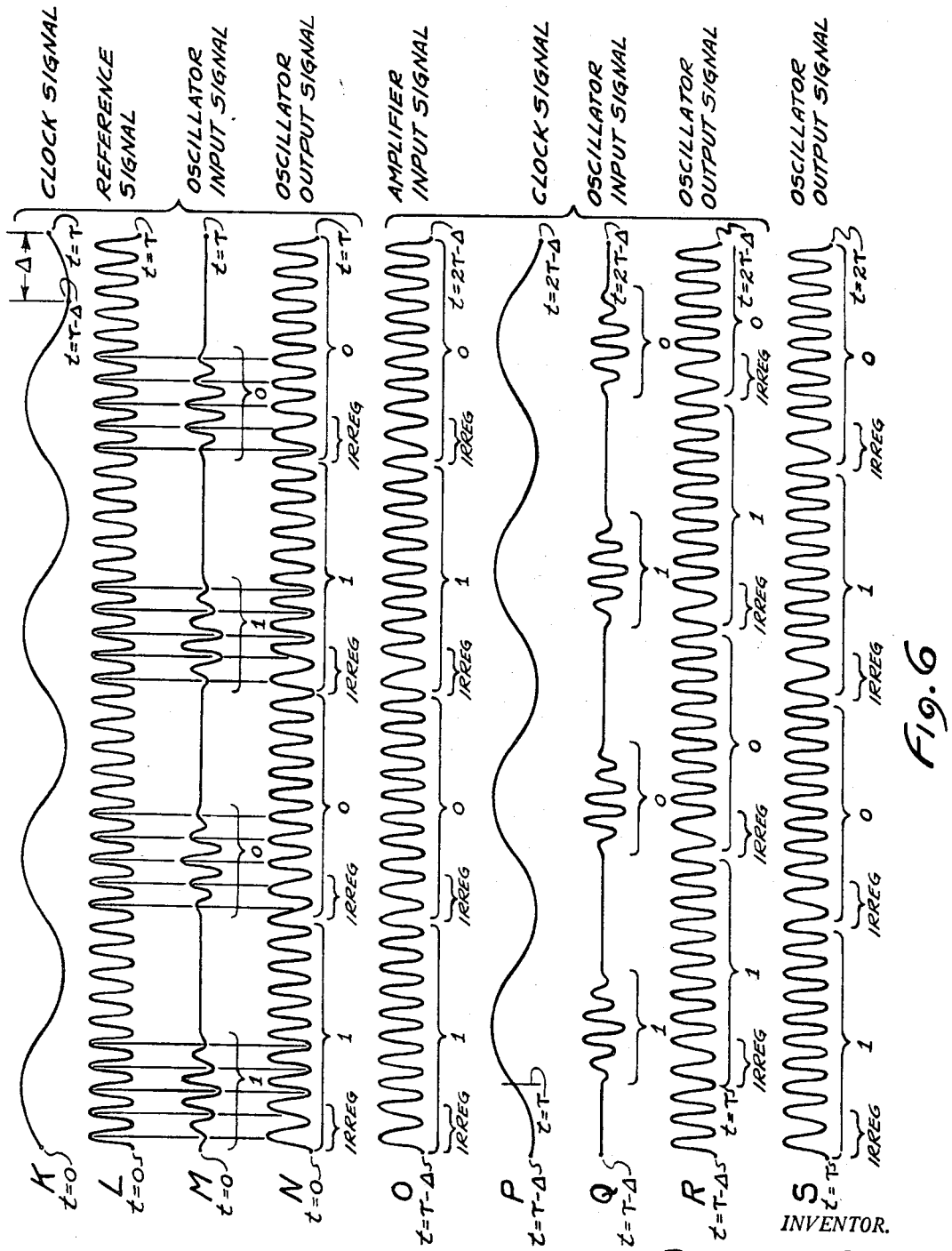
FIGURE 6 is a drawing of waveforms illustrating the operation of the storage element of FIG. 5.

A more detailed description of the operation of this circuit will now be provided. By way of example, the total loop delay time is sufficient for the loop to store four circulating bits in phase representation. Waveforms K and L of FIG. 6 illustrate respectively the clock and reference signals following a predetermined time of operation, denoted in this figure as $t=0$. Waveform M shows the signal input to oscillator 110. This waveform comprises a series of microwave pulses, the phase of the microwave signal in each pulse denoting the bit represented thereby. Thus, the first and third pulses bear an anti-phasal relationship with the reference signal and so represent binary 1's, whereas the second and fourth pulses bear a cophasal relationship with the reference signal and represent binary 0's. Consequently, the stored signal represents the binary number 1010. Each digital representation in the signal applied to oscillator 110 occurs in the first hald of a clock period. The phase of the oscillator output signal of waveform N is locked with that of the signal of waveform M, when pulses are present in waveform M. In the instant example the phase of waveform M changes for each pulse, and correspondingly the oscillator output signal of waveform N must alter its phase for each successive bit.

Consider the first binary 0 of waveform N. Immediately prior to the appearance of the signal representing this 0, the oscillator is operating 180° out-of-phase with the reference oscillator and is representing a binary 1. Upon application of the binary 0 pulse representation of waveform M to oscillator 110, the phase thereof is changed to correspond to that of the applied pulse. Thus, after a few cycles of oscillation the phase of oscillator 110 becomes stabilized in its new relationship with the reference signal, and represents a binary 1. The cycles during which the phase is changing are denoted as the regions of phase irregularity in waveform N. In these intervals of phase irregularity, the oscillator output signal does not provide useful digital representation. However, in the remainder of the clock period following the interval of irregularity, the phase is stabilized and useful for denoting the corresponding binary digit.

The storage element of FIG. 5 prevents a cumulative increase in the number of cycles of phase irregularity in each bit by providing that the total loop recirculation time is less than an integral number of clock periods by a small fraction of a clock period. This deviation allows the controllable amplifier 128 to suppress the irregular first portions of each stored bit. The total loop delay of a storage element in this example is $\tau - \Delta$, where $\tau =$ four clock periods and $\Delta$ represents approximately one-quarter clock period. For simplicity it is assumed that delay element 114 accounts for the entire loop delay. The delay of element 114 may be correspondingly decreased to compensate for any delay occurring in the remainder of the loop.

The next set of waveforms, O to R, illustrates the employment of the signal of waveform N after it has passed delay element 114, AND-gate 124 and OR-gate 126. At this time, the first portion of the signal of waveform N reaches amplifier 128 at time $t = \tau - \Delta$. Waveform O is similar to waveform N except delayed therefrom. Waveform P represents the clock signal from $t=\tau-\Delta$ to $t=2\tau-\Delta$. The clock signal is delivered to a terminal 129 for application to amplifier 128, such as to a control grid of the traveling-wave tube thereof, in order to periodically vary the amplifier gain. Sufficient traveling-wave tube control grid bias is supplied with the clock signal so that amplifier 128 only delivers an output signal during positive portions of the clock signal. The traveling-wave tube is cut off during negative clock signal portions. By comparing the clock signal of waveform P with the amplifier input signal of waveform O, it is seen that amplifier 128 passes only the middle portion of each digital signal applied thereto, and effectively suppresses the phase irregular front portion of each digital signal. Therefore, the output signal of amplifier 128, waveform Q, comprises a series of microwave pulses of proper phase to represent the corresponding binary digits. Each pulse of waveform Q commences without phase irregularity at the beginning of a clock period.

The oscillator output signal commencing after $t=\tau-\Delta$ is shown in waveform R. Waveform R depicts a signal similar to that of waveform N, which occurred four clock periods earlier. Waveform R has no more than the same small intervals of phase irregularity at the beginning of each clock period, those necessary for changing the phase of oscillator 110. The output signal of oscillator 110 following time $t=\tau$ is shown in waveform S. Comparing waveform S with waveform N, it is seen that the signals representing binary digital information recirculate in this storage element without degeneration of signal waveshape and without loss of overall time synchronism. The beginning of each bit continues to occur at the beginning of the corresponding clock period, and the microwave cycle, representing the necessary phase information, remains locked in phase with the signal of stabilizing oscillator 44. Furthermore, the normal saturation characteristic of oscillator 110 serves to provide an output signal of stable amplitude.

A signal representing the data stored in the storage element is taken from terminal 116. This signal is that shown as waveforms N and S. It has previously been shown that the information content of the data signals is determined by the occurrence of timing signals during the first half of the clock periods. If it is desired that the data signals delivered from the storage elements have no phase irregularities when the timing signals occur, a small time delay equal to $\Delta$ may be introduced between oscillator 110 and terminal 116, or between terminal 116 and the data processing system location where the information content of the data signals must be determined.

New data is entered into the storage element of FIG. 5 by applying data signals to one input terminal 131 of and AND-gate 132, and simultaneously a continuous signal at dominant frequency $F_1$ providing in phase representation a continuous train of binary 1's to the other input terminal 133 of AND-gate 132. During insertion of new data, a continuous signal providing in phase representation a continuous train of binary 0's is applied to terminal 125 of AND-gate 124. The signal train of 0's applied to terminal 125 inhibits recirculation of the stored data, and the signal train of 1's applied to terminal 133 allows insertion of new data into the storage element. After the new data has been entered, the signal train applied to terminal 125 is changed to represent binary 1's and the new data is stored by recirculation.

The storage element may be cleared, as during starting procedure, by temporarily closing switch 135, thereby connecting an input terminal 136 to the storage element. A large signal from reference oscillator 40, representing continuous binary 0's, is applied to terminal 136 and serves to override all data signals stored in the circuit, thereby forcing oscillator 110 to oscillate continuously in phase with reference oscillator 40.

INTERSPERSED BITS

In the preceding description of a storage element, useful in many components of the embodiment of this invention, the gain in the recirculation loop is provided by a traveling-wave tube amplifier because of its ability to amplify microwave signals over a broad frequency range. A storage element of this type is contemplated for storing the carry and borrow digits in the respective arithmetic operations of addition and subtraction and in other uses to represent an analog of a flip-flop. (A conventional flip-flop is a single bit storage device having two stable states of operation, each stable state representing a respective one of the binary digit values. The loop-type storage element herein employed is termed a "flip-flop analog" since although it stores binary digital information and each portion thereof operates at any moment in one of two allowable states, its storage capacity is flexible, usually being more than one bit.) However, it has also been mentioned earlier that the delay time of present-day traveling-wave tubes prevents straightforward addition or subtraction of two serial binary digital numbers wherein the digits appear in successive clock periods, since the stored carry or borrow digits are not available until several clock periods after they are inserted into the storage elements.

Consider the exemplary embodiment wherein each clock period has a duration of 2 millimicroseconds. One traveling-wave tube useful for the storage elements is the General Electric Company's Z–5082 traveling-wave tube. This tube will amplify microwave signals in the frequency range of 7.5–11.3 kilomegacycles with a power gain of no less than 20 db. The Z–5082 has a time delay between input and output couplers of somewhat less than 8 millimicroseconds. Thus, the minimum time delay around the loop of a storage element using the Z–5082 is approximately 8 millimicroseconds, even though the delay element is eliminated. A carry digit signal inserted into this storage element would not be available for use until four clock periods after insertion and, consequently, bits of all information words should appear sequentially no more often than every fourth clock period. In accordance with the principles of this invention, most efficient use is made of the otherwise idle circuits of the system in those clock periods intervening between bits of an information word by interspersing therebetween bits of other information words. Words whose bits are so interspersed may be said to be "multiplexed."

In the embodiment of this invention the respective signals representing four information words are temporally interspersed for all instructions and operands. Each word is expressed in the serial mode with the 32 bits thereof occurring sequentially every four clock periods. Signals representing respective bits of four different words appear sequentially, in predetermined order, in each group of four successive clock periods. The manner in which four different words are multiplexed in this computer is shown in FIG. 7.

The timing bits sample the formation content of the data signals at the proper time in each clock period. Since 128 clock periods occur in a timing period, 128 data signals appear in this interval, and 128 timing bits are emfour timing bits determine the information content of the the data signals in all clock periods. The first four timing bits determine the informaiton content of the least significant bit of each of the four multiplexed words, the next four timing bits determine the information content of the next significant bit of each of the four multiplexed words, etc. The first occurring bits in each successive group of four clock periods comprise one of the multiplexed words, and the corresponding 32 clock periods are defined as the first "time domain." In a similar manner the second, third and fourth time domains are identified. Thus, the information words appearing in the first to fourth time domains of FIG. 7 are respectively 101 . . . 110, 001 . . . 011, 010 . . . 100, and 110 . . . 001. In FIG. 3, five information bits are shown in waveform A; the first two bits of the word in the first time domain are 1 0, and the first bits of the words in the second, third and fourth time domains are respectively 0, 1, and 1

As described in reference to FIG. 4, the 32 timing bits employed to determine the information content of each word are designated by the 32 letters $a$ to $z$ and $\alpha$ to $\zeta$. The four timing bits of like letters employed to identify bits of the same order of significance in all four multiplexed words are distinguished by the subscript 1 to 4 in accordance with the time domain in which they occur. Referring again to FIG. 3, each timing signal actually comprises all timing bits corresponding to a particular digital order to be determined. Thus, the timing signals designated $a_1$, $a_2$, $a_3$, $a_4$, for determining the least significant bits of the data signals, actually appear sequentially in one signal. Hence, 32 timing signals are employed, one for each bit order of the information words, and each timing signal contains four signals representing binary 1's in four successive clock periods.

FUNCTIONAL DESIGN

The action of the computer consists of a series of elemental operations performed on the word in the accumulator and determined by one instruction word. Instructions are usually executed in the sequence in which they are read from memory 10. An instruction is transferred from memory 10 to control unit 18. The complete instruction enters the instruction register 20, the order portion enters the order register 26, the operand designation address part enters the operand address register 24, and the next instruction designation address part enters the next-instruction address register 22. In the manner described previously, this instruction and the various portions thereof are stored in multiplexed manner in corresponding time domains of each of the above-mentioned registers.

Another register, accumulator 14, holds an operand in each time domain, each of these operands usually being the result of the last arithmetic or logical operation in that domain. In an arithmetic operation, an operand held in the accumulator is combined with an operand read from memory 10 or from another time domain of the accumulator. The latter type of arithmetic operation is one procedure by which the embodiment of this invention provides communication between the various time domains of the system.

Orders

Six elementary operations may be performed by this computer invention embodiment. These operations are described in Table I, as follows.

TABLE I.—OPERATION LIST

| Code | Order | Operation |
| --- | --- | --- |
| 000 | Fetch | Clear accumulator 14 and insert in it the contents of a designated location. The designated location may be a cell of memory 10, apparatus 28, or a different time domain of the accumulator. |
| 010 | Add | Add contents of a designated location to the contents of accumulator 14 and retain the sum in the accumulator. The designated location may be a cell of memory 10 or a different time domain of the accumulator. |
| 110 | Subtract | Subtract contents of a designated location from the contents of accumulator 14 and retain the difference in the accumulator. The designated location may be a cell in memory 10 or a different time domain of the accumulator. |
| 100 | Extract | Clear the contents of accumulator 14 to zero in those bit positions occupied by zeros in the word of a designated location. The designated location may be a cell in memory 10 or a different time domain of the accumulator. |
| 101 | Store | Transfer the contents of accumulator 14 to a designated location. The designated location may be a cell of memory 10 or output apparatus 30. |
| 001 | Branch | Test the contents of accumulator 14 for a negative number. Obtain a new instruction in the next timing period if a negative number is detected. |

Normally, each of these operations is controlled by an instruction occupying the same time domain as the operand on which the operation is being performed. In a given timing period a different operation may be executed simultaneously in each time domain.

The order code shown in the first column of Table I, is contained in the last three bits of the order portion of the instruction. The first three bits of the order portion convey additional information concerning the manner in which the order is to be performed and represent one of the following: (1) the time delay necessary to shift a word entering the arithmetic unit 12 from one time domain to another or the delay necessary to double a word entering the arithmetic unit, (2) the time advance necessary to shift a word leaving accumulator 14 from one time domain to another, or (3) the time domain of a word in the accumulator on which a branch order is to be executed and its relationship to the time domain of the corresponding instruction.

Figure 8:
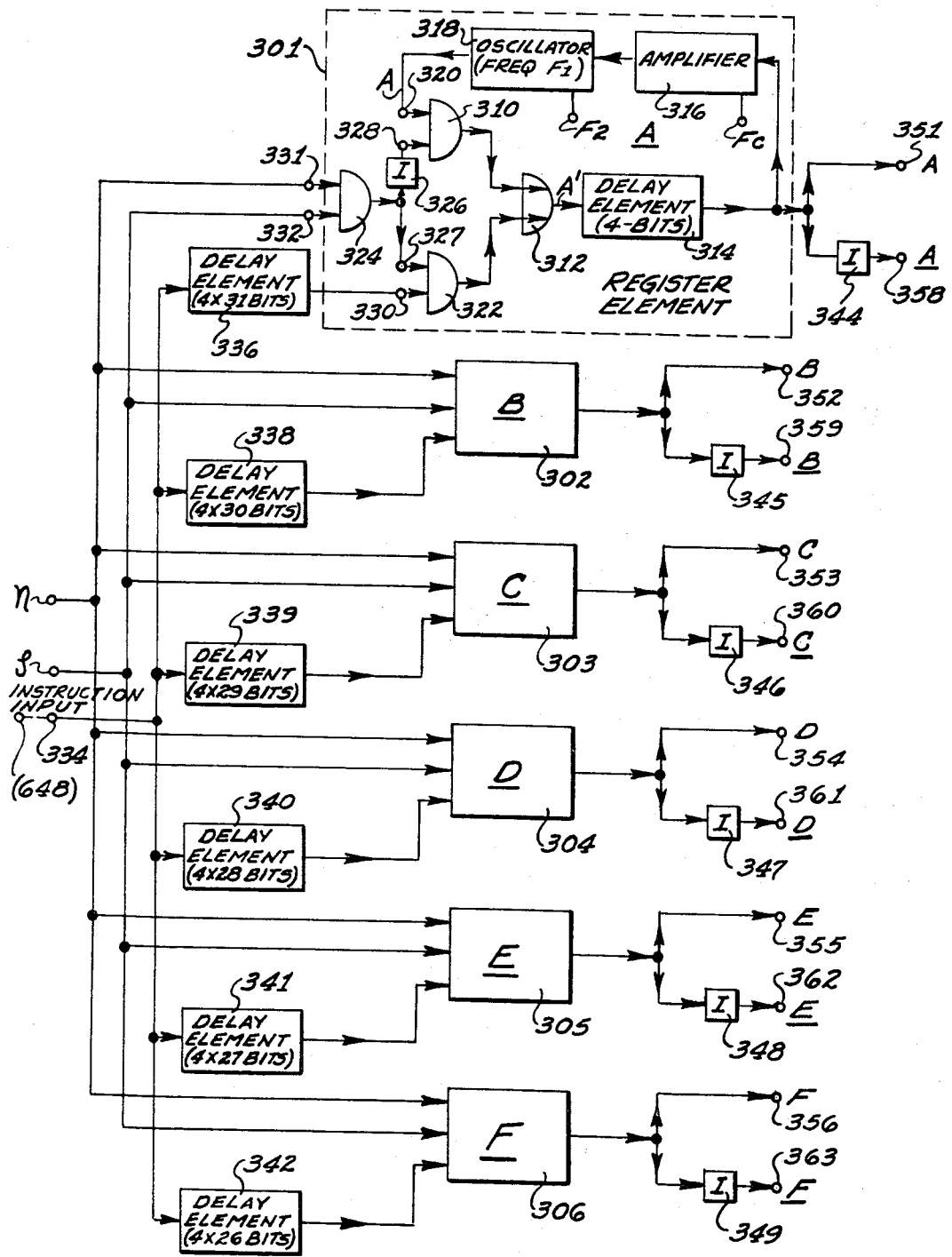
FIGURE 8 is a block diagram of the order register.

The six bits of the instruction order are stored respectively in the six analog flip-flops of order register 26, designated respectively as register elements A to F (FIG. 8). The content of each analog flip-flop will be denoted by the corresponding letter. An underscored letter presents the inverse or NOT of the flip-flop content. For example, if flip-flop B stores a binary 1, the letter B represents a 1, and $\underline{B}$ a 0. Conversely, if flip-flop B stores a binary 0, the letter B represents a 0, and $\underline{B}$ a 1.

The Boolean algebraic equations indicative of the operation to be performed are derived as a logical combination of the letters denoting the contents of the applicable register elements. For an interpretation of the equations and logical notations of Boolean algebra, reference may be made to R. K. Richards, "Arithmetic Operations in Digital Computers," D. Van Nostrand Company, Inc., Chap. 2; 1955. Logical relationships between the contents of register elements D, E and F of order register 26 and the corresponding orders they represent are given in Table II as follows:

TABLE II

| Register Logic | Order |
| --- | --- |
| $\underline{D}$ $\underline{E}$ F | Fetch |
| $\underline{D}$ E $\underline{F}$ | Add |
| D E $\underline{F}$ | Subtract |
| D E F | Extract |
| D $\underline{E}$ $\underline{F}$ | Store |
| $\underline{D}$ E F | Branch |

The "product" arrangement of the three symbols in Table II indicates the logical operation of AND. This logical operation yields a binary 1 only if all the elements thereof have the value 1. Thus, the logical operation of branch is indicated if $D=0$, $E=0$, and $F=1$.

States

Several states of operation of the computer are distinguishable. Various sequences of these states may occur while any particular instruction remains in the instruction register. However, the computer does not operate in any one state more than once for a particular instruction. These states are as follows:

*State 1.*—The computer is waiting to execute the order specified by the instruction. The length of this state is determined by the operand designation delay number. This delay number, expressed in binary digital form, is equal to the number of timing periods which must elapse after the instruction has entered instruction register before the order is to be executed. For example, if the delay number represents the decimal number 9, the order will be executed during the tenth timing period after the instruction has entered the instruction register. If the delay number represents a decimal 0, the order will be executed in the timing period immediately following that in which the instruction entered the instruction register.

*State 2.*—The computer is executing the order. One of the six orders designated in Table II is being executed. The execution is completed during a single timing period.

*State 3.*—The computer is waiting to obtain the next instruction. The length of this state is determined by the next-instruction designation delay number. This delay number, expressed in binary digital form, is equal to the number of timing periods which must elapse after the instruction has entered the instruction register before the next instruction is to be obtained.

*State 4.*—The computer is obtaining the next instruction. During this state, which is completed during a single timing period, a new instruction is entering the instruction register. Simultaneously, portions of the instruction are entering the order register 26, the operand address register 24, and the next-instruction address register 22.

*State 5.*—The computer is simultaneously executing the order specified by the instruction and is obtaining the next instruction. This state is completed during a single timing period. This state is entered when both the operand designation delay number and the next-instruction designation delay number are identical.

The computer enters States 1 and 3 simultaneously. Inasmuch as the delay number of the operand designation is generally smaller than that of the next-instruction designation, State 2 will be entered when State 1 is ended, while State 3 continues. When State 2 is completed, the computer remains only in State 3. At the end of State 3, the computer enters State 4. When the two delay numbers are identical, the computer leaves States 1 and 3 simultaneously and enters State 5. It should be noted that the operation state and sequence is generally independent for each time domain.

TIMING CIRCUITS

Circuits will now be described which are employed for generating the timing trigger signal and the timing signals shown in FIG. 3. The timing trigger signal occurs once every timing period. The timing period is equal in duration to the time occupied by 128 successive bits, or 256 millimicroseconds. The timing trigger signal initiates the generation of the 128 timing bits which control the operation of the computer These 128 timing bits form 32 timing signals of 4 timing bits each.

Figure 9:
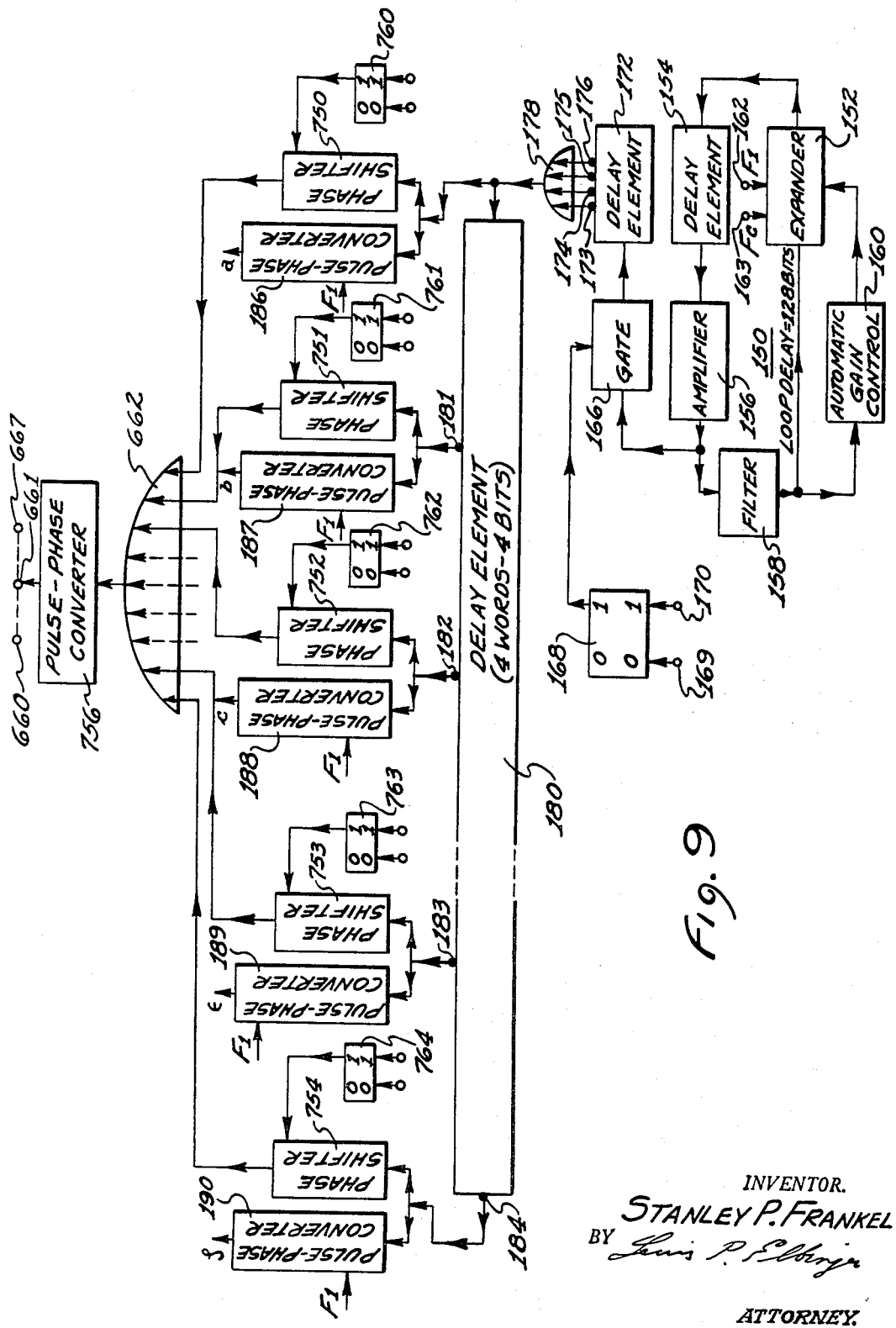
FIGURE 9 is a block diagram of the timing and input circuits.

The timing trigger signal is generated in a recirculating loop 150 of FIG. 9. Loop 150 is formed by connecting in series an expander 152, a delay element 154, an amplifier 156, and a filter 158. An automatic gain control 160 samples the amplitude of the circulating signals and in response thereto controls the amplitude of the output signal provided by an expander 152. A similar recirculation loop for generating repetitively a microwave pulse is described by C. C. Cutler, "The Regenerative Pulse Generator," Proc. I.R.E., vol. 43, pages 140–148; February 1955.

Loop 150 is a type of oscillator, which is started by amplification of noise signals, but which by regenerative and limiting processes finally produces a pulse which recirculates indefinitely, at each traversal giving a response at a desired output terminal. Amplifier 156 may be a traveling-wave tube amplifier, and provides the necessary loop gain for regeneration of a circulating signal. Delay element 154 provides the necessary total loop delay so that the generated pulse recurs at the desired repetition rate. In loop 150, the length of delay element 154 is designed so that the total loop delay is equal to 256 millimicroseconds. The bandwidth of filter 158 controls the pulse length desired. In this instance, the desired pulse length is approximately 1 millimicrosecond. The center frequency of the filter bandpass characteristic is determined by the basic microwave frequency of the pulse; in this instance, 10,000 megacycles. Expander 152 provides more gain for a high-level signal than for a low-level one. The aforementioned Cutler article describes an expander useful in loop 150. Another expander useful in this application is described in U.S. patent application Ser. No. 725,338, by M. P. Forrer, filed Mar. 31, 1958, now U.S. Patent 3,037,168, and assigned to the assignee of the instant application.

Automatic gain control 160 responds to the amplitude of the pulse to maintain a loop gain of unit for the pulse. The time constant of automatic gain control 160 is long with respect to the pulse length, serves to limit the pulse amplitude, and thus creates a stable operating point. Because of the nonlinear action of expander 152, the saturating characteristics of the traveling-wave tube amplifier 156, and the action of the automatic gain control 160, only one pulse can circulate about the loop. All other signals which would otherwise tend to grow as a result of noise injected into the circuit will be suppressed because the loop gain for these signals is less than unity.

The phase of the circulating microwave pulse is locked with that of the reference signal, by application of the reference signal to expander 152 through a terminal 162 thereof. The leading edge of the circulating pulse is locked in synchronism with the clock signal, which is applied to a terminal 163 of expander 152.

A portion of the timing trigger signal circulating in loop 150 is applied to an input terminal of a gate 166. Gate 166 is normally open during operation of the computer. This gate is controlled by the output signal of a flip-flop 168. Flip-flop 168 may be of a conventional type, such as is formed by transistor or vacuum tube circuits. In normal operation flip-flop 168 is in its unity state; that is, it delivers an output signal at its digital 1 output terminal. This signal is applied to and maintains open gate 166. Gate 166 may be, for example, a traveling-wave tube amplifier, wherein the microwave timing trigger signal of loop 150 is applied to the input coupler thereof, and wherein gating control is provided by applying the output signal of flip-flop 168 to a control grid thereof.

The output terminal of gate 166 is coupled to an input terminal of a delay element 172. Delay element 172 is provided with four equispaced output taps therealong, taps 173, 174, 175, and 176. Taps 173–176 are spaced from each other along delay element 172 by the distance a microwave signal propagates therealong in 2 millimicroseconds. Thus, whenever a timing trigger signal is applied to delay element 172, four similar microwave pulses of one millimicrosecond duration will appear at the respective taps 173–176 spaced at intervals of 2 millimicroseconds.

Taps 173–176 are connected to an OR-gate 178. An OR-gate suitable for operation with microwave signals denoting binary digits by pulse-no pulse representation is described hereinafter. The output signal of OR-gate 178 is a group of four microwave pulses, which recurs every 256 millimicroseconds, and within which the pulses are spaced at intervals of 2 millimicroseconds. It is this group of four pulses which determines the timing of the computer.

The positions of taps 173–176 along delay element 172 are adjusted so that the microwave cycles of the pulses leaving OR-gate 178 are 180° out-of-phase with respect to the cycles of the reference signal, and, consequently, the group of pulses represents four binary 1's.

The interrelationship of the timing signals is shown symbolically in FIG. 10. The timing signals are identified by the top row letters. In this figure, time increases toward the left in order to correspond with FIGS. 4 and 7, which show the order of occurrence of the information bits from right to left. The small crosses in the row immediately under the top row of letters denote the occurrence of timing trigger signals. Each of the remaining small crosses denotes the occurrence of a pulse employed in generating the timing signals. Each pulse so denoted generates the corresponding timing signal of the top row. FIG. 10 illustrates that the timing trigger signal occurs prior to the occurrence of the timing signals designated by the letter

*a*. Since the sole function of the timing trigger signal is to generate the timing signals which follow, the requirement on the interval which occurs between the generation of the timing trigger signal and the generation of the timing signals *a* is that the microwave cycles must all bear a predetermined phase relationship with the reference signal cycles. Timing signals *a* occur simultaneously with the group of four pulses delivered by OR-gate 178 and mark the least significant bits of the four multiplexed information words.

The output signal of OR-gate 178 is applied to the input terminal of a delay element 180, which has a length equal to the distance traveled by a microwave signal therein in an intermal of four words less four bits, or 248 millimicroseconds. Delay element 180 is provided with 31 equispaced output taps therealong, such as taps 181, 182, ..., 183, and 184. The appearances of the pulse group delivered by OR-gate 178 at each of the taps of delay element 180 serve to generate successive timing signals. Successive taps are spaced apart along delay element 180 by the distance a microwave signal propagates therealong in 8 millimicroseconds, or during four bits. Thus, a group of four pulses appears at tap 181 eight millimicroseconds after the first pulse of the corresponding group leaves OR-gate 178. This group of four pulses corresponds to the timing signals *b* in FIG. 10. Similarly, groups of four pulses appear at sequential taps along delay element 180 at intervals of 8 millimicroseconds. The last group of four pulses delivered by delay element 180 appears at tap 184 and represents the timing signals *ƒ*.

The signals so far described as being generated by the timing circuits correspond to binary digital information in the pulse-no pulse representation which was previously defined. In order that these signals are useful in the operation of this invention, they must be converted to the phase representation, such as shown in FIG. 3. Consequently, each timing pulse signal is converted into a microwave signal 180° out-of-phase with the reference signal for the duration of the pulses, and in phase with the reference signal during the absence of pulses. To accomplish this conversion of digital representation, pulse-phase converters 186, 187, 188, ..., 189, and 190 are provided. These converters are devices for translating microwave signals denoting binary data by the pulse-no pulse representation to microwave signals denoting the same binary data by the phase representation. The input terminal of pulse-phase converter 186 is connected directly to the output terminal of OR-gate 178. A pulse-phase converter is connected to each of the taps of delay element 180. For example, pulse-phase converters 187, 188, ..., 189, and 190 are connected respectively to taps 181, 182, ..., 183, and 184. When a continuous input signal representing a train of binary 0's in phase representation is applied to each pulse-phase converter, a pulse-no pulse representation signal applied thereto is converted to a corresponding signal bearing the phase representation of the digital information. A converter of this type is described hereinafter. Thus, the output signals provided by the pulse-phase converters of FIG. 9 denote in phase representation the timing signals *a* to *ƒ* described in FIG. 10.

INSTRUCTION REGISTER

Instruction register 20 and circuits associated therewith will now be described. The instruction register and these associated circuits have three primary functions: (1) to store multiplexed instructions, (2) to provide signals in the proper time domains for initiating the execution of the orders contained in the instructions, and (3) to provide signals in the proper time domains for initiating transfer of new instructions into the instruction register.

Insruction register 20, shown in FIG. 11, is a storage element of the type shown in FIG. 5, and previously described. The instruction register is adapted to store by recirculation four multiplexed instruction words, comprising a total of 128 information bits. Instruction register 20 comprises the following elements, connected in series to form a recirculation loop: AND-gate 201, OR-gate 203, count-down logical circuit 205, delay element 206, amplifier 207, and oscillator 208. The total loop delay time is 128 bits in duration. Thus, the loop will store four instruction words in multiplexed manner. Each stored bit recurs during recirculation at any point in the loop every 256 millimicroseconds. Data is caused to recirculate in instruction register 20 by applying a continuous signal at frequency $F_1$, providing in phase representation a continuous train of binary 1's, to one input terminal 209 of AND-gate 201, the stored data signals being applied to the other input terminal thereof. New data is inserted into the instruction register by applying data signals to one input terminal 210 of an AND-gate 211, and simultaneously a continuous signal representing a continuous train of binary 1's to the other input terminal 212 of AND-gate 211. During insertion of new data, a continuous signal representing a continuous train of binary 0's is applied to terminal 209 of AND-gate 201, to inhibit recirculation of the stored data. The continuous trains of 1's or 0's applied to terminals 209 and 212 are independently controllable in each time domain, so that data may be recirculated or new data entered into the instruction register independently in each time domain.

When the signal train applied to terminal 209 represents binary 0's, the train applied to terminal 212 represents binary 1's and vice versa. This is accomplished by connecting the source of these signals through a terminal 214 directly to terminal 212 and to terminal 209 through an inverter 216. Inverter 216 performs the logical NOT operation, or inversion, on signals applied thereto. If the input to an inverter is a binary 1, the output is a binary 0, and if the input is a binary 0, the output is a binary 1. Consequently, the same type of binary digit applied to terminal 214 is also applied to terminal 212, and the opposite type of binary digit is applied simultaneously to terminal 209.

An inverter may be formed by several methods in microwave circuits. For example, an additional delay may be introduced in the particular wave transmission element by increasing its length by an amount equal to the distance a wave travels therein during one-half cycle of the microwave frequency. In this manner, a wave traveling therethrough arrives at the end of the transmission element 180° out-of-phase with a wave passing through the corresponding transmission element without the additional extension. Inversion may also be accomplished by physically inverting the polarized electromagnetic wave traveling along the transmission element. For example, a rectangular waveguide may be twisted through 180°. This latter form of inversion is equivalent to reversal of electrical leads at low frequencies.

The logical equation representing the conditions under which data is recirculated in, or new data is inserted into, the loop is given by (1) $$G' = \underline{V}G + VM$$

In the above and the logical equations to follow, capital letters represent the information content of data signals and, therefore, represent the content of the storage elements delivering these signals. Each letter represents the complete binary digital content of the data signal and, therefore, may represent a binary digital word, in the instance of a data signal stored in the instruction register, or may represent a single bit in the instance of data signals stored in registers of small capacity. The underscored capital letter represents the inverse of the underscored letter. For example, if $G=1$, $\underline{G}=0$, and vice versa. As described previously, the "product" arrangement of symbols indicates the logical operation of AND. The "sum" arrangement of symbols represents the logical operation of OR. The letter G is used here to represent the contents of the instruction register as recirculated and applied to one terminal of AND-gate 201. G' represents the output signal of OR-gate 203 and, therefore, represents the data which is to circulate in the loop for at least a full timing period. The letter M represents the new instruction to be inserted into the instruction register at terminal 210. Since this new instruction usually enters from memory 10, it bears the letter symbol which will be used to represent a word stored in the memory. The symbol V represents the control signal applied to terminal 214. This control signal comprises a train of like bits for each complete timing period. The expression $\underline{V}G$ of Equation 1 represents the logical function performed by AND-gate 201. If $V=0$, this expression equals 1 whenever $G=1$ and, therefore, represents the condition under which data is recirculated in the loop. If $V=1$, the expression VM equals 1 whenever $M=1$ and, therefore, represents the condition for the entry of a new instruction into the instruction register. Since either $\underline{V}$ or V is always 0 for a complete timing period, only one of the two AND-gates 201 and 211 is delivering data in any given timing period. The two logical operations of AND performed by gates 201 and 211 are combined in OR-gate 203 and represented by the "sum" form of the equation.

*Delay number count-down*

The methods by which the circuits associated with the instruction register accomplish the functions of providing signals for initiating the execution of the orders contained in the instructions and for initiating transfer of new instructions into the instruction register will now be described. These associated circuits accomplish these two functions by subtracting 1 from both instruction delay numbers in each timing period, and by providing a signal to indicate when a delay number becomes negative. The quantity 1 is subtracted from both of the operand designation and next-instruction designation delay numbers each time they circulate about the loop of instruction register 20 by means of count-down logical circuit 205 in cooperation with K-register 230.

Count-down circuit 205, FIG. 11, comprises a pair of AND-gates 220 and 222 having their respective output terminals connected to an OR-gate 224. The output terminal of OR-gate 224 is connected back to one input terminal of AND-gate 201 to complete the recirculation loop of instruction register 20. One input terminal of AND-gate 220 is conected to receive the output signal of OR-gate 203. The other input terminal of AND-gate 220 is connected to receive the output signal of K-register 230 as inverted by an inverter 226. One input terminal of AND-gate 222 is conected to receive the output signal of OR-gate 203 as inverted by an inverter 228. The other input terminal of AND-gate 222 is connected to receive the output signal of K-register 230.

K-register 230 is a storage element of the type shown in FIG. 5 and previously described. It is an analog flip-flop element in that it is adapted to store by recirculation one bit for each time domain, or a total of four bits. K-register 230 comprises the following elements, connected in series to form a recirculation loop: AND-gate 232, OR-gate 234, delay element 236, amplifier 238, and oscillator 240. The total loop delay time is four bits in duration. Each stored bit recurs during recirculation at any point in the loop every 8 millimicroseconds. One input terminal of AND-gate 232 is employed in the recirculation loop and the other input terminal is connected to the output terminal of inverter 228. In addition to the output terminal of inverter 228. In addition to the output terminal of AND-gate 232 being conected to one input terminal of OR-gate 234, the output terminal of an OR-gate 242 is connected to another input terminal of OR-gate 234. OR-gate 242 is provided with input terminals 244 and 246. Input terminal 244 is connected to receive timing signals $f$, and input terminal 246 is adapted to receive timing signals $s$.

The operation wherein the binary digital delay number is reduced by 1 in each timing period is executed as follows: The signal representing the least significant digit of the delay number is inverted; if the least significant digit is a 0, the signals representing all succeeding 0's immediately following the least significant digit zero signal are inverted; the signal representing the lowest order digit 1 is inverted; all signals following the lowest order 1 are passed through the count-down circuit unchanged. The effect of such operation is to subtract 1 from a delay number by adding the complement of 1 each time the number recirculates through the count-down circuit.

The logical equation representing the operation of the count-down circuit 205 in reducing the delay number by 1 is given by (2) $\qquad G^{*\prime} = \underline{K}'G' + K'\underline{G}'$ In the above equation G' represents the input signal to count-down circuit 205 and $G^{*\prime}$ represents the output signal thereof. $G^{*\prime}$ differs from G' by the value 1 K' represents the output of K-register 230. Equation 2 describes an operation wherein so long as K-register 230 provides an output signal representing a binary 1, the output of the count-down circuit will be the inverse of the input thereto (i.e. $K'\underline{G}'$). Thus, the K-register must provide output signals representing 1's coincident with the signals representing the least significant digit of each delay number, with all succeeding 0's immediately following the least significant digit when it is a 0, and with the lowest order 1. The output signal of the K-register must represent binary 0's following the lowest significant 1 (i.e. $\underline{K}'G'$).

A binary 1 is inserted into the K-register through OR-gate 242 in all four time domains by timing signals $f$ and $s$. Timing signals $f$ and $s$ immediately precede the corresponding least significant digit signals of both delay numbers of the instruction (FIG 4). Timing signals $f$ and $s$ are delayed in element 236, and the K-register provides output 1's to the count-down circuit simultaneously with the arrival thereto of the least significant digits of the delay numbers. If the least significant digit of a delay number is a 0, the application of its inverse by inverter 228 to AND-gate 232 allows the binary 1 signal at the output of the K-register to recirculate again. Each next succeeding binary 0 in the delay number allows another recirculation of the binary 1 stored in the K-register, and the consequent continued inversion of the delay number digits passing through AND-gate 222 of the count-down circuit. Upon arrival of the lowest significant binary 1 of the delay number, recirculation in the K-register is inhibited at AND-gate 232, so that the K-register output of the corresponding time domain remains 0 for the duration of that particular passage of the delay number through the count-down circuit. Consequently, the remainder of the digits of the delay number pass through AND-gate 220 and appear at the output of the count-down circuit in their original form. The logical equation representing the conditions of operation of the K-register is given by (3) $\qquad K' = f + s + K\underline{G}'$ In the above and the logical equations to follow, lower case letters and the Greek letters $\alpha$ to $\zeta$ represent the information content of timing signals. For example, the symbol $a$ in an equation represent 1 only in the first four clock cycles of a timing period. Equation 3 illustrates that K' can be 1 only immediately after insertion of timing signals $f$ or $s$ to the K-register, or if $G'=0$, when the K-register is circulating a 1 (i.e. $K\underline{G}'$). If a particular delay number has become zero or is inserted into the instruction register as a zero, it becomes equal to a negative number when it passes through the count-down circuit. When a delay number having all zero bits passes through the count-down circuit, the output thereof has all 1 bits and the K-register will continue to circulate a binary 1 in the clock period of the corresponding time domain following the most significant digit of the delay number. The output signal of the K-register can thus be sampled in the clock period following that of the most significant digit of the delay number, and if it represents a binary 1 the delay number has become negative. Thus, if either the operand designation delay number or the next-instruction designation delay numbers are zero when entering the count-down circuit, the K-register will provide a binary 1 at its output terminal 248 simultaneously with the corresponding timing signals $n$ and $\alpha$.

Control signal generation

A pair of circuits will now be described which respond to the output signal provided by K-register 230 to produce control signals for initiating the execution of orders and for initiating transfer of new instructions into the instruction register.

A register 250, FIG. 11, designated as the U-register, in cooperation with a delay element 251 provides a control signal for initiating the execution of an order. U-register 250 is an analog flip-flop similar in operation to the previously described K-register 230, and is adapted to store by recirculation one bit for each time domain. U-register 250 comprises the following elements, connected in series to form a recirculation loop: AND-gate 252, OR-gate 254, delay element 256, amplifier 258, and oscillator 260. The total loop delay time is four bits in duration. Each stored bit recurs at any point in the loop every 8 millimicroseconds. One input terminal of AND-gate 252 is employed in the recirculation loop and the other input terminal 261 is connected to receive the inverse of timing signals $n$. In addition to the output terminal of AND-gate 252 being connected to one input terminal of OR-gate 254, the output terminal of another AND-gate 262 is connected to the other input terminal of OR-gate 254. AND-gate 262 is provided with input terminals 263 and 264. Input terminal 263 is connected to receive the timing signals $n$. Input terminal 264 is connected to receive the output signal of K-register 230 through an OR-gate 266.

New data is inserted into the U-register only when a timing signal $n$ occurs. The inverse of timing signals $n$ is applied to terminal 261 of AND-gate 252 and clears the register in all four time domains. Simultaneously AND-gate 262 is opened by timing signals $n$ and new data signals are admitted to the U-register. As has previously been described, only when the operand designation delay number is zero in a particular timing period does K-register 230 provide a digital 1 at its output terminal 248 at the time of occurrence of timing signal $n$. Therefore, a binary 1 enters a given time domain of the U-register only in the word period in which the operand designation delay number for that time domain is changed from zero to a negative value by count-down circuit 205.

The logical equation representing the operation of U-register 250 is given by (4) $\quad U' = \underline{n}U + nK'$ In the above equation U represents the signal being recirculated by the U-register and applied to AND-gate 252. The signal denoted by U is also available at output terminal 267. U' represents the new signal stored in the U-register, as available at the output terminal of OR-gate 254. The first portion to the right of the equality sign, $\underline{n}U$, is the condition for recirculation. The second portion $nK'$ is the condition for insertion of new data. U-register 250 thus stores a single bit of data for a duration equal to one timing period, i.e. the interval occurring between two successive timing signals $n$. At the end of this time recirculation of the U-register contents is blocked.

The output signal of U-register 250 is applied to delay element 251, where it experiences a suitable delay and is extracted at a pair of terminals 269 and 270. Terminal 270 is connected to a tap located along delay element 251 such that a binary 1 signal entered into the U-register at AND-gate 262 at the time of occurrence of a timing signal $n$ will first appear at terminal 270 at the time of occurrence of a timing signal $a$ in the next following timing period. Inasmuch as a particular binary 1 recirculates in the U-register for a duration equal to one timing period, a corresponding binary 1 will be provided at terminal 270 for the next full timing period from timing signal $a$ to timing signal $\zeta$ in a given time domain. The output signal of terminal 270, designated as control signal $\theta$, is available throughout the computer for initiating the execution of all orders except the branch order. An earlier occurring signal, designated as control signal $\phi$, and provided by terminal 269, is the control signal for initiating the branch order.

A register 275, designated as the V-register, in cooperation with a delay element 276 provides a control signal for initiating transfer of a new instruction into the instruction register. V-register 275 is an analog flip-flop similar to the previously described K-register 230, and is adapted to store by recirculation one bit for each time domain. V-register 275 comprises the following elements, connected in series to form a recirculation loop: AND-gate 277, OR-gate 279, delay element 281, amplifier 283 and oscillator 285. One input terminal of AND-gate 277 is employed in the recirculation loop and the other input terminal 286 is connected to receive the inverse of timing signals $\alpha$. In addition to the output terminal of AND-gate 277 being connected to one input terminal of OR-gate 279, the output terminal of another AND-gate 287 is connected to the other input terminal of OR-gate 279. And-gate 287 is provided with input terminals 288 and 289. Input terminal 289 is connected to receive the timing signals $\alpha$. Input terminal 288 is connected to receive the output signal of K-register 230 through OR-gate 266.

New data may be inserted into the V-register only when timing signals $\alpha$ occur. The inverse of timing signals $\alpha$ is applied to terminal 286 of AND-gate 277 and blocks recirculation of the register contents in all four time domains. Simultaneously AND-gate 287 is opened by timing signals $\alpha$ and new data signals may be admitted to the V-register. A binary 1 enters a given time domain of the V-register in the word period in which the next-instruction designation delay number for that time domain is changed from zero to a negative value by count-down circuit 205.

The logical equation representing the operation of V-register 275 is given by (5) $\quad V' = \underline{\alpha}V + \alpha K' +$ In the above equation V represents the signal being recirculated by the V-register and applied to AND-gate 277. The signal denoted by V is also available at an output terminal 291. V' represents the new signal stored in the V-register, as available at the output terminal of OR-gate 279. V-register 275 thus stores a single bit of data for a duration equal to one timing period; i.e., the interval occurring between two successive timing signals $\alpha$. At the end of this time recirculation of the V-register contents is blocked. The dangling plus sign at the end of Equation 5 indicates that the generation of the V' signal is dependent on further factors, to be described later.

The output signal of V-register 275 is applied to delay element 276, where it experiences as suitable delay and is extracted at a terminal 293. Terminal 293 is connected to a tap located along delay element 276 such that a binary 1 signal entered into the V-register at AND-gate 287 at the time of occurrence of a timing signal $\alpha$ will first appear at terminal 293 at the time of occurrence of a timing signal $a$ in the next following timing period. Inasmuch as a particular binary 1 recirculates in the V-register for a duration equal to one timing period, a corresponding binary 1 will be provided at terminal 293 for the next full clock period from timing signal $a$ to timing signal $\zeta$ in a given time domain. The output signal of terminal 293, designated as control signal $\eta$, is available for initiating transfer of a new instruction into instruction register 20 by the connection of terminal 293 to terminal 214 of the instruction register.

A summary of the operations occurring in the apparatus of FIG. 11 when a new instruction is to be transferred into the instruction register will now be given. In each timing period in which the next-instruction designation delay number is changed from zero to a negative value by countdown circuit 205, K-register 230 delivers a signal representing a digital 1 at its output terminal 248 at the time of occurrence of timing signals $\alpha$. This signal is admitted to V-register 275 and circulates therein for a duration equal to one complete timing period. During the following timing period, signals representing binary 1's are delivered in each clock period of the proper time domain by terminal 293 of delay element 276. The inverse of the signals provided by terminal 293 are applied to AND-gate 201 of instruction register 20 and serve to inhibit the signals circulating therein. Simultaneously the signals of terminal 293 are applied directly to AND-gate 211 and allow the entry of a new instruction. This new instruction entering at terminal 210 of AND-gate 211 is provided by a cell of the memory 10 or by input apparatus 28, in accordance with the information previously stored in the next-instruction address register 22.

CONTROL REGISTERS

While a particular instruction is circulating in instruction register 20, the order portion remains stored in order register 26, the operand designation address part remains stored in operand address register 24, and the next-instruction designation address part remains stored in next-instruction address register 22. When a new instruction is inserted into the instruction register, the corresponding portions thereof are also inserted in registers 22, 24, and 26.

Order register

Order register 26, FIG. 8, stores the six bits of the order portion of the instruction in the respective register elements 301, 302, 303, 304, 305, and 306. These register elements are designated respectively A–F, to correspond to the particular bits of the instruction word stored therein. Thus, for example, register element A stores the first bit of the instruction, register element B stores the second bit of the instruction, etc. Inasmuch as register elements A–F are substantially identical, only one is illustrated in detail in FIG. 8.

Register element 301 is an analog flip-flop similar to the previously described K-register 230, and is adapted to store by recirculation one instruction bit for each time domain. Register element 301 comprises the following elements, connected in series to form a recirculation loop: AND-gate 310, OR-gate 312, delay element 314, amplifier 316, and oscillator 318. One input terminal 320 of AND-gate 310 is connected in the recirculation loop. The output terminal and AND-gate 310 is connected to one input terminal of OR-gate 312 and the output terminal of another AND-gate 322 is connected to the other input terminal of OR-gate 312. The output terminal of another AND-gate 324 is connected to an inverter 326 and to one input terminal 327 and AND-gate 322. The output terminal of inverter 326 is connected to the other input terminal 328 of AND-gate 310. The other input terminal 330 of AND-gate 322 is connected to receive new data signals for storage in register element 301. AND-gate 324 is provided with input terminals 331 and 332. Input terminal 331 is connected to receive the control signals $\eta$. Input terminal 332 is connected to receive the timing signals $\zeta$.

New data can be inserted into a register element of order register 26 and old data stored therein may be cleared only during the last four clock periods of the timing period. This is accomplished by delaying each instruction bit received at an input terminal 334 by the proper amount so that it arrives at the input terminal of the corresponding register element at the time of occurrence of timing signals $\zeta$. Thus, the first occurring digit of the instruction, which is to be stored in register element 301, must be delayed by a delay element 336 for an interval equal to 124 bits, or 248 millimicroseconds, before it is applied to terminal 330.

New data is inserted into the register elements of order register 26 only when control signals $\eta$ are supplied at terminal 293 of V-register 275 of FIG. 11, indicating that a new instruction is to be transferred into the appropriate registers. Therefore, the simultaneous arrival of a timing signal $\zeta$ during the timing period following that in which the next-instruction designation delay number is reduced from zero to a negative value and of a control signal $\eta$ at respective terminals 332 and 331 of AND-gate 324 produces a signal which clears the binary digit stored in register element 301 and opens gate 322 so as to allow insertion of the new instruction digit into the register element.

Two representative logical equations describing the operation of typical register elements, such as register elements A and B of the order register, are given by (6) $\quad A' = \eta \zeta M_{1d} + (\overline{\eta + \zeta})A$ (7) $\quad B' = \eta \zeta M_{2d} + (\overline{\eta + \zeta})B$ In Equation 6, A represents the signal being circulated by register element A and applied to AND-gate 310. The signal denoted by A is also available as an output signal from the register element. A' represents the new signal stored, as available at the output terminal of OR-gate 312. The symbol $M_{1d}$ represents the lowest order bit of the instruction suitably delayed to arrive at terminal 330 substantially simultaneously with the arrival of a timing signal $\zeta$ at terminal 332. The first term to the right of the equality sign, $\eta \zeta M_{1d}$, represents insertion of new data. The second term $(\overline{\eta + \zeta})A$ represents recirculation.

Register elements 302–306 operate in a manner similar to register element 301. These registers in sequence store the next five successive bits of the instruction words. The new instruction input signals are transferred to the input terminals of register elements 302–306 through the respective delay elements 338, 339, 340, 341 and 342. Each of delay elements 338–342 is adapted to delay instruction signals passing therethrough so that the proper instruction digit reaches the input terminal of the corresponding register element at the time of occurrence of a timing signal $\zeta$.

As has previously been indicated in the subparagraph entitled "Orders," the contents of register elements 304, 305, and 306 of order register 26 provide the signals which dictate the order to be performed by the computer. This order is performed in accordance with the order code shown in Table II. The contents of register elements 301, 302 and 303 convey additional information (to be described later) relating to the manner in which an order is to be performed. Register 26 controls the orders to be performed because the component register elements thereof are connected to various controlling gates throughout the system. The connection of a control register element to the input terminal of a gate is designated by a letter corresponding to the letter identity of the register element. For example, if register element 303 is connected to the input terminal of an AND-gate, that terminal is designated as receiving an input C.

Since orders are executed in accordance with the storage of both binary 0's and 1's in the various register elements, provision is made for obtaining independent signals representing binary 1's when a register element is storing either a binray 0 or 1. Thus, each of register elements 301–306 is connected to a respective one of inverters 344–349. Therefore, order register 26 provides signals representing binary 1's at each of register element output terminals 351–356 when the corresponding register element stores a 1, and at each of inverter output terminals 358–363 when the corresponding register element stores a 0.

*Operand address register*

Figure 12:
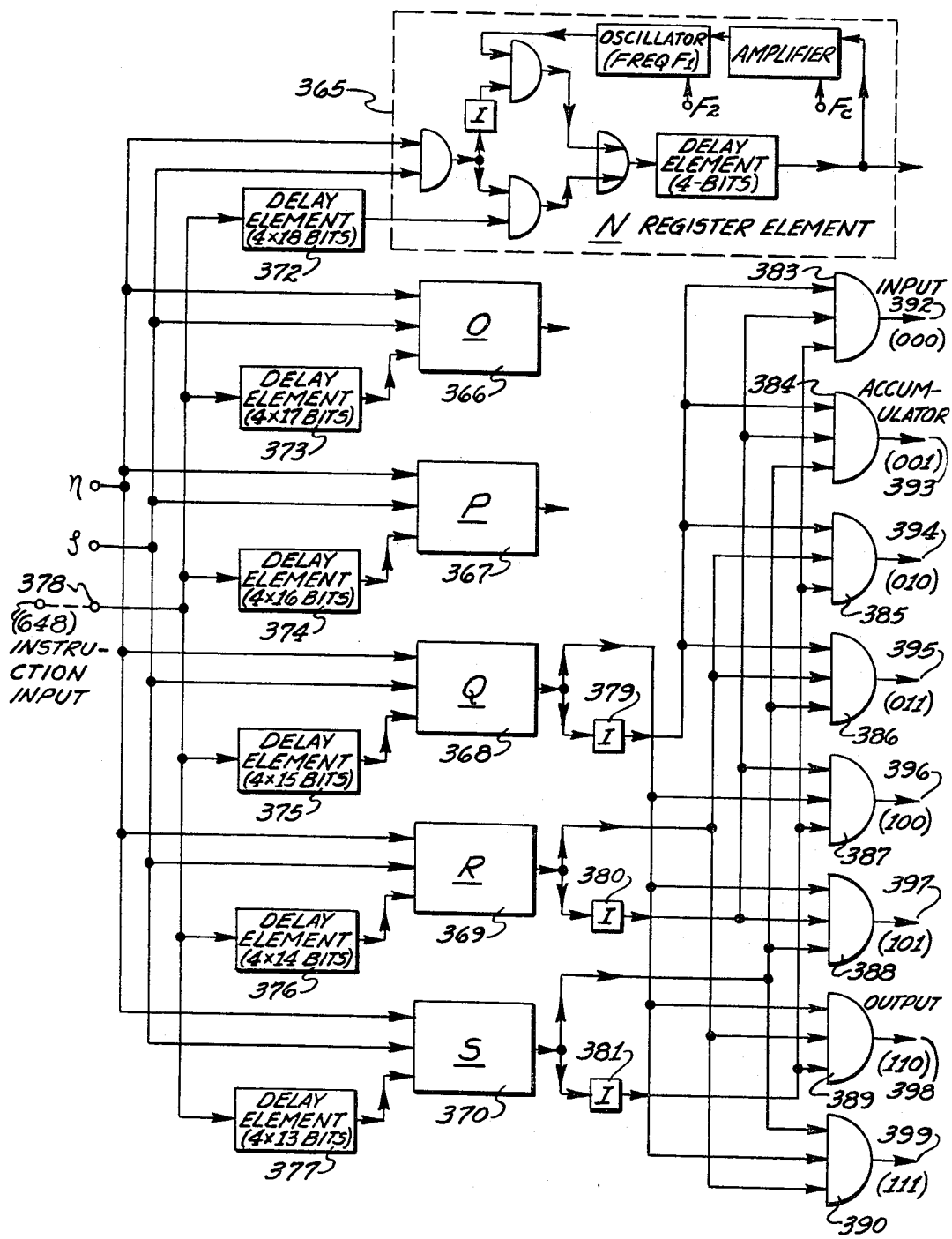
FIGURE 12 is a block diagram of the operand address register.

Operand address register 24, FIG. 12, stores the six bits of the operand designation address part of the instruction in the respective register elements 365, 366, 367, 368, 369 and 370. These register elements are designated by the respective letters N–S, to correspond to the particular bits of the instruction stored therein. Register elements 365–370 are substantially identical to register element 301 illustrated and described in detail in connection with FIG. 8. Each of these register elements is an analog flip-flop adapted to store by recirculation one instruction bit for each time domain.

As in the order register 26 of FIG. 8, new data can be inserted into a register element only during the simultaneous arrival of timing signals $\zeta$ and of a control signal $\eta$ at the input terminals thereof. Therefore, the instruction input signals must be transferred to the input terminals of register elements 365–370 through the respective delay elements 372–377. Each of these delay elements is adapted to delay instruction signals passing therethrough so that the proper instruction digit reaches the input terminal of the corresponding register element at the time of occurrence of a timing signal $\zeta$. Instruction input signals are received at an input terminal 378.

The previous logical Equations 6 and 7 represent the operation of each of register elements 365–370.

The contents of operand address register 24 comprises the binary digital representation of a code number indicating the location where the operand is to be obtained or delivered. The operand is obtained from a cell of memory 10, from input apparatus 28, or from a different time domain of accumulator 14. The operand is delivered to a cell of memory 10 or to output apparatus 30. The contents of operand address register 24 is applied to a decoding matrix, which produces an output signal on any one of a plurality of output leads for designating the particular location denoted by the contents of register 24. Each output lead of the decoding matrix is connected to a controlling gate in the computer in order to control the routing of the operand to or from the location desired.

A simplified decoding matrix is shown, by way of example, in FIG. 12 connected to decode the data stored in only three register elements 368, 369 and 370. This decoding matrix energizes eight output leads. A complete decoding matrix connected to all six register elements would serve to actuate 64 output leads. In order that the decoding matrix be provided with signals when the register elements store either binary 0's or binary 1's, the output terminal of each register element is connected directly to the decoding matrix and to the decoding matrix through an inverter, such as inverters 379, 380, and 381. The decoding matrix comprises a plurality of AND-gates, such as gates 383–390. The output signals of each AND-gates 383–390 is delivered on a respective output lead 392–399. Each AND-gate is connected to receive a different combination of the output signals and the inverted output signals of the register elements coupled to the decoding matrix.

AND-gate 383 is connected to receive the inverted output signals of register elements 368, 369 and 370. The output signal delivered by AND-gate 383 on output lead 392 represents the logical relationship $\overline{QRS}$. An output signal is provided by AND-gate 383 when the binary digit stored in the corresponding time domain of each of register elements 368, 369 and 370 is zero. The output signal of AND-gate 383 controls transfer of an operand from input apparatus 28 to arithmetic unit 12. An output signal is provided by AND-gate 384 on lead 393 when register elements 368, 369 and 370 store respectively the digits 0, 0, 1. The output signal of AND-gate 384 controls transfer of an operand from a different time domain of the accumulator. The output signal of AND-gate 389 on lead 398 controls transfer of an operand from the accumulator to output apparatus 30. The remaining AND-gates of the decoding matrix of FIG. 12 control the transfer of operands to or from the accumulator to predetermined memory sections. The particular binary digits stored in register elements 368, 369, and 370 which produce an output on a given one of leads 392–399 are denoted in respective order by numerals in brackets adjacent the corresponding lead.

*Next-instruction address register*

Figure 13:
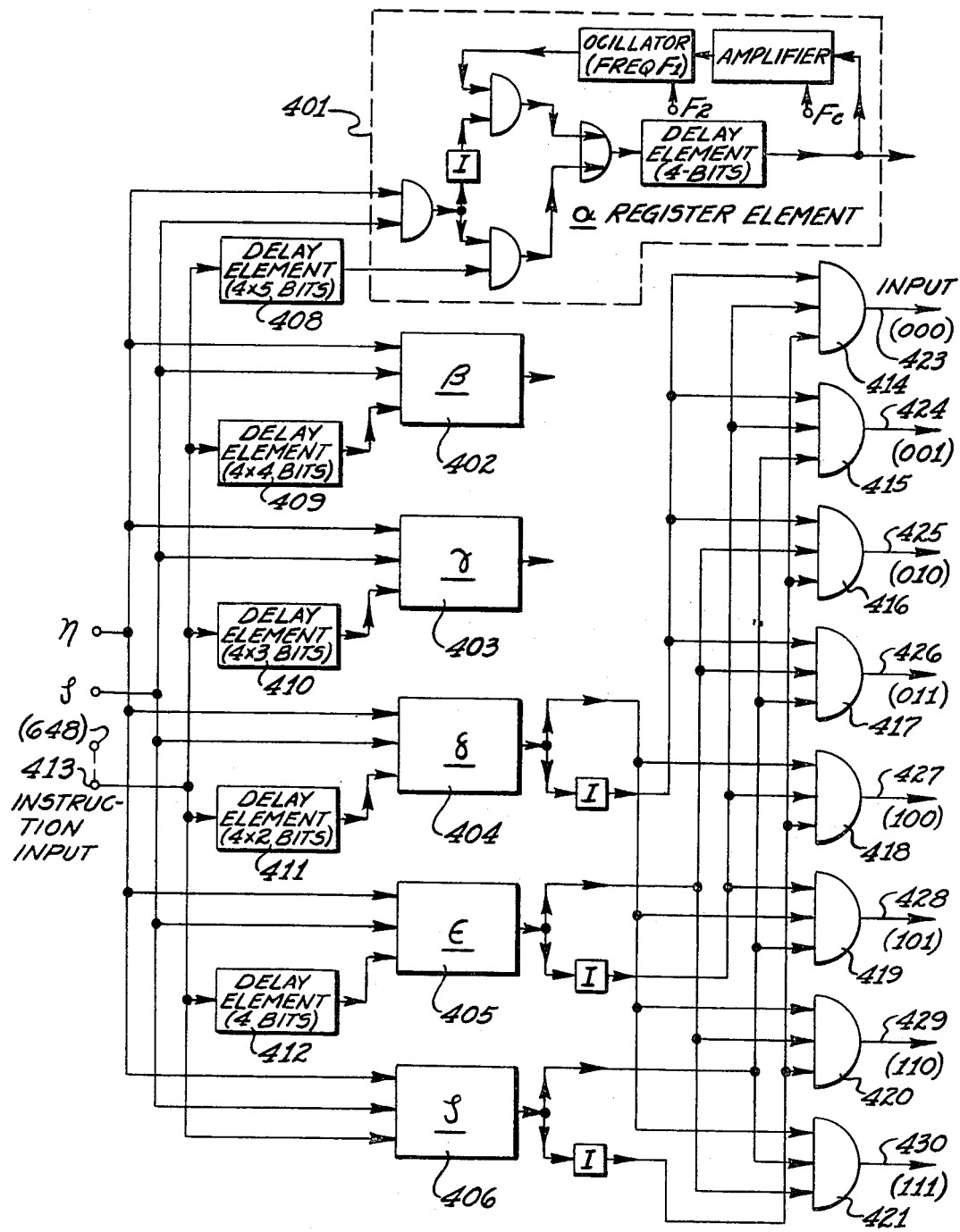
FIGURE 13 is a block diagram of the next-instruction address register.

Next-instruction address register 22, FIG. 13, stores the six bits of the next-instruction designation address part of the instruction in the respective register elements 401, 402, 403, 404, 405, and 406. These register elements are designated by the respective Greek letters $\alpha$, $\beta$, $\gamma$, $\delta$, $\epsilon$, and $\zeta$, to correspond to the particular bits of the instruction stored therein. Register elements 401–406 are substantially identical to register element 301 illustrated and described in detail in connection with FIG. 8. Each of these register elements is an analog flip-flop adapted to store by recirculation one instruction bit for each time domain.

As in the order register 26 of FIG. 8, new data can be inserted into a register element only during the simultaneous arrival of timing signals $\zeta$ and of a control signal $\eta$ at the input terminals thereof. Therefore, the instruction input signals must be transferred to the input terminals of register elements 401–406 through the respective delay elements 408–412. Each of these delay elements is adapted to delay instruction signals passing therethrough so that the proper instruction digit reaches the input terminal of the corresponding register element at the time of occurrence of a timing signal $\zeta$. No delay element is provided for instruction input signals to be inserted in register element 406, because the instruction bits to be stored therein appear simultaneously with timing signals $\zeta$. Instruction input signals are received at an input terminal 413.

The previous logical Equations 6 and 7 represent the operation of each of register elements 401–406.

The contents of next-instruction address register 22 comprises the binary digital representation of a code number indicating the location where the next instruction is to be obtained. The next instruction is obtained from a cell of memory 10 or from input apparatus 28. The contents of next-instruction address register 22 is applied to a decoding matrix, which produces an output signal on any one of a plurality of output leads for designating the particular location denoted by the contents of register 22. Each output lead of the decoding matrix is connected to a controlling gate in the computer in order to control the routing of the next instruction from the location desired.

A simplified decoding matrix is shown, by way of example, in FIG. 13 connected to decode the data stored in only three register elements 404, 405, and 406. This decoding matrix responds to data stored in these three register elements in a manner similar to that described in connection with the decoding matrix shown in FIG. 12. The decoding matrix comprises a plurality of AND-gates, such as gates 414–421. The output signal of each of AND-gates 414–421 is delivered on a respective one of output leads 423–430. The output signal of AND-gate 414, delivered on lead 423, controls transfer of an instruction from input apparatus 28 to instruction register 20 and to registers 22, 24, and 26. The remaining AND-gates of the decoding matrix of FIG. 13 control the transfer of instructions from predetermined memory sections to registers 20, 22, 24, and 26.

*Successive timing period execution*

The delay elements 336–342, 372–377, and 408–412, of the respective order, operand address, and next-instruction address registers are employed so that these registers may maintain their contents during the timing period that new instruction data is being received. Thus, an order can be executed and the routing of a new instruction directed, because the order and address parts of the old instruction remain in these registers until the time of occurrence of timing signals $\zeta$. All bits of a new instruction enter the register elements of the order, operand address, and next-instruction address registers simultaneously at the end of a timing period and are immediately ready to direct the execution of a new order and to direct the receipt of a new instruction in the next succeeding timing period. Therefore, in this computer a new instruction can be received and an order executed every timing period.

ARITHMETIC UNIT

Figure 14:
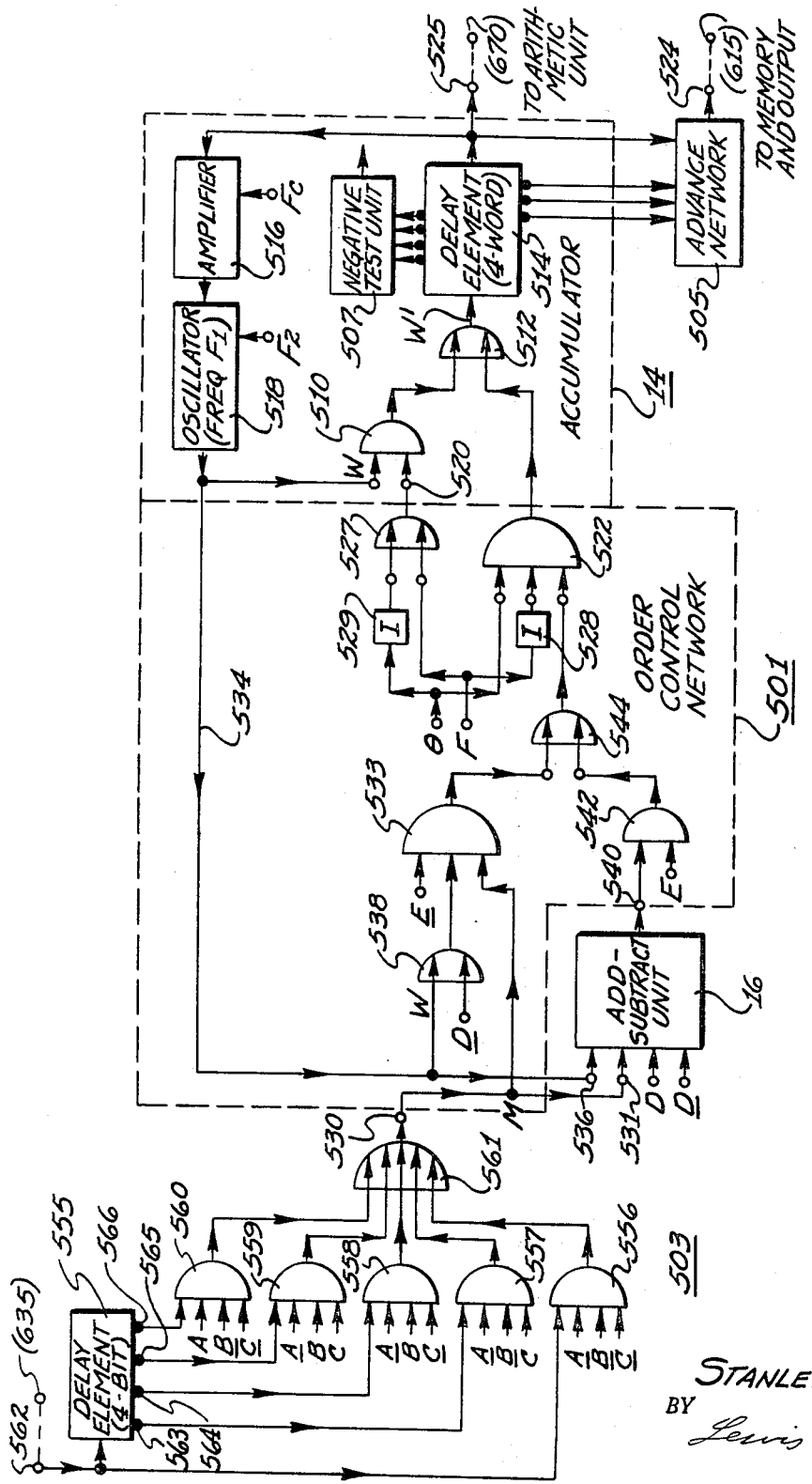
FIGURE 14 is a block diagram of the arithmetic unit.

The arithmetic unit 12 of FIG. 14 comprises four principal circuits: the accumulator 14, the add-subtract unit 16, an order control network 501, and a time domain retard network 503. Accumulator 14 holds in multiplexed manner an operand in each time domain, each of these operands usually being the result of the last arithmetic or logical operation in that domain. Add-subtract unit 16 performs the function of adding a number to or subtracting a number from an operand stored in the accumulator. Order control network 501, in response to data stored in order register 26 directs the execution of various operations or parts thereof which this computer performs. Time domain retard network 503, in response to data stored in order register 26, controllably delays the signals of an operand entering the arithmetic unit so that the operand may be shifted to another time domain or may be doubled if desired.

In addition to the four principal circuits identified above, arithmetic unit 12 comprises a time domain advanced network 505 and a negative test unit 507 to be described subsequently.

*Accumulator*

Accumulator 14 is adapted to store by recirculation four multiplexed operands, comprising a total of 128 information bits. The accumulator comprises the following elements connected in series to form a recirculation loop: AND-gate 510, OR-gate 512, delay element 514, amplifier 516, and oscillator 518. The total loop delay time is 128 bits in duration. Accumulator 14 is a storage element of the type shown in FIG. 5 and operates in a similar manner. Data is caused to recirculate in the accumulator during any full timing period by applying to an input terminal 520 of AND-gate 510 a continuous train of binary 1's during the entire timing period. When new data is inserted into the accumulator from the output terminal of an AND-gate 522, which is connected to an input terminal of OR-gate 512, a continuous train of binary 0's is applied to terminal 520 to inhibit circulation of the stored operand. An operand may be extracted from the accumulator at either one of two points, terminals 524 and 525. Terminal 524 is an output terminal of advance network 505, which is connected to receive signals passing through delay element 514. Terminal 525 is connected directly to the recirculation loop of the accumulator. Operands provided at terminal 524 after passing through advance network 505 are available for storage in memory 10 or for delivery to output apparatus 30. Operands available at terminal 525 are returned to an input terminal of arithmetic unit 12 where they may be transferred to another time domain of the accumulator or doubled by operation of time domain retard network 503.

*Order control network*

The order control network 501 of FIG. 14 receives signals representing the data stored in register elements D, E, and F of order register 26 and control signals $\theta$ for directing the execution of certain orders or parts thereof. The output signal of an OR-gate 527, which has its output terminal connected to terminal 520 of AND-gate 510, maintains the recirculation of the operands stored in accumulator 14 during execution of the Branch and Store orders and during those timing periods when no order is being executed; i.e., $\theta=0$, and blocks recirculation of the contents of the accumulator during execution of the Fetch, Add, Subtract, and Extract orders. Output signals of AND-gate 522 represent new operands for insertion into the accumulator during execution of the Fetch, Add, Subtract and Extract orders.

The output signal of register element F is applied directly to one input terminal of OR-gate 527 and in inverted form through an inverter 528 to one input terminal of AND-gate 522. Control signals $\theta$ are applied directly to another input terminal of AND-gate 522 and in inverted form through an inverter 529 to the other input terminal of OR-gate 527.

The logical condition for recirculation of data stored in the accumulator is given by the expression $F+\bar{\theta}$, which represents the function of OR-gate 527 on the signals applied thereto. Signals representing $\bar{F}$ and $\theta$ are applied to AND-gate 522, in addition to signals representing the new operands for insertion into the accumulator.

An input terminal 530 of the order control network receives operands that originate in memory 10, in input apparatus 28, or in a different time domain of accumulator 14. Input terminal 530 is connected to a terminal 531 of add-subtract unit 16 and to one input terminal of an AND-gate 533. A lead 534 connects the recirculation loop of accumulator 14 to another input terminal 536 of the add-subtract unit and to one input terminal of an OR-gate 538. OR-gate 538 is connected to receive the inverted output signal of register element D. The output terminal of OR-gate 538 is connected to another input terminal of AND-gate 533. A third input terminal of AND-gate 533 is connected to receive the inverted output signal of register element E. Output terminal 540 of add-subtract unit 18 is connected to one input terminal of an AND-gate 542. The other input terminal of AND-gate 542 is connected to receive the output signal of register element E. The output terminals of AND-gates 533 and 542 are connected to respective input terminals of an OR-gate 544. The output terminal of OR-gate 544 is connected to a third input terminal of AND-gate 522 and supplies input operands thereto.

When register element F stores a 0, a new operand is inserted into the accumulator when the order is executed. This new operand may have one of four forms: (1) If both register elements D and E store 0's, AND-gate 533 provides passage therethrough into the accumulator for the operand arriving at terminal 530, (2) if register element D stores a 1 and register element E stores a 0, a new operand is formed as the bit-by-bit logical product of the operand circulating in the accumulator and the operand arriving at terminal 530, and the new operand is entered into the accumulator, (3) if register element D stores a 0 and register element E stores a 1, the operand arriving at terminal 530 is added to the operand circulating in the accumulator by the add-subtract unit, and the sum is entered into the accumulator, or (4) if register element D stores a 1 and register element E stores a 1, the operand arriving at terminal 530 is subtracted from the operand circulating in the accumulator by the add-subtract unit, and the difference is entered into the accumulator.

The logical equation representing the conditions under which operands are recirculated in, or new operands are inserted into, accumulator 14 is given by (8) $W'=W(F+\theta)+\underline{F}\theta$ $[\underline{B}M(D+W)+E(W\neq W\neq)]$ In the above equation, W represents the signal being recirculated in the accumulator and applied to AND-gate 510. W' represents the new operand stored in the accumulator, as available at the output terminal of OR-gate 512. The expression ($W\neq M\neq X$) represents the data provided by the add-subtract unit. X represents the transfer digit employed within the add-subtract unit and will be described hereinafter. The symbol $\neq$ represents the EXCLUSIVE-OR logical operation, wherein a binary 1 output results when, and only when, the two binary digital inputs are unlike.

Delay of input signals

Time domain retarded network 503 of FIG. 14 functions to controllably delay the signals of an operand applied thereto, so that the operand may be shifted to another time domain or may be doubled. The network is adapted to transmit operands directly without delay, or to delay operands by times equivalent to 1, 2, 3, and 4 bits. For example, an operand in the first time domain may be transferred to the second, third or fourth time domains by delaying the operand signals 1, 2, or 3 bits respectively (FIG. 7). An operand is doubled by delaying it for four bits, since each bit thereof advances to the next higher significant position in the word.

Time domain retard network 503 comprises a delay element 555, a plurality of four-input AND-gates 556, 557, 558, 559 and 560, and a multiple input OR-gate 561. An input terminal 562, to which is applied the incoming operands, is connected into delay element 555 and to one input terminal of AND-gate 556. Delay element 555 is provided with taps 563–566 equispaced therealong. The spacing between the adjacent taps of the group and between tap 563 and the input to the delay element is equal to the distance a microwave signal propagates along the delay element in two millimicroseconds. Thus, signals applied to terminal 562 appear respectively at taps 563–566 two, four, six and eight millimicroseconds later. Taps 563–566 are connected to a respective input terminal of each of AND-gates 557–560. The output terminals of AND-gates 556–560 are connected to respective input terminals of an OR-gate 561. The output terminal of OR-gate 561 is connected to terminal 530, which in turn applies the operand to order control network 501. Each of AND-gates 556–560 has three input terminals thereof connected to receive a different combination of the output signals and the inverted output signals of register elements A, B and C of order register 26. The state of register elements A, B and C when an order is executed determines the AND-gate of network 503 which passes the operand and, therefore, the delay experienced by the operand.

When an operand is to pass directly from terminal 562 to terminal 530 without delay, register elements A, B and C must each store a binary 0 so that the operand passes through AND-gate 556. If the data stored in the order register represents the logical combination $\underline{ABC}$, the operand is delayed one bit and is thereby shifted from one time domain to the next later-occurring time domain. If the order register stores $\underline{AB}C$, the operand is delayed two bits. If the order register stores $\underline{A}BC$, the operand is shifted from the first time domain to the fourth time domain. If the order register stores $ABC$, the operand is delayed by four bits and is effectively doubled.

Add-subtract unit

Figure 15:
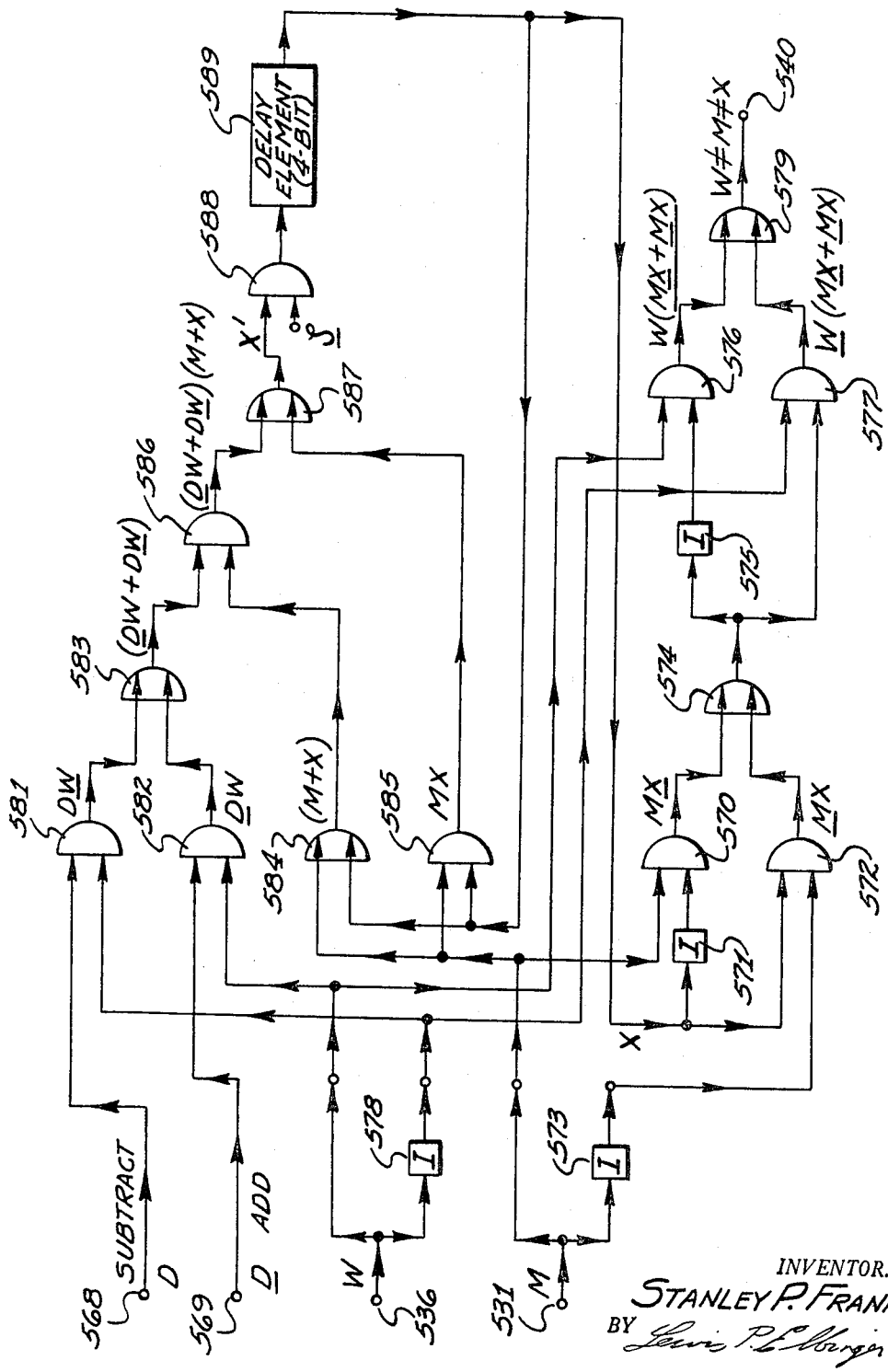
FIGURE 15 is a block diagram of the add-subtract portion of the arithmetic unit of FIG. 14.

Add-subtract unit 16 of FIG. 15 performs the function of adding a numerical operand to or subtracting a numerical operand from a numerical operand stored in the accumulator. As in the previously described apparatus, the add-subtract unit can execute an order independently in each time domain.

An operand stored in accumulator 14 is applied directly to terminal 536 of the add-subtract unit, and represents an augend for addition or a minuend for subtraction. The operand received from accumulator 14 is designated by the letter W. An operand originating in the memory or in another time domain of accumulator 14, is applied to terminal 531 and represents an addend for addition or a subtrahend for subtraction. The operation applied to terminal 531 is denoted by the letter M, since most often it originates in memory 10. However, in preceding Equation 8 and in the equations to follow, the symbol M also stands for an operand originating from another time domain of the accumulator.

A terminal 568 of the add-subtract unit is connected to receive the output signal of register element D. A terminal 569 is connected to receive the inverted output signal of register element D. When register element D stores a 1, the add-subtract unit functions to subtract the operand applied to terminal 531 from the operand applied to terminal 536. When register element D stores a 0, the add-subtract unit functions to add the operand applied to terminal 531 to the operand applied to 536.

Add-subtract unit 16 performs a logical operation on corresponding digits of the two input operands and the transfer digit generated by the operation performed on the immediately preceding digits in order to generate a new transfer digit and an output digit. The output digit is a digit of the sum term for addition and a digit of the difference term for subtraction. The transfer digit is a generic term and represents the carry digit for addition and the borrow digit for subtraction. Add-subtract unit 16 generates these transfer and output digits in accordance with logical equations derived from the following binary digital truth table for addition and subtraction.

TABLE III.—TRUTH TABLE

| Input Bits | | | Addition | | Subtraction | |
|---|---|---|---|---|---|---|
| W | M | X | Carry (X') | Sum | Borrow (X') | Difference |
| 0 | 0 | 0 | 0 | 0 | 0 | 0 |
| 1 | 0 | 0 | 0 | 1 | 0 | 1 |
| 0 | 1 | 0 | 0 | 1 | 1 | 1 |
| 1 | 1 | 0 | 1 | 0 | 0 | 0 |
| 0 | 0 | 1 | 0 | 1 | 1 | 1 |
| 1 | 0 | 1 | 1 | 0 | 0 | 0 |
| 0 | 1 | 1 | 1 | 0 | 1 | 0 |
| 1 | 1 | 1 | 1 | 1 | 1 | 1 |

The logical equation representing the conditions under which the augend digit W, the addend digit M, and the previously formed transfer digit X provide a binary 1 output for both the sum and difference terms, is given by (9) Sum of Difference $=W\underline{M}\underline{X}+\underline{W}M\underline{X}+\underline{W}\underline{M}X+WMX$ This equation may be reduced to the following simplified expression:

(10)   Sum or Difference $=W\neq M\neq X$

It will be noted that this expression has been previously employed in Equation 8 to represent the data provided by the add-subtract unit for either addition or subtraction.

The logical equation representing the conditions under which a binary 1 carry digit is generated is given by

(11)   Carry $=\underline{D}(WM\underline{X}+W\underline{M}X+\underline{W}MX+WMX)$ This equation may be reduced to the following simplified expression.

(12)   Carry $=\underline{D}(WM+WX+MX)$

The logical equation representing the conditions under which a binary 1 borrow digit is generated is given by

(13)   Borrow $=D(\underline{W}M\underline{X}+\underline{W}\underline{M}X+\underline{W}MX+WMX)$ This equation may be reduced to the following simplified expression.

(14) $\quad$ Borrow $=D(\underline{W}M+\underline{W}X+MX)$

In the preceding Equations 8–14, the term X represents the borrow digit generated during subtraction and the carry digit generated during addition; i.e., the transfer digit. The logical equation, representing both sets of conditions for generating the carry and borrow digits, obtained by combining Equations 12 and 14 is given by

(15) $\quad X'=MX+(\underline{D}W+D\underline{W})(M+X)$

In this equation X' represents the new transfer digit derived from corresponding digits of the two input operands and the transfer digit generated by the operation on the immediately preceding lower order digits. The circuit of FIG. 15 is an interconnection of logical elements for implementing Equation 10 to generate the sum and difference digits and for implementing Equation 15 to generate the transfer digit.

The sum and difference digits are generated in the following manner. An AND-gate 570 is connected to receive at one input terminal thereof the signal applied to terminal 531 and at the other input terminal thereof the inverse of the signal representing the transfer digit. The output signal of AND-gate 570 represents the logical combination M$\underline{X}$. An AND-gate 572 is connected to receive at one input terminal thereof the signal applied to terminal 531 as inverted by an inverter 573 and at the other input terminal thereof, the signal representing the transfer digit. The output signal of AND-gate 572 represents the logical combination $\underline{M}$X. An OR-gate 574 is connected to receive the output signals of AND-gates 570 and 572. The output terminal of OR-gate 574 is connected through an inverter 575 to one input terminal of an AND-gate 576 and directly to one input terminal of an AND-gate 577. The other input terminal of AND-gate 576 is connected to receive the signal applied to terminal 536. The other input terminal of AND-gate 577 is connected to receive the signal applied to input terminal 536 as inverted by an inverter 578. The output signal of AND-gate 576 represents the logical combination $W(M\underline{X}+\underline{M}X)$. The output signal of AND-gate 577 represents the logical combination $\underline{W}(M\underline{X}+\underline{M}X)$. The expression $(M\underline{X}+\underline{M}X)$ represents the logical operation of EXCLUSIVE-OR performed on the digits M and X. An OR-gate 579 is connected to receive the output signals of AND-gates 576 and 577. The output signal of AND-gate 579 represents the sum or difference term in accordance with Equation 10. The output signal of AND-gate 579 is applied to an output terminal 540, from which sum and difference digital signals are obtained.

The transfer digits are generated in the following manner. An AND-gate 581 is connected to receive at one input terminal thereof the signal applied to terminal 568 and at the other input terminal thereof, the signal applied to terminal 536 as inverted by inverter 578. The output signal of AND-gate 581 represents the logical combination D$\underline{W}$. An AND-gate 582 is connected to receive at one input terminal thereof the signal applied to terminal 536 and at the other input terminal thereof, the signal applied to terminal 569. The output signal of AND-gate 582 represents the logical combination $\underline{D}$W. An output signal representing a binary 1 is provided in any given timing period by only one of AND-gates 581 and 582, depending on whether register element D stores a 1 or a 0. When the operation of addition is being executed, a binary 1 signal is supplied by AND-gate 582. When the operation of subtraction is being executed, a binary 1 signal is supplied by AND-gate 581. An OR-gate 583 is connected to receive the output signals of AND-gates 581 and 582. The output signal of OR-gate 583 represents the logical combination $(\underline{D}W+D\underline{W})$. An OR-gate 584 is connected to receive at one input terminal thereof the signal applied to terminal 531 and at the other input terminal thereof, the signal representing the immediately preceding transfer digit of the corresponding time domain. The output signal of OR-gate 584 represents the logical combination $(M+X)$. An AND-gate 585 is connected to receive at one input terminal thereof the signal applied to terminal 531 and at the other input terminal thereof the signal representing the immediately preceding transfer digit. The output signal of AND-gate 585 represents the logical combination MX. An AND-gate 586 is connected to receive the output signals of OR-gates 583 and 584. The output signal of AND-gate 586 represents the logical combination $(\underline{D}W+D\underline{W})(M+X)$. An OR-gate 587 is connected to receive the output signals of AND-gates 585 and 586. The output signal of OR-gate 587 represents the new transfer digit in accordance with Equation 15; i.e., the carry digit if addition is being executed and the borrow digit if subtraction is being executed.

Inasmuch as the add-subtract unit may be called upon to execute operations in two successive timing periods of any time domain, it is necessary to inhibit the transfer digit that is generated by the last-occurring bits of the operands. This last transfer digit is inhibited by preventing recirculation thereof. An AND-gate 588 is connected to receive at one input terminal thereof the output signal of AND-gate 587, and at the other input terminal thereof the inverse of timing signals ζ. Thus, AND-gate 588 prevents passage therethrough of the transfer digit generated at the time of occurrence of timing signal ζ, but permits passage of all other transfer digits. The logical equation representing the function performed by AND-gate 588 is given by

(16) $\quad X'=\underline{\zeta}[MX+(\underline{D}W+D\underline{W})(M+X)]$

The output signal of AND-gate 588 is applied to a delay element 589, where it is delayed for a time equivalent to that of four bits. The output signal of delay element 589 is applied to AND-gates 572, 584, 585 and inverter 571 for employment during the clock period of the same time domain which next succeeds the clock period during which it was generated. Where substantial delay takes place in the logical circuits preceding delay element 589, the delay of element 589 is reduced by an amount corresponding to the circuit delay.

MEMORY

Figure 16:
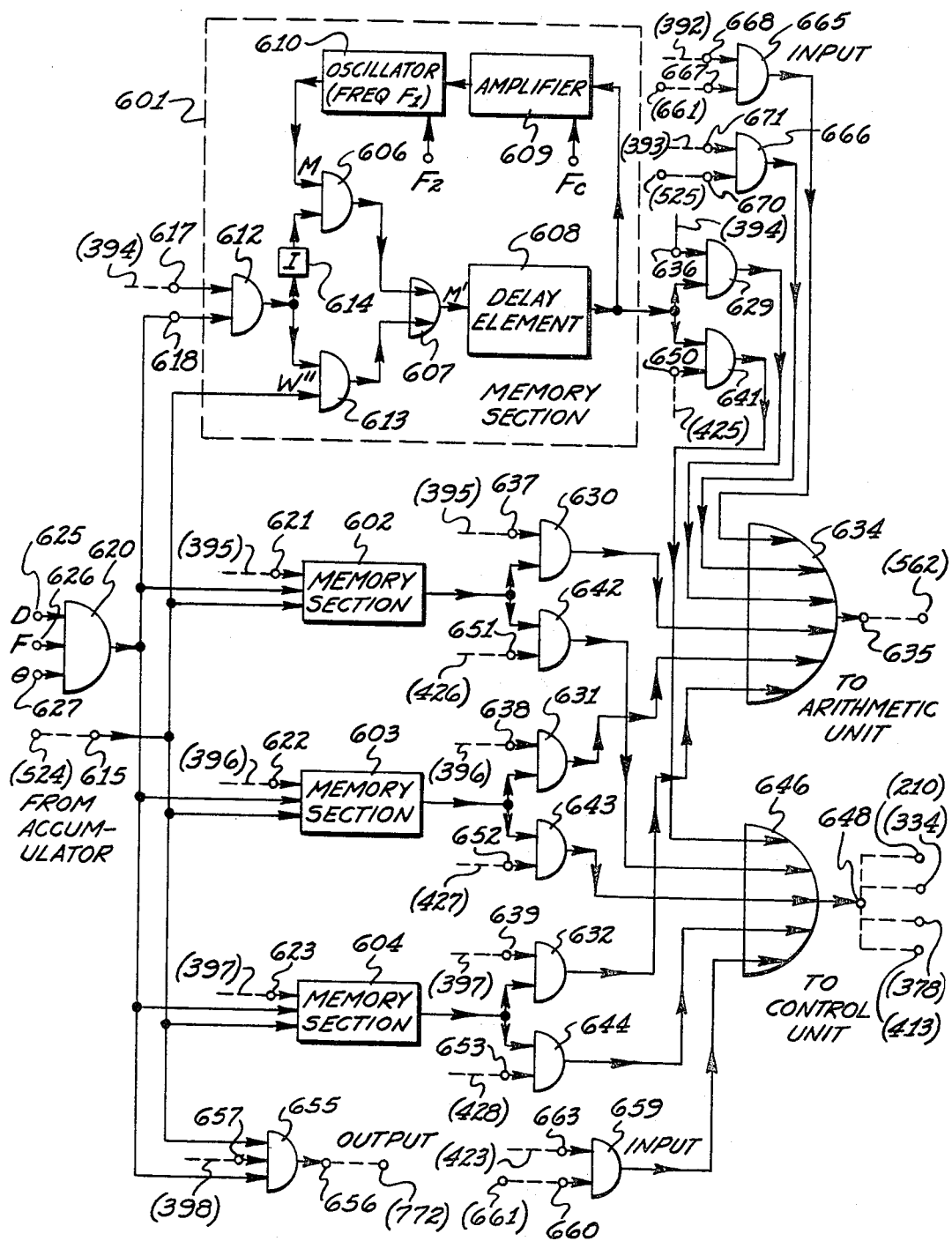
FIGURE 16 is a block diagram of the memory of this invention.

Memory 10 of FIG. 16 comprises a plurality of memory sections, such as memory sections 601, 602, 603, and 604. The number of sections employed is flexible and depends on the desired amount of information, both instructions and operands, which is to be retained in such a high-speed memory. Each memory section stores an integral number of groups of four multiplexed words. The capacity of each memory section depends on the desired access time to the circulating information therein. Generally a number of memory sections of different capacity will be employed. For example, one memory section may store only four multiplexed words, and thereby contain 128 bits. Another memory section may store ten groups of four multiplexed words.

A word is said to be stored in a cell of the memory. A cell is the aggregate of the time allotments of two millimicroseconds each in which all of the bits of a word are stored to recirculate in a memory section loop. Four memory cells are multiplexed, as was described previously in explaining FIG. 10, and recirculate in the memory section. The time for circulation depends on the total loop delay of the memory section. A memory cell is located in memory 10 by providing in each time domain of both the operand designation and the next-instruction designation of the instruction an address and a delay number. The delay number specifies the number of memory cells in a given time domain which must circulate past the input or output elements of the memory section identified by the address before a word is inserted into or removed from that memory section. The time domain of the memory cell corresponds to the time domain of the locating instruction.

Memory section 601, which is similar to all other memory sections used, is a storage element of the type shown in FIG. 5 and previously described. The principal difference between memory sections is the total loop delay employed for providing the desired information capacity. Memory section 601 comprises the following elements, connected in series to form a recirculation loop: AND-gate 606, OR-gate 607, delay element 608, amplifier 609, and oscillator 610. The delay provided by delay element 608 determines the capacity of the memory section. An AND-gate 612 controls recirculation of data stored in the memory section and the insertion of new data therein. The output signal of AND-gate 612 is applied directly to one input terminal of an AND-gate 613 and is inverted by an inverter 614 and applied to one input terminal of AND-gate 606. The other input terminal of AND-gate 606 is employed in the recirculation loop of memory section 601. The other input terminal of AND-gate 613 is connected to input terminal 615, which in turn is connected to output terminal 524 of accumulator 14, and receives words therefrom for storage. Input signals are applied to AND-gate 612 at a pair of input terminals 617 and 618. Terminal 617 is connected to output lead 394 of operand address register 24. Terminal 618 is connected to the output terminal of an AND-gate 620. When AND-gate 612 provides a binary 0 output signal, the corresponding binary 1 signal provided by inverter 614 maintains recirculation of the data stored in memory section 601. When AND-gate 612 provides a binary 1 output signal, recirculation is inhibited in memory section 601 and AND-gate 613 permits passage of data for storage in memory section 601.

Memory sections 602, 603, and 604 are similarly connected at respective input terminals thereof to input terminal 615 and to AND-gate 620. Each of memory sections 602–604 is further provided with a respective one of input terminals 621, 622, and 623. Each of input terminals 621–623 is connected to a corresponding output lead of operand address register 24.

New information is inserted into a particular memory section upon the simultaneous occurrence of three events: (1) the instruction contains the Store order, so that each of register elements D and F stores a binary 1, (2) the address part of the operand designation identifies the particular memory section so that the corresponding output lead of operand address register 24 is energized, and (3) control signal $\theta$ occurs indicating that the Store order is to be executed. A binary 1 signal representing the simultaneous occurrence of these three events is provided by recirculation controlling AND-gate 612 when memory section 601 is addressed. Input terminal 617 is provided with binary 1 signals whenever the operand designation bears the address of memory section 601. AND-gate 620 is provided with input terminals 625, 626, and 627. Terminals 625 and 626 are connected to receive the respective output signals of register elements D and F. Terminal 627 is connected to receive control signal $\theta$. Thus, a binary 1 signal is provided by AND-gate 620 to allow new information to enter a memory section whenever a Store order is provided and the execution thereof commenced by control signal $\theta$.

A typical logical equation representing the conditions under which data is recirculated in, or new data is inserted into, a memory loop is given by

(17) $M' = DF\theta(\text{Add})W'' + (\underline{D} + \underline{F} + \underline{\theta} + \underline{\text{Add}})M$ In Equation 17, M represents the signal being circulated by memory section 601 and applied to AND-gate 606. M' represents the new signal stored, as available at the output terminal of OR-gate 607. The symbol W'' represents the accumulator output signal provided by terminal 524. The symbol "Add" represents the signal provided by the output lead 394 of the operand address register when the address stored therein is that of memory section 601.

Information stored in memory 10 may be transferred to arithmetic unit 12 and to instruction register 20, next-instruction address register 22, operand address register 24, and order register 26 of control unit 18. Only instructions are transferred to the component registers of control unit 18. One input terminal of each of a plurality of AND-gates 629, 630, 631, and 632 is connected to the recirculation loop of a respective one of memory sections 601–604. The output terminals of AND-gates 629–632 are connected to respective input terminals of a multiple input OR-gate 634. The output terminal 635 of OR-gate 634 is connected to terminal 562 of time domain retard network 503 of the arithmetic unit of FIG. 14. Each of AND-gates 629–632 is further provided with a respective one of input terminals 636–639. Information from a particular memory section is directed through AND-gate 634 to the arithmetic unit upon application of a binary 1 signal to this other input terminal of one of AND-gates 629–632. Each of terminals 636–639 is connected to a respective output lead of operand address register 24. Thus, when the address part of the operand designation of the instruction identifies a particular memory section, information may be transferred therefrom through OR-gate 634 to the arithmetic unit.

In a similar manner, one input terminal of each of a plurality of AND-gates 641, 642, 643 and 644 is connected to the recirculation loop of a respective one of memory sections 601–604. The output terminals of AND-gates 641–644 are connected to respective input terminals of a multiple input OR-gate 646. The output terminal 648 of OR-gate 646 is connected to input terminal 210 of instruction register 20, to input terminal 413 of instruction address register 22, to input terminal 378 of operand address register 24, and to input terminal 334 of order register 26. Each of AND-gates 641–644 is further provided with a respective one of input terminals 650–653. Instructions are transferred from a particular memory section through OR-gate 646 to control unit 18 upon application of a binary 1 signal to this other input terminal of one of AND-gates 641–644. Each of terminals 650–653 is connected to a respective output lead of next-instruction address register 22. Thus, when the address part of the next-instruction designation of the instruction identifies a particular memory section, an instruction will be transferred therefrom through OR-gate 646 to control unit 18.

Certain other control gates are illustrated in FIG. 16. An AND-gate 655 is employed to transfer information from the accumulator to output apparatus 30. The output terminal 656 of AND-gate 655 is connected to the input terminal of output apparatus 30. One input terminal of AND-gate 655 is connected to terminal 615 to receive the accumulator output signals. Another input terminal of AND-gate 655 is connected to the output lead of AND-gate 620 for receiving a signal to direct the transfer of information from accumulator 14 to output apparatus 30. The other input terminal 657 of AND-gate 655 is connected to an output lead 398 of operand address register 24. A binary 1 signal applied to terminal 657 identifies AND-gate 655 as the particular channel through which information is to be transferred from the accumulator.

An AND-gate 659 is employed to transfer instructions from input apparatus 28 to control unit 18. The output lead of AND-gate 659 is connected to one input terminal of OR-gate 646. An input terminal 660 of AND-gate 659 is connected to output terminal 661 of input apparatus 28 of FIG. 9. The other input terminal 663 is connected to output lead 423 of next-instruction address register 22. A binary 1 signal applied to terminal 663 provides for the next instruction to be transferred to control unit 18 from input apparatus 28.

A pair of AND-gates 665 and 666 provide a further source of input data for arithmetic unit 12. The output leads of AND-gates 665 and 666 are connected to respective input terminals of OR-gate 634. An input terminal 667 of AND-gate 665 is connected to output terminal 661 of input apparatus 28 and provides for the transfer of information directly from input apparatus 28 to the arithmetic unit. The other input terminal 668 of AND-gate 665 is connected to receive signals from output lead 392 of operand address register 24. A binary 1 signal applied to terminal 668 provides that the operand will transfer into the arithmetic unit from input apparatus 28. An input terminal 670 of AND-gate 666 is connected to output terminal 525 of accumulator 14 and serves to transfer a word from one time domain of the accumulator for use as an operand in another time domain of the arithmetic unit. AND-gate 666 is enabled by application of an energizing signal to the other input terminal 671 thereof. Terminal 671 is connected to output lead 393 of operand address register 24. A binary 1 signal applied to terminal 671 provides that the operand will transfer into the arithmetic unit from the accumulator.

Thus, as shown in FIG. 16, control unit 18 receives new instructions from any section of memory 10 and from input apparatus 28 through AND-gate 659. Similarly, arithmetic unit 12 receives operands from any section of memory 10, from input apparatus 28 through AND-gate 665, and from accumulator 14 through AND-gate 666.

EXECUTION OF OPERATIONS

The operation of this computer invention embodiment will now be explained by describing the cooperation of the circuits thereof in executing the six elementary operations previously defined. Each of the Fetch, Add, Subtract, Extract and Store operations is executed in the single timing period when control signal $\theta$ is delivered by the U-register of FIG. 11, and immediately following the timing period when the operand designation delay number becomes negative. In a similar manner, the control signal $\phi$, also provided by the U-register, directs the execution of the Branch operation. The particular operation which is performed is governed by the data stored in register elements D, E, and F or order register 26, in accordance with the codes of Tables I and II.

Fetch

In the Fetch operation, the time domain of accumulator 14 that corresponds to the time domain of the instruction bearing the Fetch order is cleared while simultaneously a new word is inserted therein. The source of this new word may be a cell of memory 10, input apparatus 28, or a different time domain of accumulator 14. The order code for Fetch is $\underline{DEF}$. Since $\theta=1$ and $F=0$, AND-gate 510 of accumulator 14, FIG. 14, is inhibited so that the accumulator is cleared and AND-gate 522 of order control network 501 is enabled so that new data may be inserted into the accumulator. The $\underline{D}$ signal applied to OR-gate 538 and the $\underline{E}$ signal applied to AND-gate 533 enables AND-gate 533, thereby allowing passage of new data from terminal 530 through AND-gate 533, OR-gate 544, and AND-gate 522. AND-gate 542 is inhibited by the application thereto of an $\underline{E}$ signal. Terminal 530 receives data through time domain retard network 503 from OR-gate 634 of FIG. 16. If the operand address register stores $\underline{QRS}$, AND-gate 665 is enabled and data is transferred from input apparatus 28 to accumulator 14. If the operand address register stores $\underline{QRS}$, AND-gate 666 is enabled and data is transferred from one time domain of accumulator 14 into another time domain thereof. Other combinations of data stored in register elements Q, R, and S enable AND-gates provided at the output of corresponding memory sections to deliver data stored therein to the accumulator.

By passing incoming data through time domain retard network 503, the time domain of any incoming operand may be shifted, or the number represented thereby doubled if the delay of network 503 is equivalent to four bits.

For example, if it is desired to transfer a word stored in the second time domain of the accumulator to the third time domain thereof, the order portion of the instruction in the third time domain contains the code 001000 in ascending order of significance. The last three digits are those stored in register elements D, E and F and are the order code for Fetch. The first three digits are those stored in register elements A, B and C and enable AND-gate 557 of the time domain retard network so that each bit of the incoming word is delayed for two millimicroseconds and enters accumulator 14 in the third time domain. The instruction in the third time domain controls the gates of networks 501 and 503 and the gates of the accumulator, all of which follow tap 563 of delay element 555. During this timing period, the instruction in the second time domain must control the gates preceding delay element 555. Thus, the operand address of the second time domain instruction must represent $\underline{QRS}$ in order to direct the operand in the second time domain of the accumulator through AND-gate 666 to delay element 555. In this instance, the instruction of the second time domain will not be executed, but instead, the next-instruction designation delay number will be less than the operand designation delay number. An instruction such as this that is not executed, but which may be employed as an address, is hereinafter referred to as a "dummy instruction."

As will be shown later in reference to the starting procedure for the computer, the employment of 000 for the Fetch code and 000 for the address of input apparatus 28 simplifies starting the computer, since registers normally store 0's upon clearing.

Add

In the Add operation a numerical operand from a designated location is added to a numerical operand stored in the accumulator and the sum resulting therefrom is stored in the accumulator, which has been simultaneously cleared. The source of the addend operand may be a cell of memory 10 or a different time domain of accumulator 14. The order code for Add is $\underline{DEF}$. Since $\theta=1$ and $F=0$, AND-gate 510 of accumulator 14 is inhibited, whereby the accumulator is cleared, and AND-gate 522 of order control network 501 is enabled, whereby the sum may be inserted into the accumulator. The $\underline{E}$ signal applied to AND-gate 533 represents a binary 0, and inhibits transfer of data therethrough. AND-gate 542 is enabled by the E signal applied thereto and permits transfer therethrough of the output signals of add-subtract unit 16. The add-subtract unit is directed by the $\underline{D}$ signal applied to its terminal 569 to add the addend operand received from terminal 530 to the augend operand received on lead 534 from accumulator 14. The sum output signal of add-subtract unit 16 is transferred through OR-gate 544 and AND-gate 522 to the accumulator. The addend operand may be received from a different time domain of the memory or the accumulator in accordance with the procedure previously described for the Fetch operation.

Subtract

In the Subtract operation a numerical operand from a designated location is subtracted from a numerical operand stored in the accumulator and the difference resulting therefrom is stored in the accumulator, which has been simultaneously cleared. The order code for Subtract is $\underline{DEF}$. With the exception of the D signal applied to terminal 568 of the add-subtract unit, the operation is performed in a manner similar to that described for the Add operation. The difference output signal of the add-substract unit is transferred to the accumulator.

Extract

In the Extract operation the bits in those positions of an operand in accumulator 14 which correspond to the positions of all binary 0's of an operand received from a designated location are changed to, or remain, 0's. The designated location may be a cell in memory 10 or a different time domain of the accumulator. The order code for Extract is D<u>EF</u>. Since $\theta=1$ and $F=0$, AND-gate 510 of accumulator 14 is inhibited, whereby the accumulator is cleared, and AND-gate 522 of order control network 501 is enabled, whereby the resulting operand may be inserted into the accumulator. AND-gate 542 is inhibited by application thereto of the E signal, representing a binary 0. The application of a D signal to OR-gate 538 permits transfer therethrough of the operand stored in the accumulator. The application of an <u>E</u> signal to one input terminal of AND-gate 533 permits this gate to perform the AND logical operation on operands received at the other two terminals thereof; that is, the operand received from the accumulator and the operand received from terminal 530. In each bit position wherein the operand received from terminal 530 has a binary 0, the operand obtained from the accumulator is changed to, or remains, a 0. The resulting operand delivered by AND-gate 533 is transferred through OR-gate 544 and AND-gate 522 to accumulator 14.

For example, if it is desired to perform the Extract operation on the following operand in the accumulator with the indicated operand from memory 10, the resulting operand shown is obtained.

Accumulator operand _____ 101101 . . . 101
Memory operand _____ 011001 . . . 100
Result operand _____ 001001 . . . 100

*Store*

In the Store operation the operand of a particular time domain of accumulator 14 is transferred to a designated location. The designated location may be a cell of memory 10 or output apparatus 30. The order code for Store is D<u>EF</u>. Since $\theta=1$ and $F=1$, AND-gate 510 of the accumulator is enabled, whereby the accumulator continues to circulate the operand, and AND-gate 522 of order control network 501 is inhibited, whereby new data is prevented from entering the accumulator. The operand to be stored is transferred from delay element 514 of the accumulator through time domain advance network 505 to output terminal 524. Output terminal 524 is connected to terminal 615 of the memory of FIG. 16. The D and F signals applied to AND-gate 620 enables the transfer of the operand to a section of memory 10 or through AND-gate 655 to output apparatus 30. The routing of this transfer is determined by the operand designation address of the instruction.

Time domain advance network 505 functions to dontrollably shift the time domain of the operand delivered by accumulator 14. Advance network 505 is shown in detail in FIG. 17 and comprises a plurality of four-input AND-gates 701, 702, 703, and 704 and a multiple input OR-gate 706. Each of the output terminals of AND-gates 701-704 is connected to a respective input terminal of OR-gate 706. An input terminal of each of AND-gates 701-703 is connected to a respective one of taps 708, 709 and 710 of delay element 514. An input terminal of AND-gate 704 is connected to receive the output signal of delay element 514. The spacing between adjacent taps of the group and between tap 710 and the output of delay element 514 is equal to the distance a microwave signal propagates along delay element 514 in two millimicroseconds. Thus, signals traveling along delay element 514 first appear at tap 708, appear two millimicroseconds later at tap 709, appear four millimicroseconds later at tap 710, and leave the delay element six millimicroseconds after passing tap 708.

When an operand is directly transferred from one of taps 708–710 to terminal 524, it traverses a path of shorter delay than it would traverse by leaving the end of delay element 514 and, consequently, the operand is advanced to an earlier time domain. By selecting the path of the operand to terminal 524, AND-gates 701–704 control the advance of the operand to the earlier time domain. Each of AND-gates 701–704 has three input terminals connected to receive a different combination of the output signals and the inverted output signals of register elements A, B and C of order register 26. The state of register elements A, B and C when the Store order is executed determines the AND-gate of advance network 505 which passes the operand. When an operand is to pass directly from the accumulator to the memory without advance, register elements A, B and C each store a binary 0, whereby the operand passes through AND-gate 704. If the data stored in the order register represents the logical combination A<u>BC</u>, the digits of the operand are advanced one bit, thereby shifting the operand from one time domain to the next earlier occurring time domain. If the order register stores AB<u>C</u>, the operand is advanced two bits. If the order register stores ABC, an operand is shifted from the fourth time domain to the first time domain.

For example, if it is desired to transfer a word stored in the third time domain of the accumulator to the second time domain of a section of memory 10, the order portion of the second time domain instruction contains the code 101101 in ascending order of significance. The last three digits are those stored in register elements D, E and F and are the order code for Store. The first three enable AND-gates 703, whereby the operand advances from the third to the second time domain. In this type of operand, the controlling instruction occupies the same time domain as that newly acquired by the operand.

*Branch*

In the Branch operation the operand of a designated time domain of accumulator 14 is tested for a negative number. An instruction in any time domain can order the negative test of the operand in the same time domain or any other time domain. In the Branch operation, the 32nd (last occurring) bit in the operand is tested to see if it is a binary 1. If the 32nd bit is 1, the operand number is negative. If the test detects a negative number, a signal is generated to obtain a new instruction in the next timing period, whereas if a positive number is detected, a new instruction is not obtained until after the next-instruction designation delay number is reduced to zero. A separate logical network, FIG. 17, employed for execution of the Branch order will be first described.

Negative test unit 507 is adapted to test the sign of the 32nd bit of a word of the accumulator in any one of the four time domains in response to an instruction Branch order in any one of the time domains. Each of a plurality of four-input AND-gates 714, 715, 716, 717, 718, 719, and 720 has one input terminal thereof connected to a respective one of delay element taps 722, 723, 724, 725, 726, 727, and 728. The spacing between adjacent taps of the group is equal to the distance a microwave signal propagates along delay element 514 in two millimicroseconds. This distance corresponds to the spacing between any two successive bits stored in delay element 514.

The output terminals of AND-gates 714–720 are connected to respective input terminals of a multiple input OR-gate 730. The output terminal of OR-gate 730 is connected to one input terminal of an AND-gate 731. The output terminal of a four-input AND-gate 732 is connected to the other input terminal of AND-gate 731.

Each of AND-gates 714–720 has three input terminals thereof connected to receive a different combination of the output signals and the inverted output signals of register elements A, B, and C of order register 26. The state of register elements A, B, and C when an order is executed determines the time domain of the operand 32nd bit which is received by AND-gate 731. During execution of the Branch order, if the operand sampled is negative, a binary 1 is transferred through the appropriate one of AND-gates 714–720 and through OR-gate 730 to AND-gate 731, which in turn provides a binary 1 output signal at its output terminal 734. If the operand sampled is positive, terminal 734 provides a binary 0 signal.

Figure 17:
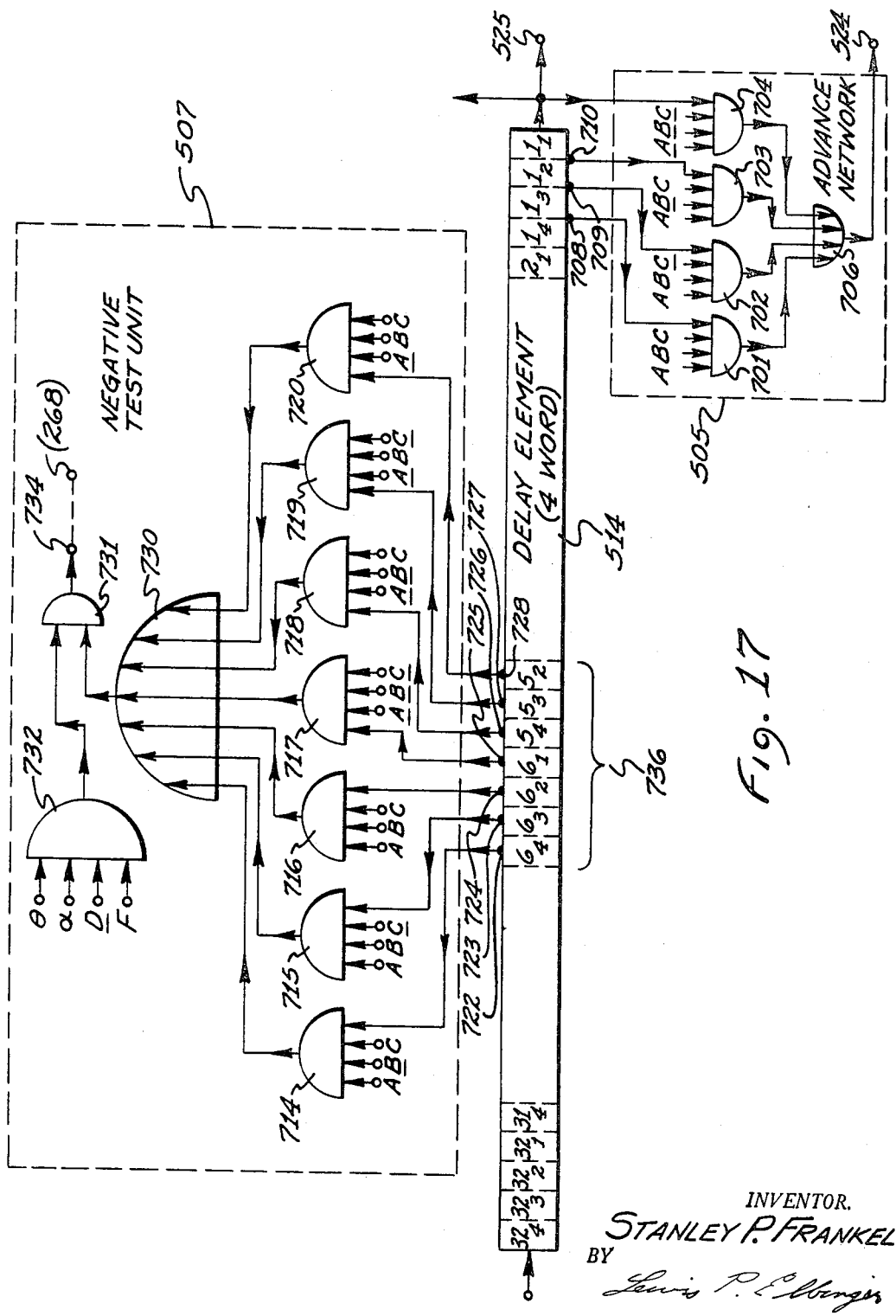
FIGURE 17 is a block diagram of the time domain advance network and the negative test unit and their relationship to the delay element of the accumulator.

For purposes of this explanation, delay element 514 in FIG. 17 is shown divided into compartments, indicated by broken lines. Each compartment is designated by the location of the bit therein at the beginning of a timing period. Thus, the compartment designated $32_3$ is that occupied by the 32nd bit of an operand in the third time domain. Since the Branch order is executed at the time of occurrence of timing signals $\alpha$, the operands have moved to the right in the delay element. Thus, when timing signals $\alpha$ occur, the 32nd bits of the four time domains appear in four adjacent of the group of seven compartments 736. The location of the particular 32nd bit sampled depends on its time domain and the time domain of the instruction containing the Branch order. Thus, if a first time domain instruction orders the negative test on a fourth time domain operand, the 32nd bit of the fourth domain operand will be in compartment $6_4$ at the required time of execution. Similarly, a first time domain instruction tests the sign of the third, second and first time domain operands in respective compartments $6_3$, $6_2$, and $6_1$. A second time domain instruction tests the sign of the 32nd bit of the fourth, third, second and first time domain operands in compartments $6_3$, $6_2$, $6_1$, and $5_4$, respectively, etc.

The execution of the Branch order will now be described. The order code for Branch is $\underline{DEF}$. Since $F=1$, AND-gate 510 of the accumulator is enabled, whereby the accumulator continues to circulate the operand, and AND-gate 522 of order control network 501 is inhibited, whereby new data is prevented from entering the accumulator. The Branch order is directed by the control signal $\phi$, which is provided at terminal 269 of the U-register of FIG. 11. Terminal 269 is connected to a tap located along delay element 251 of the U-register, such that a binary 1 signal entered into the U-register at AND-gate 262 at the time of occurrence of a timing signal $n$ will first appear at terminal 269 at the time of occurrence of a timing signal $\alpha$ in the same timing period. Inasmuch as a particular binary 1 recirculates in the U-register for a duration equal to one timing period, a corresponding binary 1 will be provided at terminal 269 from timing signal $\alpha$ of one timing period to timing signal $z$ of the next timing period.

Thus, a control signal $\phi$ in the time domain corresponding to the initiating instruction is applied to one input terminal of AND-gate 732. Timing signals $\alpha$ are applied to another input terminal of AND-gate 732 so as to enable the gate only during the first occurrence of control signal $\phi$. The other two input terminals of AND-gate 732 are connected to receive the respective signals $\underline{D}$ and F, each of which represents a binary 1 when the instruction contains the code for the Branch order. The time domain of control signal $\phi$ and the particular one of AND-gates 714–720 which is enabled determines which of the four 32nd operand bits will be coupled to AND-gate 731.

Terminal 734 of the negative test unit 507 is connected to input terminal 268 of OR-gate 266 of FIG. 11. If the Branch operation detects a negative operand, a binary 1 will be applied to terminal 268 during the occurrence of timing signals $\alpha$, and will be inserted in the V-register. A control signal $\eta$ is then available in the next-succeeding timing period for transferring a new instruction into the instruction register to replace the instruction which ordered the Branch operation. Thus, when a negative operand is detected, a new instruction is inserted in the timing period immediately following that when the Branch operation is executed. However, when a positive operand is detected, a new instruction is not obtained until the timing period indicated by the next-instruction designation delay number of the instruction which ordered the Branch operation.

The logical equation representing the complete operation of V-register 275 in response to input signals both from K-register 230 and from negative test unit 507 is given by Equation 5.

1st T.D.:
$$V'=\alpha V+\alpha K'+\alpha \underline{D}F[A\underline{B}CW_{32(4)} +AB\underline{C}W_{32(3)}+ABCW_{32(2)}+\underline{ABC}W_{32(1)}]$$

2nd T.D.:
$$V'=\alpha V+\alpha K'+\alpha \underline{D}F[AB\underline{C}W_{32(4)} +ABCW_{32(3)}+\underline{AB}CW_{32(2)}+\underline{A}BCW_{32(1)}]$$

3rd T.D.:
$$V'=\alpha V+\alpha K'+\alpha \underline{D}F[ABCW_{32(4)} +\underline{AB}CW_{32(3)}+\underline{A}BCW_{32(2)}+A\underline{BC}W_{32(1)}]$$

4th T.D.:
$$V'=\alpha V+\alpha K'+\alpha \underline{D}F[\underline{AB}CW_{32(4)} +\underline{A}BCW_{32(3)}+\underline{A}BCW_{32(2)}+\underline{A}BCW_{32(1)}]$$

In the above expression $W_{32(i)}$ represents the 32nd bit of an accumulator operand in the $i$th time domain.

For example, if it is desired to test the accumulator operand in the third time domain in accordance with a Branch order contained in the second time domain, the order portion of the second time domain instruction will contain the code 111001 in ascending order of significance. The last three digits are those stored in register elements D, E and F and are the order code for Branch. The first three digits enable AND-gate 716, which is connected to sample the bit in compartment $6_2$. When the first control signal $\phi$ representing a binary 1 occurs in the second time domain, the 32nd bit of the third time domain operand is in compartment $6_2$ and is thereby sampled. In the next succeeding timing period, a new instruction will be entered into the second time domain of the instruction register if the third time domain operand was negative.

COMMUNICATION BETWEEN TIME DOMAINS

As has previously been mentioned, a very versatile and useful data processing system is achieved if a flexible means of communication is provided between the different time domains. The following example of division will not only illustrate how a mathematical problem is solved by employing an orderly sequence of the elementary operations available with this computer, but will also demonstrate how the solution is facilitated by communicating between time domains.

The procedure for division is similar to one which has been described by S. P. Frankel, "The Logical Design of a Simple General Purpose Computer," IRE Trans., vol. EC-6, No. 1, pages 5–14; March 1957. In the instant procedure a positive dividend is divided by a positive divisor, the dividend being smaller than the divisor. The positive portions of the dividend and divisor may both represent integers or may both represent numbers less than one. The quotient will always be positive and less than one. In the quotient, the 31st bit, or highest significant digit, represents a positive number of magnitude $2^{-1}$, the 30th bit $2^{-2}$, etc.

Following a few standard operations in the division routine, the division procedure enters a repetitive subroutine in which the divisor is either subtracted from, or added to, the doubled remainder of the dividend according to whether that remainder was positive or negative. The resulting difference or sum is the new remainder. The sign of the new remainder is noted, the new remainder is doubled, and the subroutine is repeated. A binary 1 is inserted in a corresponding bit position of the quotient each time the remainder is identified as positive and a binary 0 each time the remainder is identified as negative.

All four time domains of the accumulator are employed in performing the division operation. In this particular example, the first time domain stores the divisor, the second time domain stores the dividend and its successive remainders, the third time domain stores a binary 1, and the fourth time domain stores the current portion of the quotient. The routine by which division is accomplished is described in the following Table IV.

TABLE IV.—DIVISION ROUTINE

| Tim. Per. | Time Dom. | Instruction Entered | Instruction Executed | New Operand in Accumulator |
|---|---|---|---|---|
| I | 1 | | | Divisor. |
| | 2 | | | Dividend. |
| | 3 | | | Binary 1. |
| | 4 | | | Quotient. |
| II | 1 | | | 01000 ... 00. |
| | 2 | Subtract $W_1$ (0, 0) | | 00101 ... 00. |
| | 3 | | | 00000 ... 00. |
| | 4 | | | 00000 ... 01. |
| III | 1 | | | Unchanged. |
| | 2 | Double $W_2$ (0, 0) | Subtract $W_1$ | 11101 ... 00. |
| | 3 | | | Unchanged. |
| | 4 | | | Do. |
| IV | 1 | | | Do. |
| | 2 | Add $W_1$ (0, 0) | Double $W_2$ | 11010 ... 00. |
| | 3 | | | Unchanged. |
| | 4 | | | Do. |
| V | 1 | | | Do. |
| | 2 | Branch $W_2$ (0, 0) | Add $W_1$ | 00010 ... 00. |
| | 3 | | | Unchanged. |
| | 4 | Branch $W_2$ (0, 0) | | Do. |
| VI | 1 | | | Do. |
| | 2 | Double $W_2$ (0, 1) | Branch $W_2$ [Test=(+)] | Do. |
| | 3 | | | Do. |
| | 4 | Double $W_4$ (0, 1) | Branch $W_2$ [Test=(+)] | Do. |
| VII | 1 | | | Do. |
| | 2 | Double $W_2$ (−1, 0) | Double $W_2$ | 00100 ... 00. |
| | 3 | | | Unchanged. |
| | 4 | Double $W_4$ (−1, 0) | Double $W_4$ | Do. |
| VIII | 1 | | | Do. |
| | 2 | Subtract $W_1$ (0, 0) | | Do. |
| | 3 | | | Do. |
| | 4 | Add $W_3$ (0, 0) | | Do. |
| IX | 1 | | | Do. |
| | 2 | Branch $W_2$ (0, 0) | Subtract $W_1$ | 11100 ... 00. |
| | 3 | | | Unchanged. |
| | 4 | Branch $W_2$ (0, 0) | Add $W_3$ | 00000 ... 01. |
| X | 1 | | | Unchanged. |
| | 2 | Double $W_2$ (0, 1) | Branch $W_2$ [Test=(−)] | Do. |
| | 3 | | | Do. |
| | 4 | Double $W_4$ (0, 1) | Branch $W_2$ [Test=(−)] | Do. |
| XI | 1 | | | Do. |
| | 2 | Add $W_1$ (0, 1) | Double $W_2$ | 11000 ... 00. |
| | 3 | | | Unchanged. |
| | 4 | Dummy (2, 1) | Double $W_4$ | 00000 ... 10. |
| XII | 1 | | | Unchanged. |
| | 2 | Add $W_1$ (−1, 0) | Add $W_1$ | 00000 ... 00. |
| | 3 | | | Unchanged. |
| | 4 | Dummy (1, 0) | | Do. |
| XIII | 1 | | | Do. |
| | 2 | Branch $W_2$ (0, 0) | | Do. |
| | 3 | | | Do. |
| | 4 | Branch $W_2$ (0, 0) | | Do. |
| XIV | 1 | | | Do. |
| | 2 | Double $W_2$ (0, 1) | Branch $W_2$ [Test=(+)] | Do. |
| | 3 | | | Do. |
| | 4 | Double $W_4$ (0, 1) | Branch $W_2$ [Test=(+)] | Do. |
| XV | 1 | | | Do. |
| | 2 | Double $W_2$ (−1, 0) | Double $W_2$ | 00000 ... 00. |
| | 3 | | | Unchanged. |
| | 4 | Double $W_4$ (−1, 0) | Double $W_4$ | 00000 ... 100. |
| XVI | 1 | | | Unchanged. |
| | 2 | Subtract $W_1$ (0, 0) | | Do. |
| | 3 | | | Do. |
| | 4 | Add $W_3$ (0, 0) | | Do. |
| XVII | 1 | | | Do. |
| | 2 | Branch $W_2$ (0, 0) | Subtract $W_1$ | 11000 ... 00. |
| | 3 | | | Unchanged. |
| | 4 | Branch $W_2$ (0, 0) | Add $W_3$ | 00000 ... 101. |

The second column of Table IV identifies the time domains of the operands and instructions shown. The third column identifies the instructions which are entered into the instruction register in each timing period. Each instruction of the third column is accompanied by two numbers in parentheses. The first number is the operand designation delay number and specifies the total number of full timing periods which must elapse following the timing period when the instruction enters the instruction register before the order is executed. The second number is the next-instruction designation delay number and specifies the total number of full timing periods which must elapse following the timing period when the instruction enters the instruction register before a new instruction will enter. A 0 indicates that the operation will be executed or a new instruction will enter the next timing period. The number −1 indicates that the operation is presently being executed. The fourth column identifies the instructions that are presently being executed. The fifth column shows the accumulator contents for all four time domains at the end of each timing period. Thus, each number in this column is the result of the corresponding operation which has been performed in that timing period.

The dividend chosen for this example has the value $2^{30}+2^{28}$. The divisor has the value $2^{31}$. The complete quotient which the computer delivers represents the fraction ⅝, and is given by the binary digital number 101 ... 00.

Timing period II identifies the operands which are present in the accumulator and the significant operating instructions which are present in the instruction register when computation begins. The time of insertion of these initial operands and instructions in their respective registers is a fact not material to this example. The following four sequential operations are performed whenever this division routine is initiated: the divisor is substracted from the dividend (timing period III), the dividend remainder is doubled (timing period IV), the divisor is added to the remainder (timing period V), and the remainder is tested for negative content for both the second and fourth time domains (timing period VI).

Following timing period VI, the sequence of operations performed by the computer in this division routine depends on the results of the two Branch operations of timing period VI. If the Branch operations indicate a positive remainder, no new instructions are added in timing period VII, and no operations are executed in timing period VIII.

During timing period VIII two new instructions are inserted; in time domain 2 the instruction to subtract the divisor from the remainder, and in time domain 4 the instruction to add a binary 1 to the quotient. Following the execution of these two new instructions in timing period IX, the Branch operation is again executed on the remainder for both the second and fourth time domains.

As shown in the example, a negative remainder is detected in timing period X. Therefore, in timing period XI new instructions are inserted; in time domain 2 the instruction to add the divisor to the remainder, and in time domain 4 a dummy instruction. The dummy instruction is intended only to prevent execution of an order until the next Branch instruction is inserted in timing period XIII. Thus, no new instructions are inserted in timing period XII and the Branch instructions are inserted in timing period XIII.

In timing period XIV the two Branch instructions are executed and the subroutine is continued according to whether the test detected a positive or negative remainder. The repetitive subrountine occurs in four successive timing periods, and in the above example, takes place in timing periods VI–IX, X–XIII, XIV–XVII. During each subroutine the computer performs a sequence of three operations on the remainder, the particular sequence depending on whether the Branch operation detects a positive or negative remainder.

The instructions necessary to complete the operation of division and remove the quotient from the accumulator are not shown, since there are many forms possible. The example has been carried only to the extent necessary to indicate the nature of the subroutine, the method of communicating between time domains, and the method of performing a sequence of operations to obtain a desired mathematical result.

Following time domain V, the computer commences the standard sequence of elemental operations identified previously as the repetitive subroutine. The method of storing the subroutines in multiplexed form in a memory section is shown in the following Table V:

TABLE V.—DIVISION SUBROUTINE MEMORY SECTION STORAGE

| Cell Group | Time Domain 1 | Time Domain 2 | Time Domain 3 | Time Domain 4 |
| --- | --- | --- | --- | --- |
| n+1 | Dummy (4,3) | Double $W_2(0,1)$ | Dummy (4,3) | Double $W_4(0,1)$. |
| n+2 | | Add $W_1(0,1)$ | | Dummy (2,1). |
| n+3 | | Subtract $W_1(0,0)$ | | Add $W_2(0,0)$. |
| n+4 | | Branch $W_2(0,0)$ | | Branch $W_4(0,0)$. |
| n+5 | Dummy (4,3) | Double $W_2(0,1)$ | Dummy (4,3) | Double $W_4(0,1)$. |

The subroutine occupies four successive groups of four multiplexed memory cells in a memory section. Cell group (n+1) contains the instructions for performing the first step in the subroutine. The instructions in cell group (n+1) enter the instruction register in timing periods VI, X and XIV of Table IV. The instructions in cell group (n+2) enter the instruction register in the next succeeding timing period if the Branch operation indicates a negative remainder. The instructions in cell group (n+3) enter the instruction register in the third timing period of the subroutine if the branch operation indicates a positive remainder. The instructions in cell group (n+4) are always entered in the instruction register in the third timing period following that in which the instructions of cell group (n+1) are entered.

Time domains 1 and 3 each contain an instruction, identified as a dummy instruction, which is not executed. However, the operand designation address portion thereof is employed to direct an operand from one time domain to another, as described under the previous Fetch sub-heading. Thus, the dummy instruction of time domain 1 directs the divisor, which originates in time domain 1, through gates which are controlled by time domain 1 registers until the divisor reaches time domain retard network 503, at which time it enters the second time domain and is directed by the second time domain instruction. Similarly, the dummy instruction of time domain 3 directs the binary 1 operand, which originates in time domain 3, until it enters the fourth time domain.

INPUT-OUTPUT

The computer of this invention is adapted to exchange information with external apparatus. Instructions and operands are received from external devices by means of input apparatus 28. Data is delivered to utilization devices by means of output apparatus 30. It is contemplated that most often the instant computer will cooperate with prior art slower computers wherein data is simulated by the pulse-no pulse representation. Information will be exchanged between memory 10 of the instant computer, wherein data is simulated by the phase representation, and the magnetic core memories usually employed in prior art computers. Where, however, the instant computer is employed independently of a slower computer, a chain of buffer memories may be used to provide the link with data that can be presented and received manually. This chain may include, in order of decreasing speed of access time, a magnetic core memory, a magnetic tape or drum, and punched cards or tape.

Whatever the form of the external apparatus for presenting and receiving information, the final device for communicating with the instant computer may be a flip-flop register. The flip-flop register comprises a plurality of conventional flip-flops, each adapted to store one bit of information for a duration relatively long compared with the clock period of the instant computer. In detail, a conventional flip-flop is a device having two stable states of operation and two input terminals, each of which corresponds with one of the two states. The flip-flop output signal denotes a binary 0 or a binary 1 in accordance with one of two voltage or current levels provided at an output terminal thereof. Therefore, input apparatus 28 and output apparatus 30 are provided for respectively transferring information directly from a flip-flop register into memory 10 or directly into a flip-flop register from memory 10.

Input apparatus

Input apparatus 28 comprises a plurality of elements interconnected with the circuits for generating the timing signals, shown in FIG. 9. The input apparatus comprises 32 phase shifters, such as phase shifter 750, 751, 752, . . ., 753, and 754, an OR-gate 662, and a pulse-phase converter 756. The input terminal of phase shifter 750 is connected directly to the output terminal of OR-gate 178. A phase shifter is also connected directly to each of the 31 taps of delay element 180. For example, phase shifters 751, 752, . . ., 753, and 754 are connected respectively to taps 181, 182, . . ., 183, and 184. The output terminals of all of the 32 phase shifters are connected respectively to the input terminals of OR-gate 662. OR-gate 662 is coupled through pulse-phase converter 756 to output terminal 661. Like OR-gate 178 of FIG. 9, OR-gate 662 combines microwave signals which provide binary digits in pulse-no pulse representation.

The 32 flip-flops of the external register control respectively the 32 phase shifters of input apparatus 28. Flip-flops 760, 761, 762, . . ., 763, and 764 of the flip-flop register are shown in FIG. 9 connected to, but not comprising part of, input apparatus 28. Thus, flip-flops 760, 761, 762, . . ., 763, and 764 are connected to and control respectively phase shifters 750, 751, 752, . . ., 753, and 754.

Each of the phase shifters 750, 751, 752, ..., 753, and 754 is a controllable device for changing the total time of transmission of a microwave signal propagating therethrough. Phase shifters of this type are well known in the microwave art and comprise microwave transmission sections, wherein the delay therethrough is controllable by mechanical, electrical, electronic, or magnetic means. For example, a particular device well suited for this application is a waveguide section employing a ferrite element therein. Controlling the magnetic field applied to the ferrite controls the time of transmission through the waveguide section and, consequently, the phase shift of the signal propagating therethrough.

As described previously, the signals available at the output terminal of OR-gate 178 and at each of taps 181–184 are microwave pulses representing binary 1's, inasmuch as they are 180° out-of-phase with respect to the reference signal of oscillator 40. Consequently, the output voltage or current of each of flip-flops 760–764 and the transmission of corresponding phase shifters 750–754 is adjusted so that when a flip-flop stores a binary 1, the output signal provided by the corresponding phase shifter is 180° out-of-phase with the reference signal. When a flip-flop stores a binary 0, the output signal provided by the corresponding phase shifter is in phase with the reference signal.

A word is transferred from input apparatus 28 to accumulator 14 or to instruction register 20 in the following manner. Each bit of the input word is applied by external apparatus to a corresponding one of the flip-flops of the flip-flop register, such as flip-flops 760–764. In accordance with the bit stored therein, each of these flip-flops sets a corresponding one of phase shifters 750–754. Whenever a group of four pulses appears at one of the taps of delay element 180, timing signals are generated by the corresponding pulse-phase converter and four like bits are provided simultaneously by each corresponding phase shifter. For example, if a binary 1 were stored in flip-flop 760, when the four bits of timing signal $a$ occurred, phase shifter 750 would provide four pulses 180° out-of-phase with the reference signal. Thus, as the group of four pulses provided by OR-gate 178 travels from the input to the output terminal of delay element 180, data corresponding to the input word stored in the flip-flop register is transferred bit-by-bit, in synchronism with the corresponding timing signals, to output terminal 661. Pulse-phase converter 756 converts the microwave pulses from phase shifters 750–754 to the phase representation as described heretofore.

If the order being executed is Fetch, and the operand designation address is QRS, the operand delivered to the accumulator comes from input apparatus 28. If the next-instruction designation address is δeζ, the next instruction is transferred to the instruction register from input apparatus 28.

Input apparatus 28 does not distinguish between time domains, so that a word stored therein is available for insertion in the accumulator or the instruction register in any one of the four time domains.

*Output apparatus*

Figure 18:
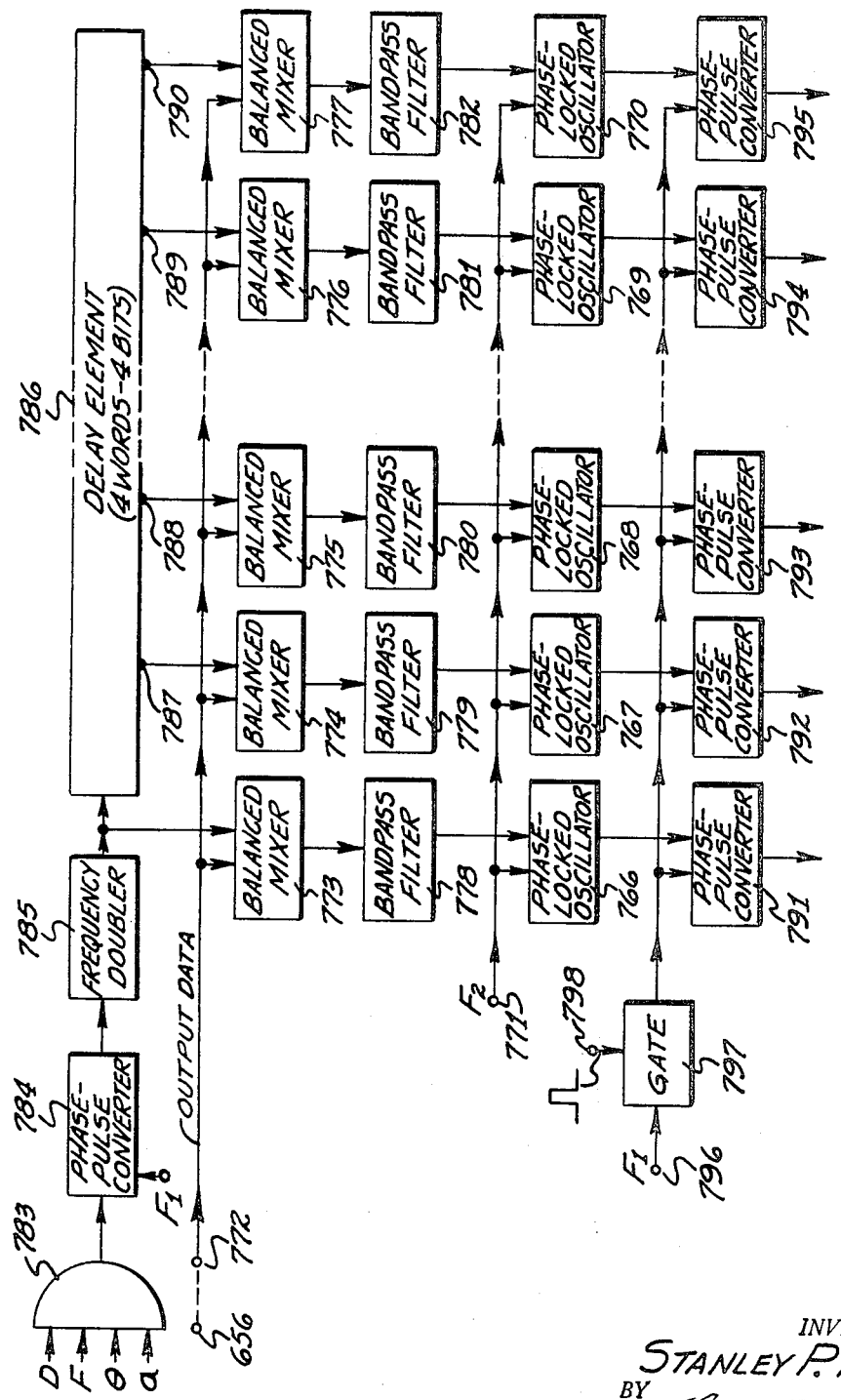
FIGURE 18 is a block diagram of the output apparatus.

Output apparatus 30, FIG. 18, comprises 32 circuit elements, such as phase-locked oscillators 766, 767, 768, ..., 769, and 770, each adapted to receive a respective one of the very short duration bits of the output word to be delivered by the computer and to deliver a corresponding output signal for a duration long compared with the clock period. The output word provided by the group of phase-locked oscillators is made available for a relatively long period to accommodate a communicating slow-speed flip-flop register, not shown. Output apparatus 30 and the previously described input apparatus 28 are the subjects of U.S. patent application Ser. No. 91,518, by W. A. Edson, filed Feb. 24, 1961, now U.S. Patent 3,185,-978, and assigned to the assignee of the instant application.

Each of oscillators 766–770 is of a type similar to oscillator 110 of FIG. 5, and oscillates continuously at frequency $F_1$. The phase of the microwave cycle of each of the signals delivered to each of the phase-locked oscillators is stabilized by applying to each oscillator the stabilizing signal of frequency $F_2$. A terminal 771, which is coupled to each of the phase-locked oscillators, is connected to receive the stabilizing signal. The particular phase of the signal provided by each of oscillators 766–770 is determined by the respective binary digit signal of the output word applied thereto.

The word to be delivered by output apparatus 30 is applied at an input terminal 772 from output terminal 656 of AND-gate 655 (FIG. 16). When a Store operation is executed and the operand designation address is QRS, the word stored in the accumulator, of dominant frequency $F_1$, is transferred through terminal 772 to one input terminal of each of 32 balanced mixers 773, 774, 775, ..., 776, and 777. The other input terminal of wave pulses are of frequency $F_2$ and are applied in sequence to the balanced mixers. Balanced mixers are well-known in the art, and suitable devices are described in the aforementioned Reintjes publication, pages 881–886.

A balanced mixer, also known as a balanced modulator, is a non-linear device adapted to receive a pair of input signals and to produce an output signal representing the modulation product of the two input signals. One modulation product is a signal having a frequency equal to the frequency difference of the two input signals. A property of the balanced modulator is that no output is derived therefrom when only one of the two input signals is present. Therefore, when, and only when, the aforementioned microwave pulse is applied to one of balanced mixers 773–777 is the frequency difference modulation product delivered thereby.

Each of balanced mixers 773, 774, 775, ..., 776, and 777 is connected to a respective one of bandpass filters 778, 779, 780, ..., 781, and 782. Bandpass filters 778–782 are tuned to pass signals of dominant frequency $F_1$. Therefore, the frequency difference modulation product, of frequency $F_1$, is the signal passed by these bandpass filters. The output terminal of each of bandpass filters 778–782 is connected to an input terminal of a respective one of oscillators 766–770.

The microwave pulse of frequency $F_2$ is applied to balanced mixer 773 only during the occurance of the first bit of the output word applied at terminal 772. Consequently, a pulse of frequency $F_1$, being the phase of this first bit, is delivered by balanced mixer 773 to oscillator 766. Similarly, a microwave pulse is applied to balanced mixer 774 simultaneously with the occurrence of the second bit of the output word, etc. Therefore, as the microwave pulses occur, balanced mixers 773–777 are enabled in sequence, and apply the corresponding bits of the input word through a bandpass filter to the associated phase-locked oscillators. When a bit signal is applied to a phase-locked oscillator, it forces the oscillator to lock in phase therewith, whereby the phase of the signal thereafter delivered by the oscillator represents the applied bit. The word stored in oscillators 766–771 remains until another output word is transferred thereto.

The aforementioned microwave pulses are produced as follows. The Store order provides that $D=1$ and $F=1$. When the order is executed $\theta=1$ in the proper time domain for a full timing period. The signals representing D, F, and $\theta$ are applied to respective input terminals of an AND-gate 783. Timing signals $a$ are applied to the fourth input terminal of AND-gate 783. Thus, a single binary 1 in pulse representation is provided by AND-gate 783 when the Store order is executed. This binary 1 occurs in the time domain determined by $\theta$ and simultaneously with a timing signal $a$ for that time domain.

AND-gate 783 is connected to a phase-pulse converter 784. When a continuous signal of frequency $F_1$ is applied to converter 784, a microwave signal bearing binary data in phase representation applied thereto is converted to a microwave signal bearing corresponding data in the pulse-no pulse representation. A converted of this type is described hereinafter. Thus, the single binary 1 in phase representation provided by AND-gate 783 is converted to a microwave pulse of frequency $F_1$.

The microwave pulse of frequency $F_1$ provided by converter 784 is applied to a frequency doubler 785, where it is altered to become a pulse of frequency $F_2$. Frequency doubler 785 may be any type known in the art, such as a klystron or traveling-wave tube doubler. The output pulse signal of doubler 785 is applied to one input terminal of balanced mixer 773 and to the input terminal of a delay element 786. Delay element 786 is provided with 31 spaced taps 787, 788, . . . , 789, and 790 therealong. Each of taps 787–790 is connected to one input terminal of a respective one of balanced mixers 774–777. Delay element 786 has a length between the input terminal thereof and the last tap 790 equal to the distance traveled by a microwave signal therein in an interval of four words less four bits, or 248 millimicroseconds. Adjacent taps are spaced apart along delay element 786 by the distance a microwave signal travels therealong in 8 millimicroseconds, or during four bits. Thus, single pulses of frequency $F_2$ appear in sequential order at taps 787–790 spaced by intervals of 8 millimicroseconds. The microwave pulse delivered at each tap is applied to a balanced mixer simultaneously with the corresponding bit of the output word, so that such bit is transferred to and stored in the corresponding phase-locked oscillator.

The word stored in oscillators 766–770 may be sampled at a speed suitable for the slow-speed receiving flip-flop register. One method of transferring this word to such a register is shown in FIG. 18. The output signal of each of oscillators 766–770 is applied to one input terminal of a respective one of phase-pulse converters 791, 792, 793, . . . , 794, 795. The reference signal of frequency $F_1$ is applied to a terminal 796 of a gate 797. The output terminal of gate 797 is connected to each of converters 791–795. A low-frequency gating pulse applied to a terminal 798 of gate 797 enables the gate to allow passage therethrough of the reference signal. When gate 797 is enabled, the phase representation signal applied to each converter by the corresponding phase-locked oscillator is altered to a corresponding pulse-no pulse representation signal. Thus, each of converters 791–795 transmits a microwave pulse for a binary 1 and no signal for a binary 0. These signals providing a pulse-no pulse representation of the output word are delivered while the gating pulse is applied to terminal 798, and may be rectified an applied to conventional low-speed flip-flop circuits of a flip-flop register.

Output apparatus 30 of FIG. 18 is adapted to transmit only one word at a time, and will store a word without regard for its time domain origin. In order to transmit words simultaneously from all time domains, a number of circuits of the type of FIG. 18 equal to the number of time domains must be employed.

STARTING PROCEDURE

To prepare the computer for the solution of a problem requires that its memory be filled with an instruction program for directing the solution in discrete steps, and with the operand data on which the solution is to be based. Normally this group of instructions and operands is received from external data sources under control of a special program stored in the computer. However, in starting the computer after it has been inoperative, a method must be provided for inserting an initial program into the memory without reliance on instructions therein to control the insertion of the program.

A procedure for starting this computer if no instructions are stored there follows. Power is applied to oscillators 40, 42, and 44 of FIG. 2 by means of a power control switch, not shown. These three oscillators commence generating their respective signals and properly lock in phase with each other. Power may then be applied to the rest of the system. The timing trigger signal is then generated in recirculating loop 150 of FIG. 9. Flip-flop 168 is transferred to the 0 state by application of a suitable signal to terminal 169 thereof. Flip-flop 168 thereby inhibits gate 166 by applying thereto an output signal representing a binary 0. At this time all storage elements, such as the sections of memory 10, accumulator 14, instruction register 20, etc., are circulating the random signals initiated therein when power was first applied. All storage elements must next be cleared. A storage element is cleared by applying the reference signal of frequency $F_1$ to the recirculation loop for a duration at least equal to the total loop delay time. As described previously in the section Storage Elements, such a signal serves to override all data signals stored in the loop, thereby forcing the oscillator therein to oscillate continuously in phase with the reference oscillator so that the storage element contains only binary 0's. All storage elements are thus cleared by application thereto of the reference signal through applicable clearing switches, such as switch 135 of FIG. 5. A first instruction is then entered into input apparatus 28 from the slow-speed computer.

Flip-flop 168 is next transferred to the 1 state by application of a suitable signal to terminal 170 thereof. Flip-flop 168 thereupon enables gate 166, permitting passage therethrough of the timing trigger signal. The application of timing trigger signals to OR-gate 178 and delay element 180 initiates the sequential timing signals $a$ to $\zeta$. In the first timing period during which the timing signals begin, K-register 230 of FIG. 11 receives the timing signals $f$ and $s$ and count-down of both delay numbers begins. Since both delay numbers are zero at the beginning of this first timing period, the instruction stored in input apparatus 28 is transferred to both the instruction register 20 and accumulator 14 in the next-succeeding timing period. This initial transfer occurs because the cleared instruction register contains 0 in each bit position and, in correspondence therewith, the addresses of input AND-gates 659 and 665 of FIG. 16 are 000 and the Fetch code is 000.

The first instruction received from input apparatus 28 contains a Fetch order for obtaining a word from input apparatus 28 after a considerable delay, such as 64 timing periods, in order to enable the slow speed computer to insert a new word in input apparatus 28. A uniformly spaced sequence of words is now obtained from input apparatus 28 in order that the slow-speed computer may operate synchronously with the high-speed computer. For example, a new word may be entered into the input apparatus every 64 timing periods. Thus, the operand delay number of the first instruction represents 64 timing periods and the next-instruction delay number represents 128 timing periods. The first instruction, which is also inserted into accumulator 14, is replaced by the word stored therein after execution of the Fetch order of the first instruction at the expiration of 64 timing periods.

The second instruction received from input apparatus 28 by the instruction register contains a Store order for transferring the word in accumulator 14 to some specified memory location after a further delay of, for example, 32 word periods. The next-instruction delay number represents 64 timing periods.

The third instruction received from input apparatus 28 by the instruction register again contains a Fetch order for obtaining a word from input apparatus 28. The fourth instruction again directs the placement of the new word in the accumulator into the memory. This procedure continues until a suitable initial program has been stored in the memory. Then a final instruction is received from input apparatus 28, which directs that the next instruction be obtained from memory as the first instruction of a routine stored therein.

During the insertion of this initial program and desired operands into memory, all four time domains operate alike in each timing period. Thus, in the starting procedure so far described, the memory stores the same program and operands in all four time domains. A step is now provided to distinguish one time domain from the remainder, if it is desired that this time domain function independently. A different instruction is obtained in the time domain which is subsequently to follow an independent routine. This may be accomplished by means of negative test unit 507 operating on a suitable set of four multiplexed operands in the accumulator. These operands may, for example, contain a 1 in the 31st bit position and a 0 in the 32nd bit position. If now an instruction which is inserted from memory in all four time domains of the instruction register bears the order code for Branch and the code $\overline{ABC}$, AND-gate 718 of the negative test unit will be opened during all four time domains while executing this instruction. In this execution of the Branch orders, the 31st bit of the fourth time domain operand will be tested by the first time domain instruction, whereas the second, third and fourth time domain instructions will test the 32nd bits of the respective first, second and third time domain operands. The second, third and fourth time domain tests will indicate a positive operand whereas the first time domain test will indicate, falsely, of course, a negative operand. The instruction register will immediately obtain a new instruction for the first time domain, whereas the second, third and fourth time domains will not receive a new instruction until the next-instruction designation delay number is reduced to zero. Thus, the first time domain is now able to follow an independent routine. In a similar manner, independent routines can be initiated in the other time domains.

Other starting procedures and other procedures for inserting different routines in the different time domains may be readily conceived and employed with this computer.

LOGICAL ELEMENTS

Figure 19:
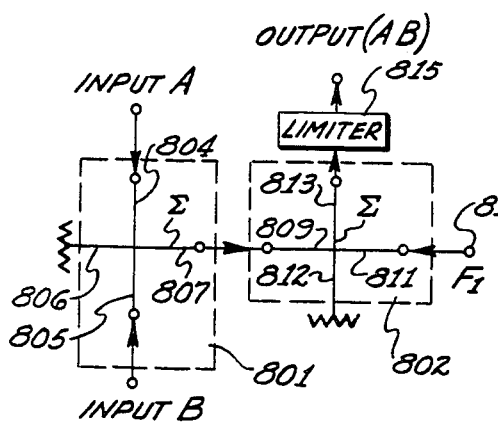
FIGURE 19 is a schematic diagram of an AND-gate useful in the practice of this invention.
Figure 20:
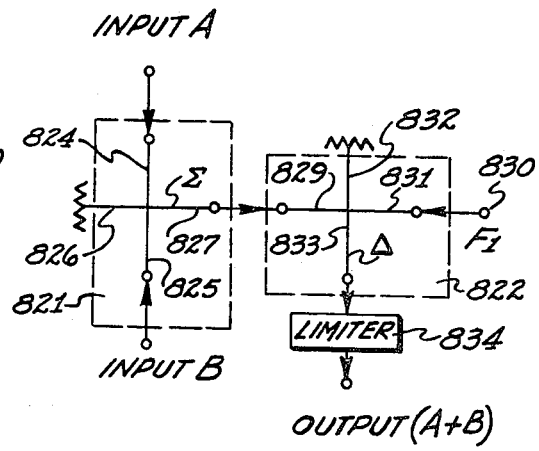
FIGURE 20 is a schematic diagram of an OR-gate useful in the practice of this invention.
Figure 22:
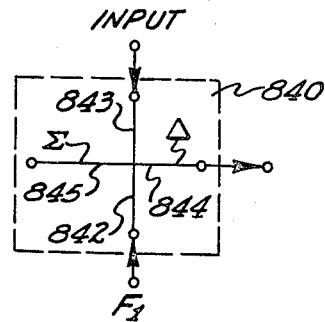
FIGURE 22 is a schematic diagram of a data representation converter useful in the practice of this invention.

Several logical elements operative at microwave frequencies and useful in systems wherein binary digital data is processed in phase representation will now be described. The logical elements, shown in FIGS. 19, 20, and 22, are the subjects of U.S. patent application 79,667, by M.P. Forrer, filed Dec. 30, 1960, and since abandoned, and assigned to the assignee of the instant application.

Gates

The AND-gate of FIG. 19 receives a pair of input signals A and B, each providing a binary digit in phase representation, and delivers a binary digital 1 in phase representation, only when both input signals represent a 1. The AND-gate comprises a pair of hybrid junctions 801 and 802, of the type previously described in the Storage Element section. As mentioned previously, each hybrid junction is provided with two pairs of conjugate arms. If a microwave signal is applied to each arm of one conjugate pair, a signal proportional to the algebraic sum of the two applied signals will be delivered by one arm of the other conjugate pair and a signal proportional to the algebraic difference of the two applied signals will be delivered at the other arm of the other conjugate pair.

Digital inputs A and B are applied respectively to arms 804 and 805 of one conjugate pair of hybrid junction 801. The difference arms 806 of the other conjugate pair is suitably terminated for proper operation of the hybrid junction. The sum arm 807 of the other conjugate pair is connected to an arm 809 of hybrid junction 802. An input terminal 810 is connected to an arm 811, which forms a conjugate pair with arm 809. The difference arm 812 of the other conjugate pair of hybrid junction 802 is suitably terminated. The AND-gate output signal is taken from the sum arm 813 of this other conjugate pair of hybrid junction 802. The reference signal is applied to terminal 810.

The following Table VI illustrates the operation of the circuit of FIG. 19 as an AND-gate.

TABLE VI

| Input Signals | | Output First Hybird | Ref. Signal | AND-gate Output | OR-gate Output |
|---|---|---|---|---|---|
| A | B | | | | |
| 0(1) | 0(1) | 0($\sqrt{2}$) | 0(1/$\sqrt{2}$) | 0(3/2) | 0(1/2) |
| 0(1) | 1(1) | —(0) | 0(1/$\sqrt{2}$) | 0(1/2) | 1(1/2) |
| 1(1) | 0(1) | —(0) | 0(1/$\sqrt{2}$) | 0(1/2) | 1(1/2) |
| 1(1) | 1(1) | 1($\sqrt{2}$) | 0(1/$\sqrt{2}$) | 1(1/2) | 1(3/2) |

In Table VI, the figures in parentheses denote the relative signal amplitudes, and the figures immediately to the left of the parentheses indicate the phase-represented binary digit. Thus, the first two columns illustrate the four binary digital signal combinations applied to arms 804 and 805 of hybrid junction 801, each of these input signals having a relative amplitude of unity. The third column describes the output signal from sum arm 807 of hybrid junction 801. If the input signals represent like binary digits, the signal from arm 807 represents the corresponding digit with a relative amplitude of $\sqrt{2}$. If the input signals represent unliked digits, no output signal is derived from arm 807. The reference signal represents a binary 0 and is applied to terminal 810 with a relative amplitude of $1/\sqrt{2}$.

The fifth column of Table VI describes the output signal available at sum arm 813 of hybrid junction 802. The amplitude of the output signal of arm 813 is proportional to the algebraic sum of the amplitudes of the output signal of the first hybrid junction and the reference signal. The output signal of arm 813 represents a binary 0 whenever one or both of the input signals A and B represents a 0 and represents a binary 1 only when both input signals A and B represent binary 1's, thereby effectuating the AND-operation on the two input digits. The amplitude of the last three signals in this fifth column of Table VI are alike, whereas the amplitude of the first signal is three times as great. A limiter 815 will usually be employed if the output signal of this AND-gate is to drive another logical circuit of similar type. This limiter may be a diode clipper if gain is not required, or if the delay associated with gain cannot be tolerated. A traveling-wave tube amplifier operated at saturation will provide the necessary limiting action where gain is desired. In this instance all four possible output signals may be restored to a relative amplitude equal to that of the input signals to the AND-gate.

The OR-gate of FIG. 20 receives a pair of input signals A and B, each providing a binary digit in phase representation, and delivers a binary digital 1 in phase representation, whenever either input signal represents a 1. The OR-gate comprises a pair of hybrid junctions 821 and 822. Digital inputs A and B are applied respectively to arms 824 and 825 of one conjugate pair of hybrid junction 821. The difference arm 826 of the other conjugate pair is suitably terminated for proper operation of the hybrid junction. The sum arm 827 of the other conjugate pair is connected to an arm 829 of hybrid junction 822. An input terminal 830 is connected to an arm 831, which forms a conjugate pair with arm 829. The sum arm 832 of the other conjugate pair of hybrid junction 822 is suitably terminated. The OR-gate output signal is taken from the difference arm 833 of this other conjugate pair of hybrid junction 822. The reference signal is applied to terminal 830.

Table VI also illustrates the operation of the circuit of FIG. 20 as an OR-gate. The first two columns illustrate the four binary digital signal combinations applied to arms 824 and 825 of hybrid junction 821. The third column describes the output signal from sum arm 827 of hybrid junction 821. The reference signal indicated in Table VI also is that applied to terminal 830. The sixth column of Table VI describes the output signal available at difference arm 833 of hybrid junction 822. The amplitude of the output signal of arm 833 is proportional to the algebraic difference of the amplitudes of the output signal of the first hybrid junction 821 and the reference signal. The output signal of arm 833 represents a binary 1 whenever one or both of the input signals A and B represents a 1, thereby effectuating the OR-operation on the two input digits. As described in connection with the AND-gate of FIG. 19, a limiter 834 will usually be employed.

Both the AND-gate of FIG. 19 and OR-gate of FIG. 20 are provided with but two input terminals. If an AND-gate or OR-gate with more than two input terminals is desired, the gates shown may be combined in logical networks according to techniques well known in the art to form multiple-input AND and OR-gates.

Figure 21:
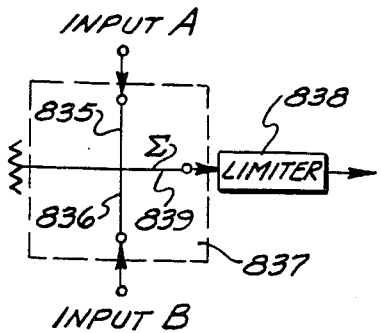
FIGURE 21 is a schematic diagram of another OR-gate useful in the practice of this invention.

The AND-gate of FIG. 19 receives and transmits signals providing binary digital data in phase representation, and may be used for all AND-gates heretofore described. The OR-gate of FIG. 20 receives and transmits signals providing binary digital data in phase representation, and may be used for all OR-gates heretofore described with the exception of OR-gates 178 and 662 of FIG. 9. The latter two OR-gates combine microwave signals which provide data in pulse-no pulse representation. The OR-gate of FIG. 21 is a simple device for use in OR-gates 178 and 662. A microwave signal providing binary digital data in pulse-no pulse representation is applied to each of arms 835 and 836 of hybrid junction 837. Arms 835 and 836 constitute a conjugate pair. A limiter 838 is connected to the sum arm 839 and provides the output signal for the OR-gate. When a microwave pulse is applied at either one or both of arms 835 and 836, an output microwave pulse is delivered by limiter 838. This OR-gate may also be combined with similar gates to form a multiple-input OR-gate.

Converters

By applying input signals of proper amplitude to the arms of one conjugate pair of a hybrid junction, FIG. 22, a pulse-phase converter, or a phase-pulse converter may be obtained. In both converter types, the reference signal, representing a continuous train of binary 0's in phase representation is applied to one arm 842 of hybrid junction 840 and the signal whose data is to be converted from one representation to another is applied to another arm 843. Arms 842 and 843 comprise a conjugate pair. An arm 844 provides an output signal proportional to the difference between the amplitudes of the signals applied to arms 842 and 843. An arm 845 provide an output signal proportional to the sum of the amplitudes of the signals applied to arms 842 and 843.

In the pulse-phase converter, the signal applied to arm 843 and providing binary data in pulse-no pulse representation has a pulse magnitude equal to twice the magnitude of the reference signal applied to arm 842. In the interval between pulses, whose microwave component is in phase with the reference signal, the signal from arm 844 represents a binary 0. When a pulse is present, it is subtracted from the reference signal and the signal from arm 844 is of opposite phase, but of same amplitude, as the previous binary 0 signal therefrom. Thus, the hybrid junction of FIG. 21, employed as described, converts data in pulse-no pulse representation to data in phase representation. If the pulses of the input signal to arm 843 have a microwave component 180° out-of-phase with the reference signal, the output signal may be taken from the sum arm 845. This type of pulse-phase converter may be employed for converters 186–190 of FIG. 9.

In the phase-pulse converter, the input signal providing binary data in phase representation is applied to arm 843 with a magnitude equal to that of the reference signal applied to arm 842. When a binary 0 is present in the input signal, it is subtracted from the reference signal and no output signal is obtained from arm 844. When a binary 1 is present in the input signal, the magnitude thereof is effectively added to that of the reference signal by difference arm 844. Thus, when a binary 1 is present in the input signal, an output pulse is available from arm 844. In this manner, the hybrid junction of FIG. 21 converts data in phase representation to data in pulse-no pulse representation.

While the principles of the invention have now been made clear in illustrative embodiments, there will be immediately obvious to those skilled in the art many modifications in structure, arrangement, proportions, the elements, materials, and components, used in the practice of the invention, and otherwise, which are particularly adapted for specific environments and operating requirements, without departing from those principles. The appended claims are therefore intended to cover and embrace any such modifications, within the limits only of the true spirit and scope of the invention.

Certain portions of the apparatus herein disclosed are not of my invention, but are the inventions of:

W. A. Edson, as defined by the claims of his application, Ser. No. 82,036, filed Jan. 11, 1961, now U.S. Patent No. 3,277,450, and W. A. Edson, as defined by the claims of his application. Ser. No. 91,518, filed Feb. 24, 1961, now U.S. Patent No. 3,185,978.

What is claimed is:

1. In a data processing system, a loop storage element for recirculating a digital instruction, a portion of said instruction comprising a digital number, and means coupled to said storage element for altering the value of said number each time said instruction recirculates therein.

2. A data processing system as in claim 1 further including additional means coupled to said storage element and responsive to said number for generating a control signal when said number has a predetermined value.

3. The data processing system of claim 2 further including means for receiving said control signal and responsive thereto for initiating execution of said instruction.

4. In a data processing system, a loop storage element for recirculating a digital instruction, a portion of said instruction comprising a pair of digital numbers and a portion of said instruction comprising an order to be executed, first means coupled to said storage element and responsive to one of said numbers for generating a control signal for directing execution of said order when said one number has a predetermined value, second means coupled to said storage element and responsve to the other of said numbers for generating a control signal for directing the insertion of a new instruction into said storage element when said other number has a predetermined value, and third means coupled to said storage element for altering the value of each of said numbers each time said instruction recirculates therein.

5. Apparatus for storing information, comprising a recirculation storage element adapted to recirculate signals; and means coupled to said element for applying thereto for recirculation signals representing respective digits of $n$ words of digital information, the signals of all of said $n$ words being temporally interspersed, and each group of $n$ successive signals representing one digit of all of said words.

6. Apparatus as in claim 5 further including means coupled to said element for communicating with any selected one of the words circulating therein.

7. Apparatus as in claim 5 further including means coupled to said element for changing the temporal relationship of any one of the words circulating therein with respect to the remainder of the words circulating therein.

8. Apparatus comprising a plurality of circuit loops, each loop being adapted to store a plurality of words of binary digital information by recirculating electrical signals representing respective bits of said words; and means coupled to each of said loops for applying said signals thereto for recirculation, wherein one signal of all of said plurality of words stored in said loop passes any point in said loop before the next signal of any of said words, and wherein successive signals of each of said words in said loop reaching said point represent successive bits of said word.

9. Apparatus as in claim 8 further including means for changing the temporal relationship of any one of the stored words of any one of said loops with respect to the remainder of the stored words of all of said loops.

10. Apparatus for storing binary digital information, comprising a plurality of closed loops each adapted to recirculate signals representing respective bits of said information, each of said loops being further adapted to store a plurality of words of information wherein the corresponding bits of said plurality of words are temporally interspersed, a plurality of communication means for communicating from external to said loops with any selected one of the words stored in said loops, and time-shifting means coupled to at least one of said communication means and adapted to change the temporal relationship of one of the stored words for which communication is provided by said one communication means with respect to the remainder of the words in said apparatus.

11. Apparatus as in claim 10 further including means for receiving said one word from said time-shifting means and a word in temporal correspondence with said one word from one of said communication means and adapted to perform an operation on both of the words received thereby and to deliver a new word representing the result of said operation.

12. Binary digital information processing apparatus for receiving a plurality of words of information wherein the corresponding bits of said plurality of words are temporally interspersed, comprising time-shifting means coupled to receive one of said words and adapted to change the temporal relationship thereof with respect to the remainder of said words, and means coupled to receive said one word from said time-shifting means and one of the remainder of said words and adapted to perform an operation on both of the words received thereby and to deliver a new word representing the result of said operation.

13. In a data processing system, apparatus adapted to store a plurality of words of digital information, and communicating means for communicating with said apparatus for sequentially presenting the digits of information stored in said apparatus, whereby one digit of all of said plurality of words stored in said apparatus is presented by said communicating means before the next digit of any of said words, and whereby successively presented digits of each of said words represent successive digits of said words.

14. Apparatus comprising a circuit loop for storing a plurality of binary digital information words, said loop being adapted to circulate therein a plurality of electromagnetic signals respectively representing binary digits by the phase thereof, and means coupled to said loop for applying said signals thereto for recirculation, wherein one signal of all of said plurality of words stored in said loop passes any point in said loop before the next signal of any of said words, and wherein successive signals of each of said words in said loop reaching said point represent successive binary digits of said word.

15. Apparatus for storing binary digital information comprising a loop storage element, said loop being adapted to circulate therein a plurality of electromagnetic signals respectively representing the bits of said information wherein the value of each bit is denoted by the phase of the electromagnetic signal representative thereof, said storage element being adapted to store $n$ words of information, the signals corresponding to each of said words being temporarily interspersed with the signals corresponding to the remainder of said $n$ words, and wherein each successively occurring group of $n$ signals represents one bit of all of said words in predetermined order.

16. In a data processing system, the combination comprising: a source of a first electromagnetic signal train having a first frequency; a source of clock signals occurring with uniform repetition rate at a frequency less than said first frequency, whereby the clock periods between successive clock signals are uniform; a source of a second electromagnetic signal train having said first frequency; a source of a third electromagnetic signal train having said first frequency; said second and third signal trains having respective preselected phase relationships with respect to said first signal train during a predetermined portion of each of said clock periods, each of said phase relationships representing a corresponding digit; a logical element responsive to a pair of electromagnetic signals applied thereto, wherein each signal of said pair provides digits represented by said phase relationships, for logically combining said pair of signals and for delivering an output electromagnetic signal having said first frequency and having phase relationships with respect to said first signal train during said predetermined clock period portions representing digits corresponding to the logical combination effected by said logical element; and means for applying said second and third trains to said logical element.

17. In a data processing system, the combination comprising: a source of a first alternating electrical signal train having a first frequency; a source of clock signals occurring with uniform repetition rate at a frequency less than said first frequency, whereby the clock periods between successive clock signals are uniform; a source of a second alternating electrical signal train having said first frequency; a source of a third alternating electrical signal train having said first frequency; said second and third signal trains having either a cophasal or anti-phasal relationship with respect to said first signal train during a predetermined portion of each of said clock periods, wherein said cophasal relationships represent one type of binary digit and said anti-phasal relationships represent the other type of binary digit; a logical element responsive to a pair of alternating electrical signals applied thereto, wherein each signal of said pair provides binary digits represented by cophasal and anti-phasal relationships, for logically combining said pair of signals and for delivering an output alternating electrical signal having said first frequency and having cophasal and anti-phasal relationships with respect to said first signal train during said predetermined clock period portions representing binary digits corresponding to the logical combination effected by said logical element; and means for applying said second and third trains to said logical element.

18. In a data processing system, the combination comprising: a source of a first electromagnetic signal train having a first frequency; a source of clock signals occurring with uniform repetition rate at a frequency less than said first frequency, whereby the clock periods between successive clock signals are uniform; a source of a second electromagnetic signal train having said first frequency; a source of a third electromagnetic signal train having said first frequency; said second and third signal trains having respective preselected phase relationships with respect to said first signal train during a predetermined portion of each of said clock periods, each of said phase relationships representing a corresponding digit; an arithmetic unit responsive to a pair of electromagnetic signals applied thereto, wherein each signal of said pair provides digits represented by said phase relationships, for executing an arithmetic operation on said pair of signals and for delivering an output electromagnetic signal having said first frequency and having phase relationships with respect to said first signal train during said predetermined clock period portions representing digits corresponding to the result of such arithmetic operation; and means for applying said second and third trains to said arithmetic unit.

19. In a data processing system, the combination comprising: a source of a first electromagnetic signal train having a first frequency; a source of clock signals occurring with uniform repetition rate at a frequency less than said first frequency, whereby the clock periods between successive clock signals are uniform, a source of a second electromagnetic signal train having said first frequency; a source of a third electromagnetic signal train having said first frequency; said second and third signal trains having either a cophasal or anti-phasal relationship with respect to said first signal train during a predetermined portion of each of said clock periods, wherein said cophasal relationships represent one type of binary digit and said anti-phasal relationships represent the other type of binary digit; an arithmetic unit responsive to a pair of electromagnetic signals applied thereto, wherein each signal of said pair provides binary digits represented by said cophasal and anti-phasal relationships, for executing an arithmetic operation on said pair of signals and for delivering an output electromagnetic signal having said first frequency and having cophasal and anti-phasal relationships with respect to said first signal train during said predetermined clock period portions representing binary digits corresponding to the result of such arithmetic operation; and means for applying said second and third trains to said arithmetic unit.

20. In a data processing system, the combination comprising: a source of a first electromagnetic signal train having a first frequency; a source of clock signals occurring with uniform repetition rate at a frequency less than said first frequency, whereby the clock periods between successive clock signals are uniform; a source of a second electromagnetic signal train having said first frequency; a source of a third electromagnetic signal train having said first frequency; said second and third signal trains having either a cophasal or anti-phasal relationship with respect to said first signal train during a predetermined portion of each of said clock periods, wherein said cophasal relationships represent one type of binary digit and said anti-phasal relationships represent the other type of binary digit; a logical AND-gate responsive to a pair of electromagnetic signals applied thereto, wherein each signal of said pair provides binary digits represented by said cophasal and anti-phasal relationships, for logically combining said pair of signals and for delivering an output electromagnetic signal having said first frequency and having cophasal and anti-phasal relationships with respect to said first signal train during said predetermined clock period portions representing binary digits corresponding to the logical combination effected by said AND-gate; and means for applying said second and third trains to said AND-gate.

21. In a data processing system, the combination comprising: a source of a first electromagnetic signal train having a first frequency; a source of clock signals occurring with uniform repetition rate at a frequency less than said first frequency, whereby the clock periods between successive clock signals are uniform; a source of a second electromagnetic signal train having said first frequency; a source of a third electromagnetic signal train having said first frequency; said second and third signal trains having either a cophasal or anti-phasal relationship with respect to said first signal train during a predetermined portion of each of said clock periods, wherein said cophasal relationships represent one type of binary digit and said antiphasal relationships represent the other type of binary digit; or logical OR-gate responsive to a pair of electromagnetic signals applied thereto, wherein each signal of said pair provides binary digits represented by said cophasal and anti-phasal relationships, for logically combining said pair of signals and for delivering an output electromagnetic signal having said first frequency and having cophasal and anti-phasal relationships with respect to said first signal train during said predetermined clock period portions representing binary digits corresponding to the logical combination effected by said OR-gate; and means for applying said second and third trains to said OR-gate.

22. In a computer system, the combination of: a first circulating register for storing a plurality of multi-bit computer words in serial circulating manner, a second circulating register for storing a plurality of multi-bit computer words in serial circulating manner, timing means synchronized with said first and second registers for generating bit timing signals representative of the timing of the bits in the individual computer words circulating in said first and second circulating registers, first logic circuitry coupled to said timing means and to said first circulating register for introducing binary signals representative of said multi-bit computer words into said first register with a predetermined timing with respect to said computer words in said second register, the lengths of said registers having a particular relationship such that particular ones of the words in said first register line up with a particular portion of the successive words in said second register during successive circulations of said registers, and second logic circuitry coupled to said timing means and to said first and second registers for transferring binary signals from said first register to said second register with a timing to transfer respective ones of said words in said first register into the corresponding line-up portions of said words in said first register.

23. The combination defined in claim 22 and which includes further logic circuitry for periodically shifting the contents of one of said circulating registers by a predetermined number of bit positions.

24. The combination defined in claim 22 and which includes further logic circuitry for periodically shifting the contents of said first circulating register by a bit position, and means coupled to said second circulating register for introducing extraneous information into said second circulating register to be stored therein in the bit positions made available by the aforesaid shifting of the contents thereof by said further logic circuitry.

25. In combination: a memory for storing multi-bit binary signals in at least one channel thereon at successive bit positions in said channel, a bit counted including a plurality of bi-stable networks and logic circuitry intercoupling said networks, said memory further having signals representative of at least one pair of binary bits recorded at selected bit positions in a further channel and respectively representing binary "1" and binary "0", a synchronizing circuit coupled to said further channel for deriving at least one of said bits of said pair and for introducing the same to said bit counter for establishing a particular relationship between said memory and said bit counter, said bit counter and said further channel providing bit timing signals representative of said successive bit positions as determined by the relative states of said bi-stable networks in conjunction with the derivation of said binary bits from said further channel.

26. Apparatus for storing information, comprising a recirculation storage element adapted to recirculate signals; and means coupled to said element for applying thereto for recirculation signals representing respective bits of $n$ words of binary digital information, the signals of all of said $n$ words being temporally interspersed, and each group of $n$ successive signals representing one bit of all of said words in predetermined order.

27. Apparatus for storing information, comprising a recirculation storage element adapted to recirculate signals; and means coupled to said element for applying thereto for recirculation signals representing respective bits of $n$ words of binary digital information, the signals of all of said $n$ words being temporally interspersed, and each group of $n$ successive signals representing a bit of corresponding order of all of said words.

28. Apparatus for storing information, comprising a recirculation storage element adapted to recirculate signals; and means coupled to said element for applying thereto for recirculation signals representing respective bits of $n$ words of binary digital information, the signals of all of said $n$ words being temporally interspersed, and one signal of all of said $n$ words passing any point in said element before the next signal of any one of said words.

29. In a data processing system, the combination comprising: first and second recirculation storage elements, each of said storage elements having an output terminal; each of said storage elements recirculating signals representing respective bits of $n$ words of binary digital information, the signals of all of said $n$ words being temporally interspersed, wherein each group of $n$ successive signals arriving at the output terminal of said storage element comprises one bit of all of said $n$ words in predetermined order; a logical element responsive to a pair of signals received thereby for logically combining said pair of signals and for delivering an output signal corresponding to the logical combination effected thereby; first selecting means coupled to the output terminal of said first storage element for transmitting a signal of predetermined order from each signal group recirculating in said first storage element, whereby a signal train is transmitted by said first selecting means comprising a selected one of the $n$ words stored in said first storage element; second selecting means coupled to the output terminal of said storage element for transmitting a signal of predetermined order from each signal group recirculating in said second storage element, whereby a signal train is transmitted by said second selecting means comprising a selected one of the $n$ words stored in said second storage element; and means for applying the signal trains transmitted by said first and second selecting means to said logical element.

30. In a data processing system, the combination comprising: first and second recirculation storage elements, each of said storage elements having an output terminal; each of said storage elements recirculating signals representing respective bits of $n$ words of binary digital information, the signals of all of said $n$ words being temporally interspersed, wherein each group of $n$ successive signals arriving at the output terminal of said storage element comprises one bit of all of said $n$ words in predetermined order; an arithmetic unit responsive to a pair of signals received thereby for executing an arithmetic operation on said pair of signals and for delivering an output signal corresponding to the result of such arithmetic operation; first selecting means coupled to the output terminal of said first storage element for transmitting a signal of predetermined order from each signal group recirculating in said first storage element, whereby a signal train is transmitted by said first selecting means comprising a selected one of the $n$ words stored in said first storage element; second selecting means coupled to the output terminal of said second storage element for transmitting a signal of predetermined order from each signal group recirculating in said second storage element, whereby a signal train is transmitted by said second selecting means comprising a selected one of the $n$ words stored in said second storage element; and means for applying the signal trains transmitted by said first and second selecting means to said arithmetic unit.

31. In a data processing system, the combination comprising: first and second recirculation storage elements, each of said storage elements having an output terminal; each of said storage elements recirculating signals representing respective bits of $n$ words of binary digital information, the signals of all of said $n$ words being temporally interspersed, wherein each group of $n$ successive signals arriving at the output terminal of said storage element comprises one bit of all of said $n$ words in predetermined order; an AND-gate responsive to a pair of signals received thereby for logically combining said pair of signals and for delivering an output signal corresponding to the logical combination effected thereby; first selecting means coupled to the output terminal of said first storage element for transmitting a signal of predetermined order from each signal group recirculating in said first storage element, whereby a signal train is transmitted by said first selecting means comprising a selected one of the $n$ words stored in said first storage element; second selecting means coupled to the output terminal of said second storage element for transmitting a signal of predetermined order from each signal group recirculating in said second storage element, whereby a signal train is transmitted by said second selecting means comprising a selected one of the $n$ words stored in said second storage element; and means for applying the signal trains transmitted by said first and second selecting means to said AND-gate.

32. In a data processing system, the combination comprising: first and second recirculation storage elements, each of said storage elements having an output terminal; each of said storage elements recirculating signals representing respective bits of $n$ words of binary digital information, the signals of all of said $n$ words being temporally interspersed, wherein each group of $n$ successive signals arriving at the output terminal of said storage element comprises one bit of all of said $n$ words in predetermined order; an OR-gate responsive to a pair of signals received thereby for logically combining said pair of signals and for delivering an output signal corresponding to the logical combination effected thereby; first selecting means coupled to the output terminal of said first storage element for transmitting a signal of predetermined order from each signal group recirculating in said first storage element, whereby a signal train is transmitted by said first selecting means comprising a selected one of the $n$ words stored in said first storage element; second selecting means coupled to the output terminal of said second storage element for transmitting a signal of predetermined order from each signal group recirculating in said second storage element; whereby a signal train is transmitted by said second selecting means comprising a selected one of the $n$ words stored in said second storage element; and means for applying the signal trains transmitted by said first and second selecting means to said OR-gate.

33. In a data processing system, the combination comprising: first and second recirculation storage elements, each of said storage elements having an output terminal; each of said storage elements recirculating signals representing respective bits of $n$ words of binary digital information, the signals of all of said $n$ words being temporally interspersed, wherein each group of $n$ successive signals arriving at the output terminal of said storage element comprises one bit of all of said $n$ words in predetermined order; an adder responsive to a pair of signals received thereby for executing an addition operation on said pair of signals and for delivering an output signal corresponding to the result of such addition operation; first selecting means coupled to the output terminal of said first storage element for transmitting a signal of predetermined order from each signal group recirculating in said first storage element, whereby a signal train is transmitted by said first selecting means comprising a selected one of the $n$ words stored in said first storage element; second selecting means coupled to the output terminal of said second storage element for transmitting a signal of predetermined order from each signal group recirculating in said second storage element; whereby a signal train is transmitted by said second selecting means comprising a selected one of the $n$ words stored in said second storage element; and means for applying the signal trains transmitted by said first and second selecting means to said adder.

34. In a data processing system, the combination comprising: first and second recirculation storage elements, each of said storage elements having an output terminal; each of said storage elements recirculating signals representing respective bits of $n$ words of binary digital information, the signals of all of said $n$ words being temporally interspersed, wherein each group of $n$ successive signals arriving at the output terminal of said storage element comprises one bit of all of said $n$ words in predetermined order; a subtracter responsive to a pair of signals received thereby for executing a subtraction operation on said pair of signals and for delivering an output signal corresponding to the result of such subtraction operation; first selecting means coupled to the output terminal of said first storage element for transmitting a signal of predetermined order from each signal group recirculating in said first storage element, whereby a signal train is transmitted by said first selecting means comprising a selected one of the $n$ words stored in said first storage element; second selecting means coupled to the output terminal of said second storage element for transmitting a signal of predetermined order from each signal group recirculating in said second storage element; whereby a signal train is transmitted by said second selecting means comprising a selected one of the $n$ words stored in said second storage element; and means for applying the signal trains transmitted by said first and second selecting means to said subtracter.

35. In a data processing system a recirculation storage element for recirculating an instruction, a first portion of said instruction comprising an order denoting an operation to be executed in said system and a second portion of said instruction comprising a number; means coupled to said storage element for altering the value of said number by a predetermined amount each time said instruction recirculates in said storage element; sensing means coupled to said storage element and responsive to said number for generating a control signal when said number reaches a predetermined value; and means for receiving and responsive to said order of said instruction and triggered by said control signal for directing execution of said operation.

References Cited

UNITED STATES PATENTS

| 2,483,718 | 10/1949 | Aiken | 340—170 |
| 2,870,431 | 1/1959 | Babcock | 340—170 |
| 2,799,845 | 7/1957 | Dietrich | 340—174 |
| 2,885,659 | 5/1959 | Spielberg | 340—174 |
| 1,559,642 | 11/1925 | Nyquist | 340—170 |
| 2,846,142 | 8/1958 | Strachey et al. | 235—61 |
| 2,939,081 | 5/1960 | Dennis | 340—170 X |
| 2,688,632 | 8/1954 | Wilkinson | 235—165 |
| 2,716,158 | 8/1955 | Shenk et al. | 178—53.1 |
| 2,845,609 | 7/1958 | Newman et al. | 340—172.5 |
| 2,936,116 | 5/1960 | Adamson et al. | 235—165 |
| 2,987,253 | 6/1961 | Schreiner et al. | 235—176 |

OTHER REFERENCES

National Bureau of Standards Circular 551; Computer Development (SEAC and DYSEAC) at the National Bureau of Standards, Washington, D.C., Jan. 25, 1955; pages relied upon 19–23 and 93–96.

MALCOLM A. MORRISON, *Primary Examiner.*

C. E. ATKINSON, *Assistant Examiner.*